Nov. 21, 1967  S. T. CARTER  3,354,016
ROTARY-TYPE LABELING MACHINE
Filed Oct. 1, 1963  39 Sheets-Sheet 1

INVENTOR.
Sidney T. Carter
BY
Roberts Cushman & Grover
ATTORNEY

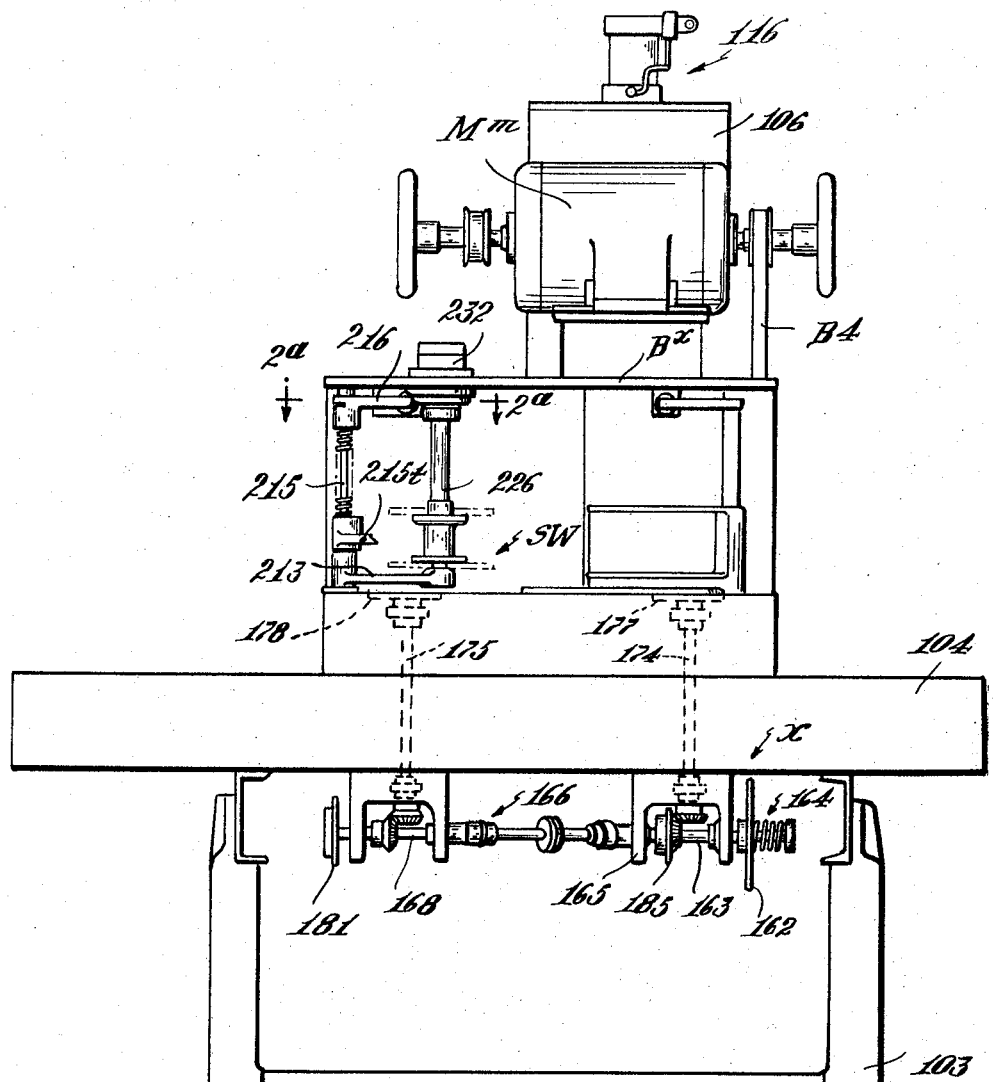
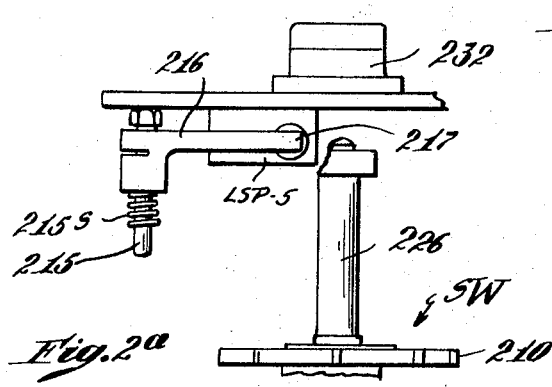

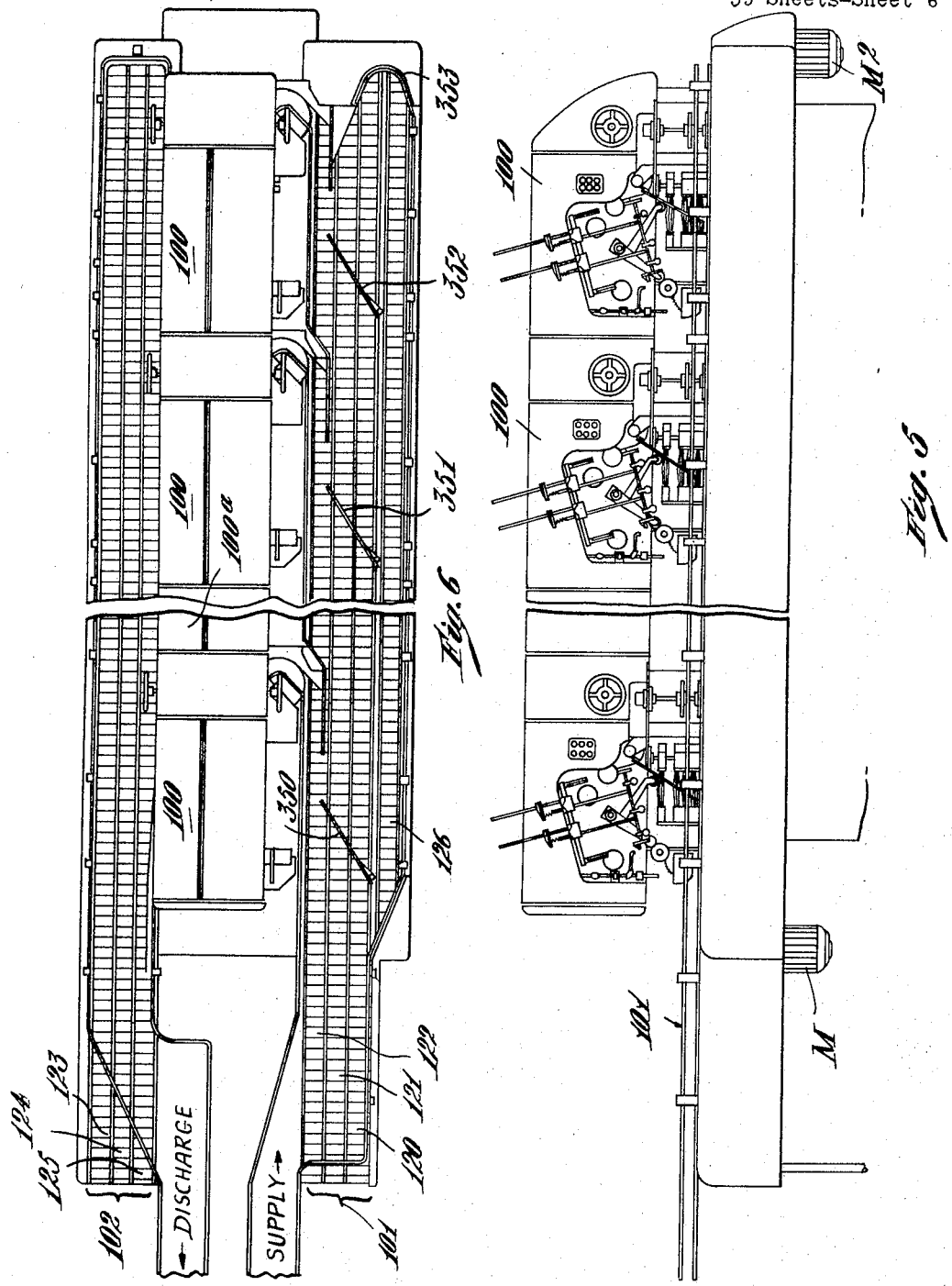

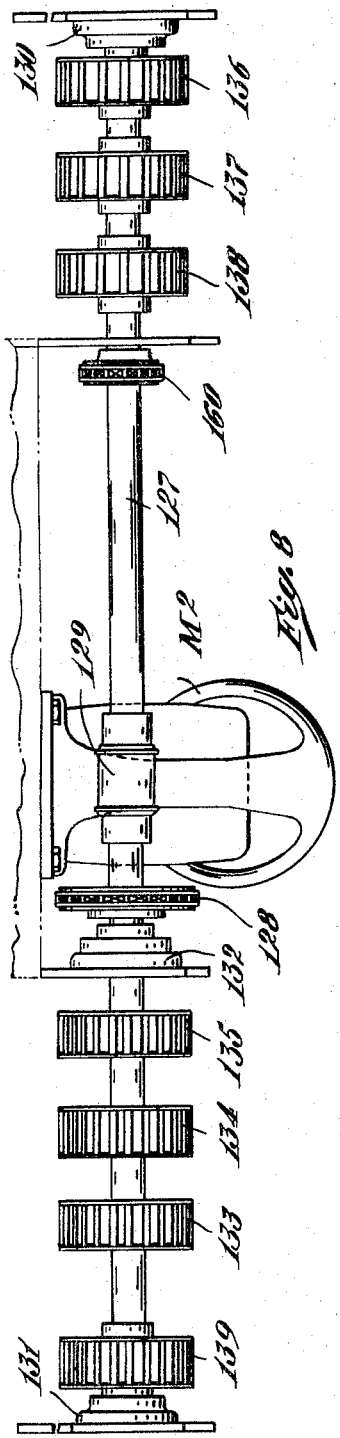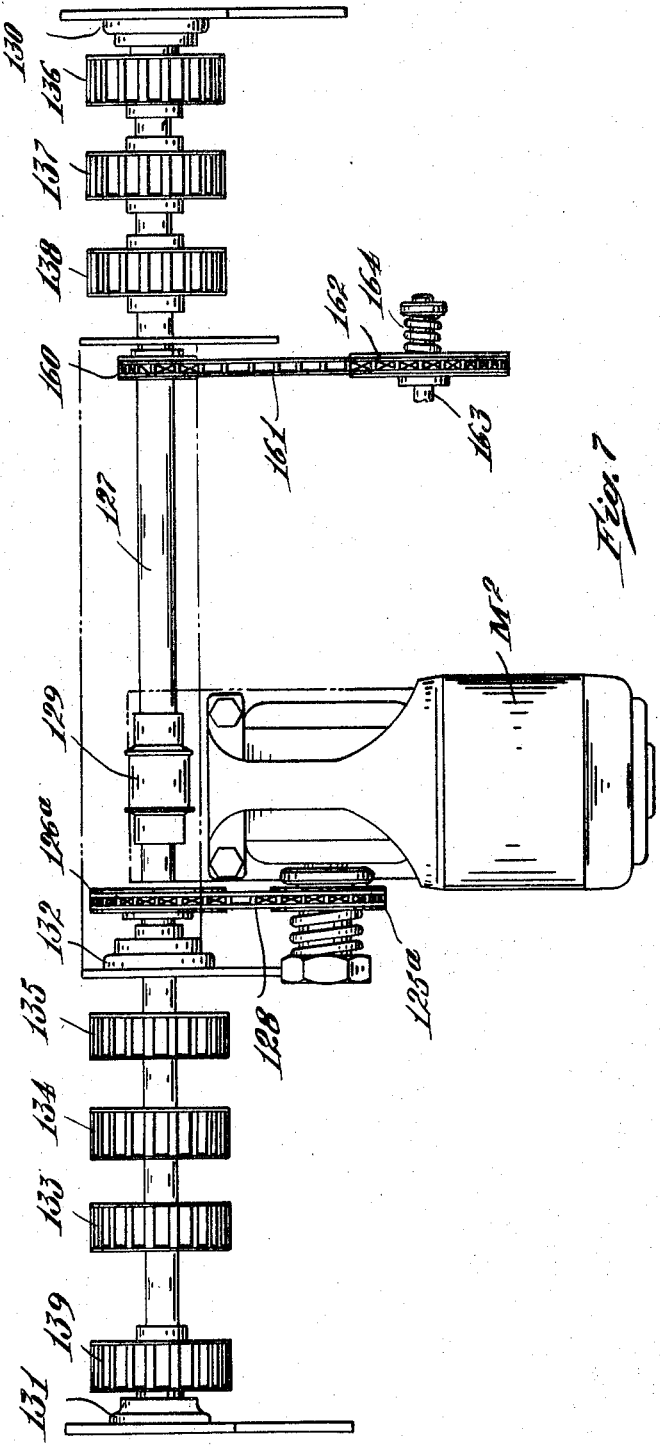

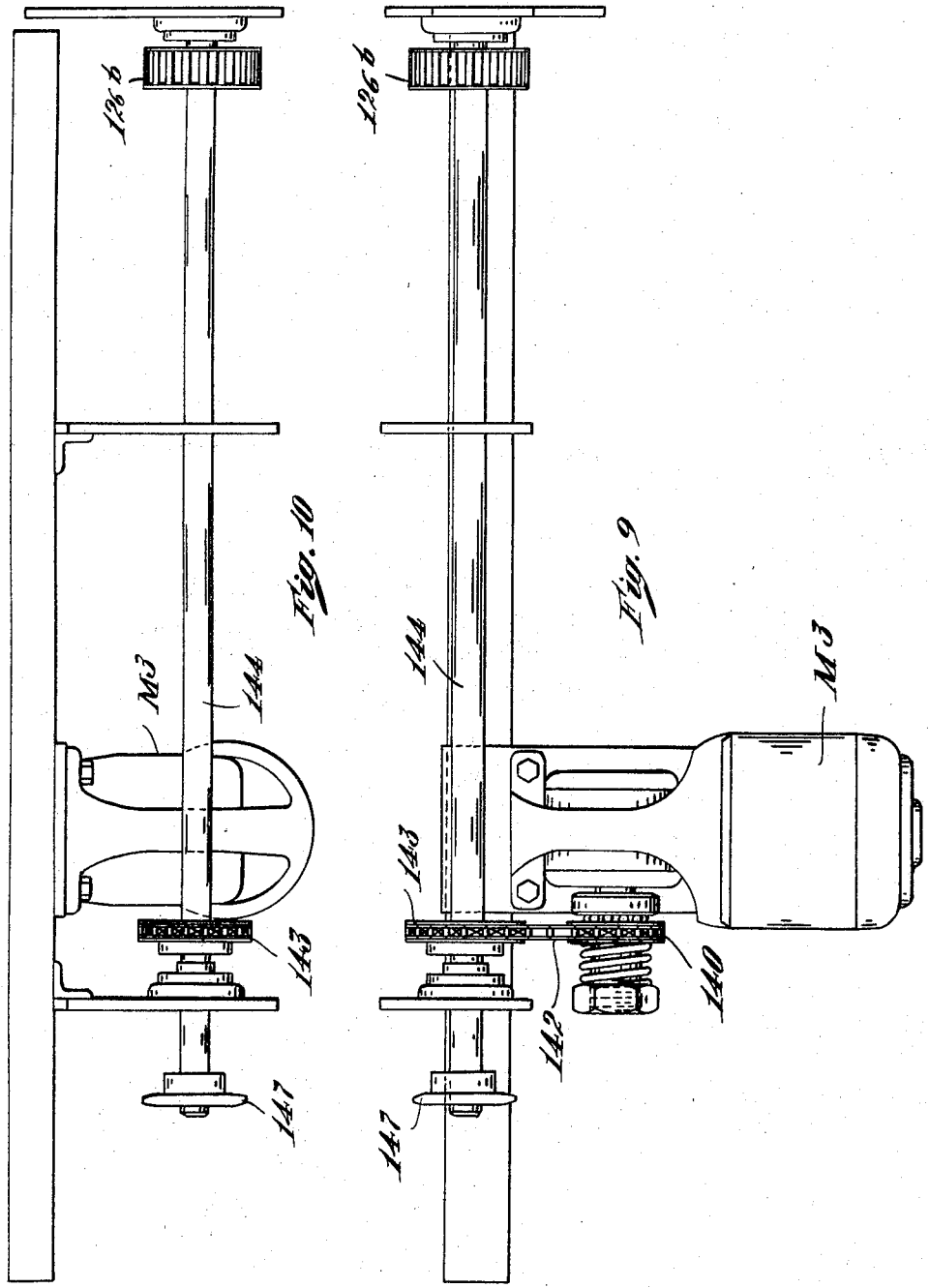

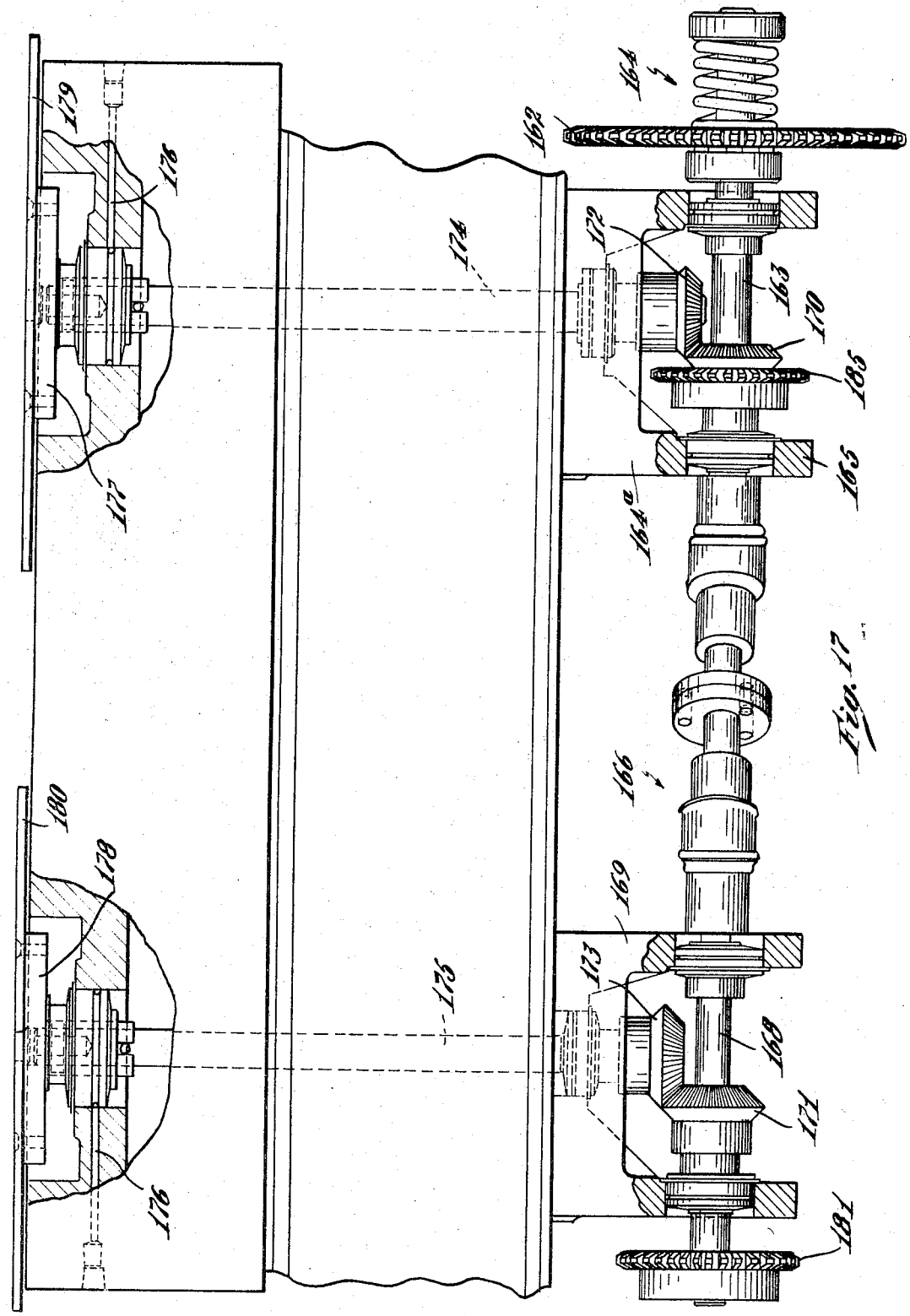

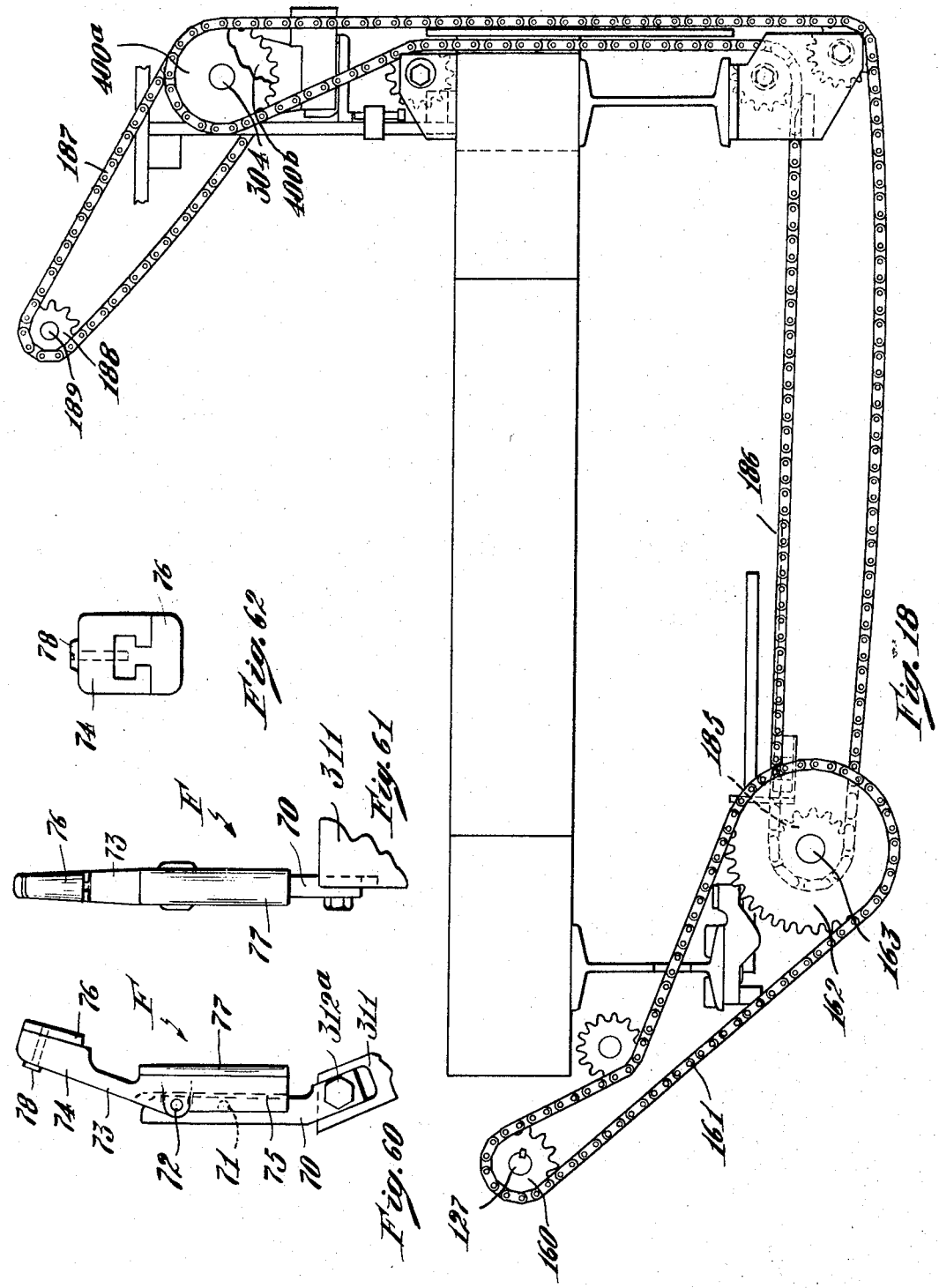

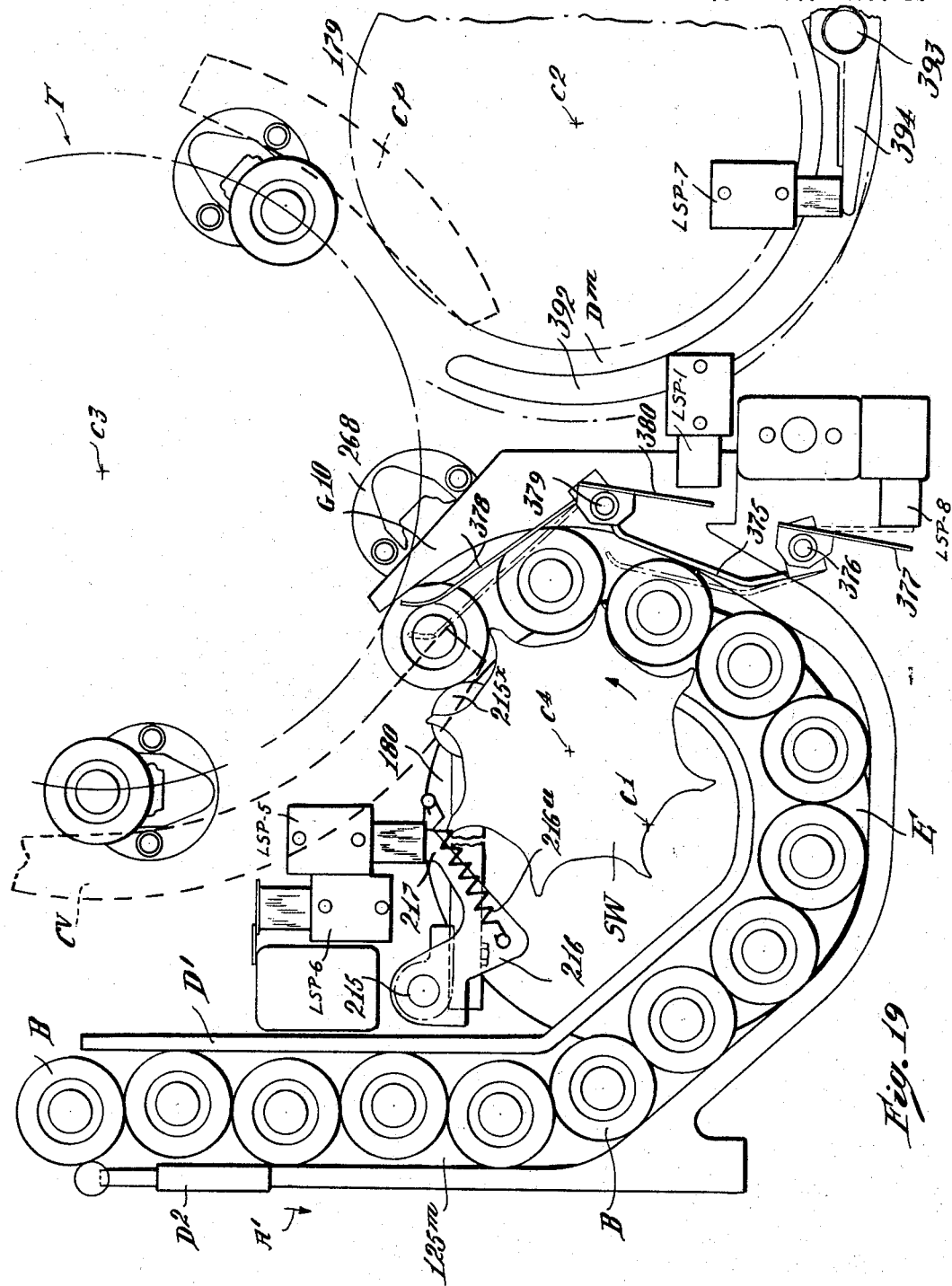

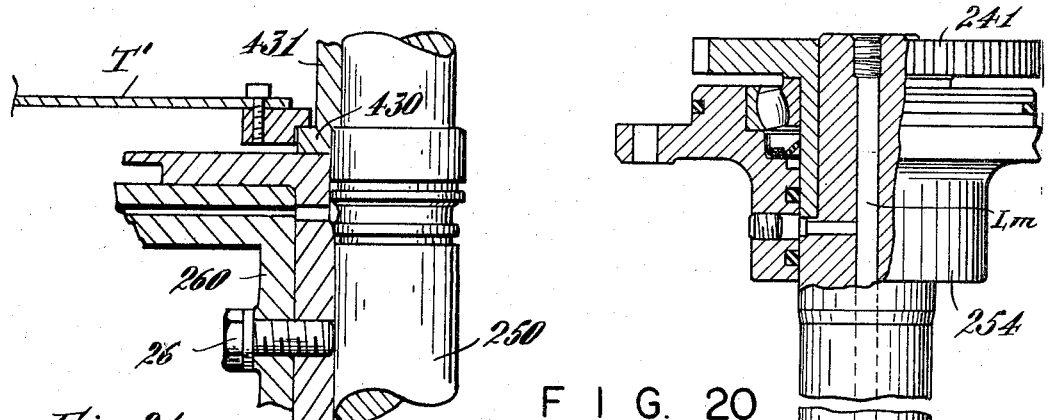
Fig. 21  FIG. 20
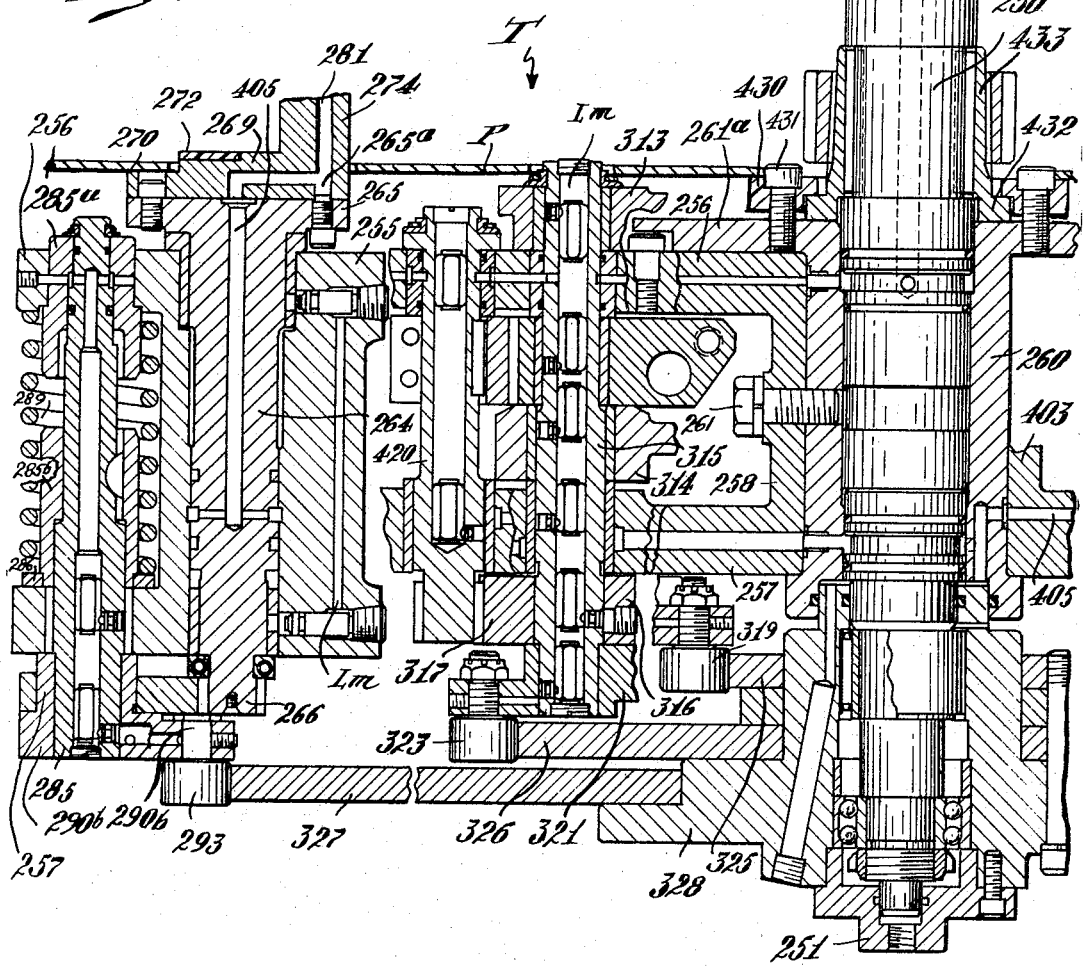

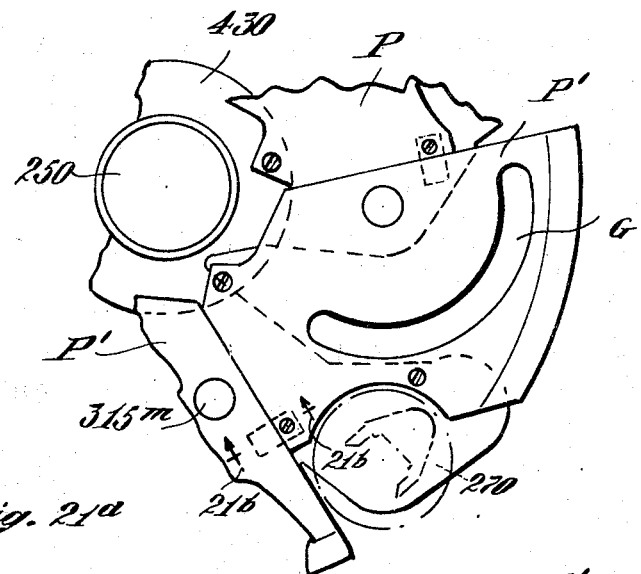
Fig. 21a
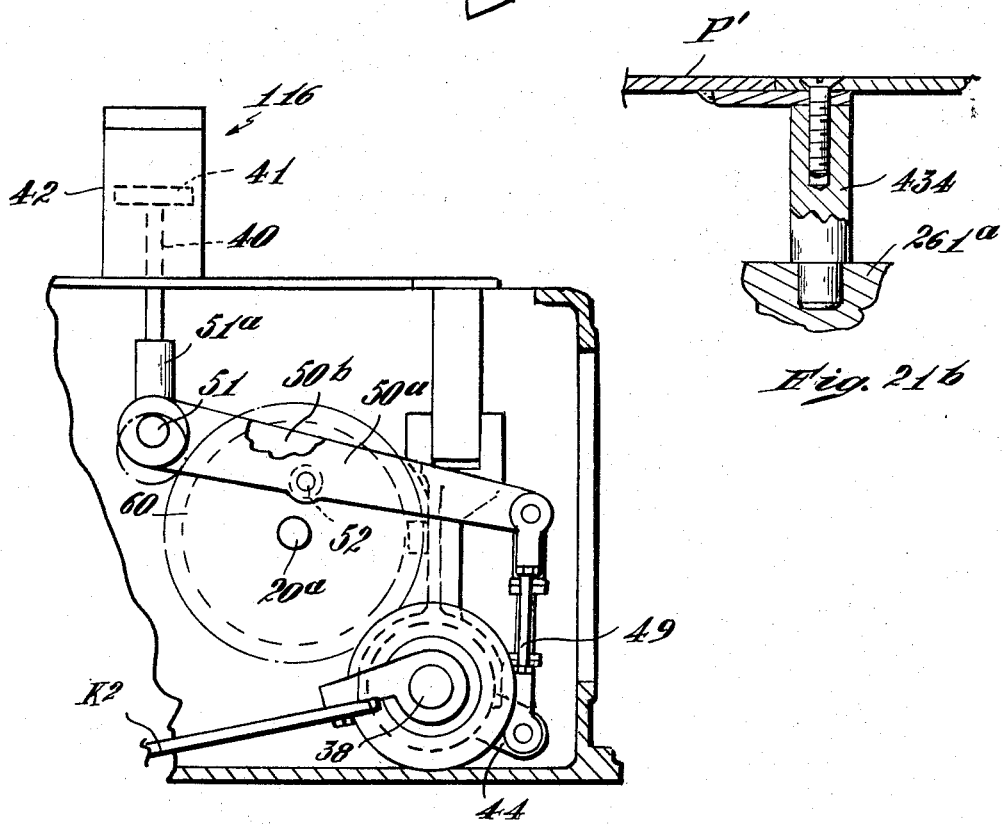
Fig. 21b
Fig. 22

Nov. 21, 1967  S. T. CARTER  3,354,016
ROTARY-TYPE LABELING MACHINE
Filed Oct. 1, 1963  39 Sheets-Sheet 15
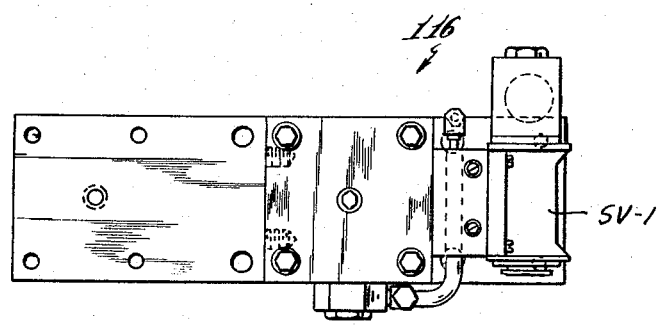
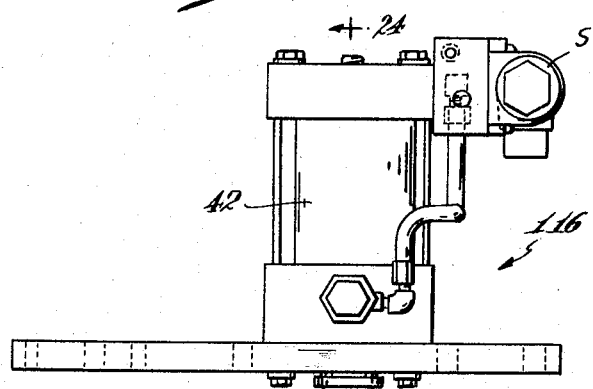
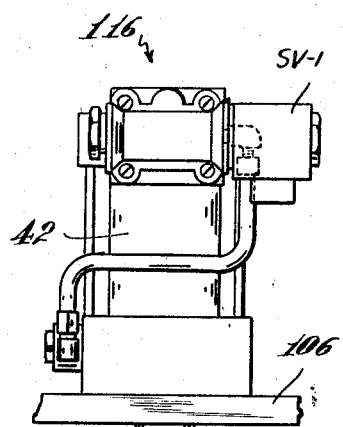
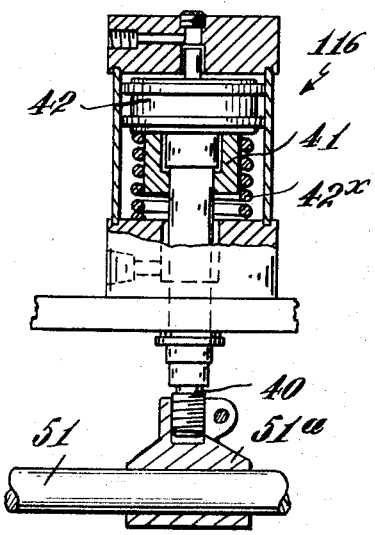
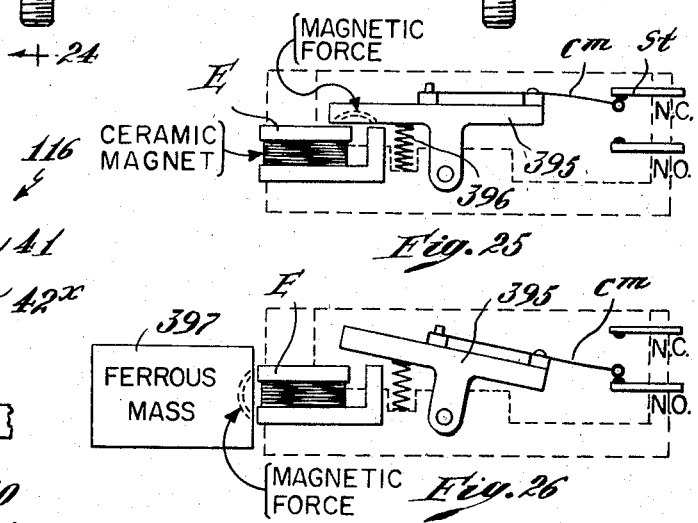
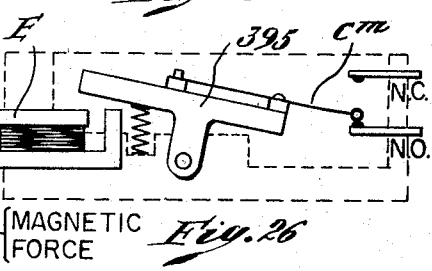

Nov. 21, 1967  S. T. CARTER  3,354,016
ROTARY-TYPE LABELING MACHINE
Filed Oct. 1, 1963  39 Sheets-Sheet 17

Nov. 21, 1967  S. T. CARTER  3,354,016
ROTARY-TYPE LABELING MACHINE
Filed Oct. 1, 1963  39 Sheets-Sheet 19

| RELAY ENERGIZED | SPEED |
|---|---|
| NONE | LOW |
| CR-4 | INT. |
| CR-5 | INT |
| CR-4 & CR-5 | RUN |
| CR-4, CR-5 & CR-6 | RESERVE |

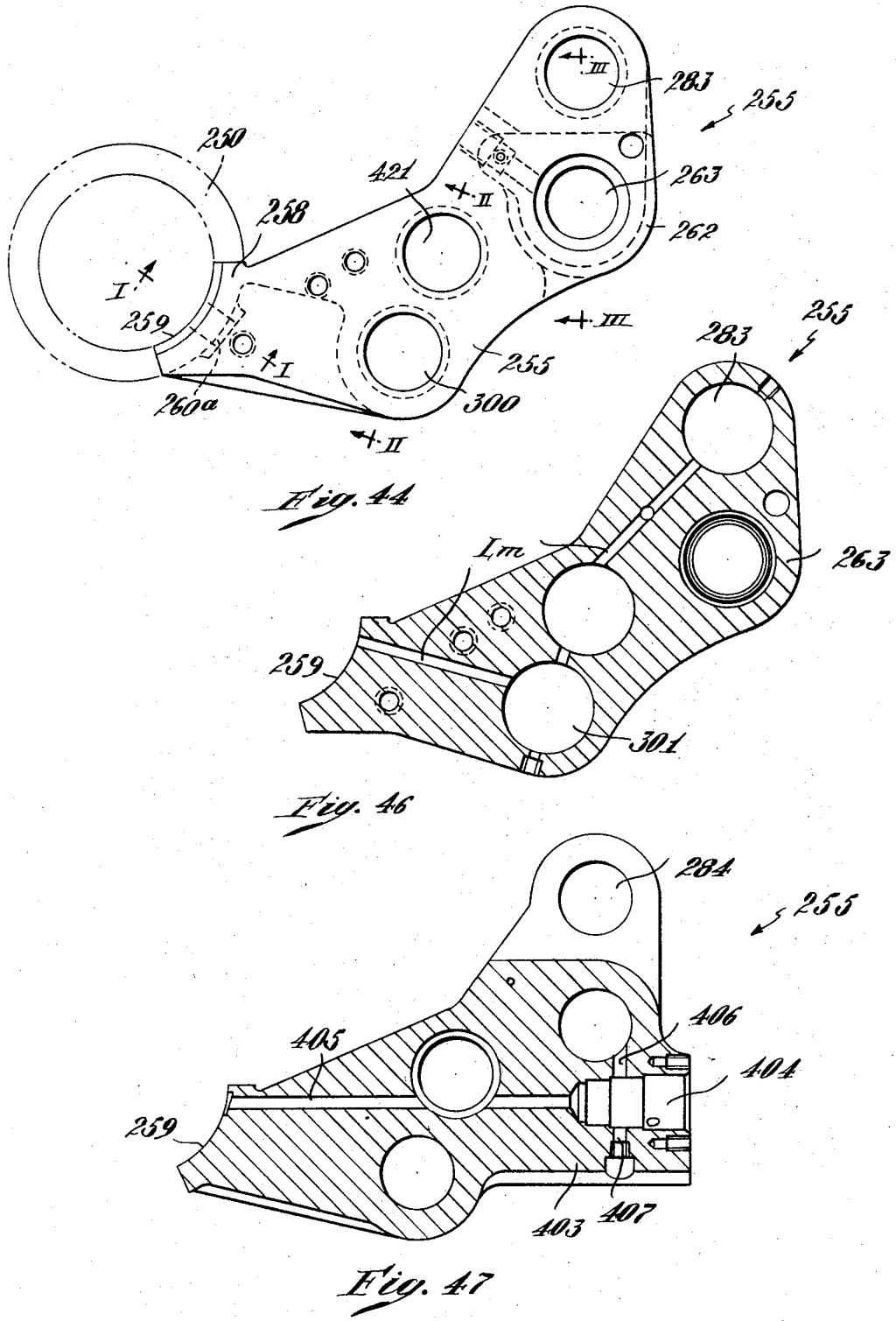

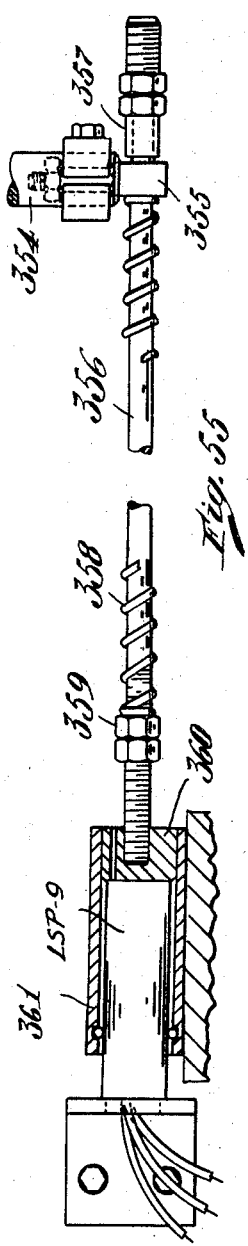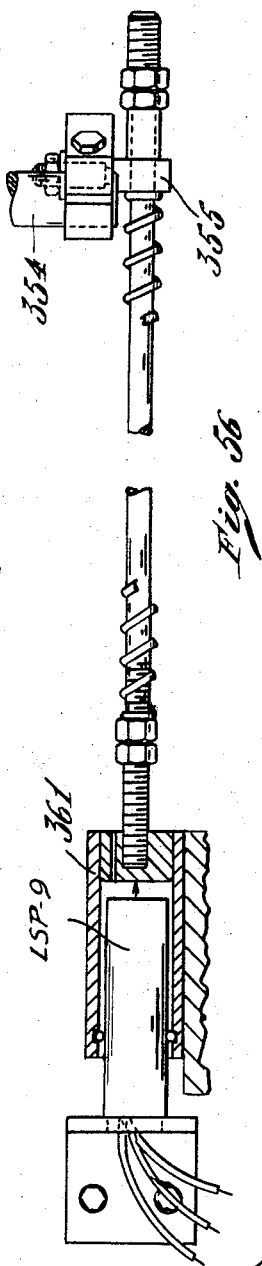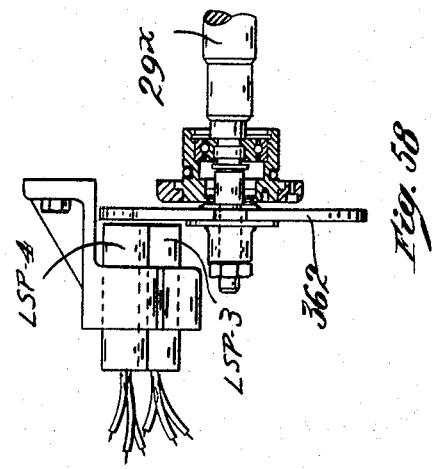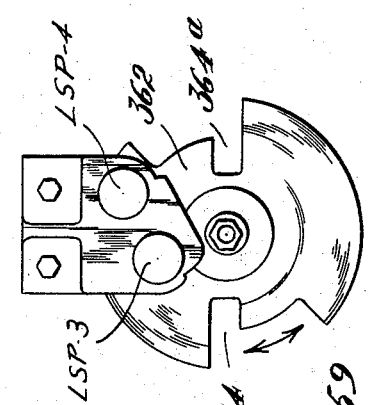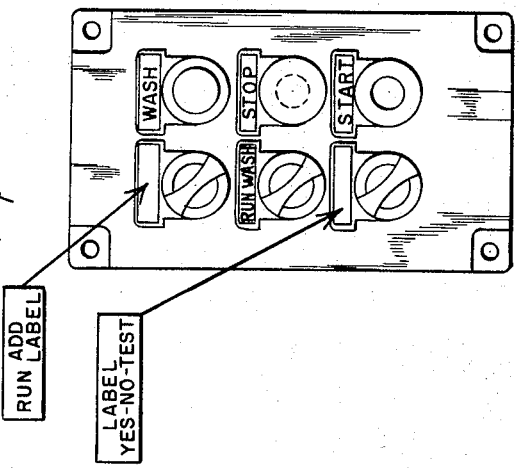

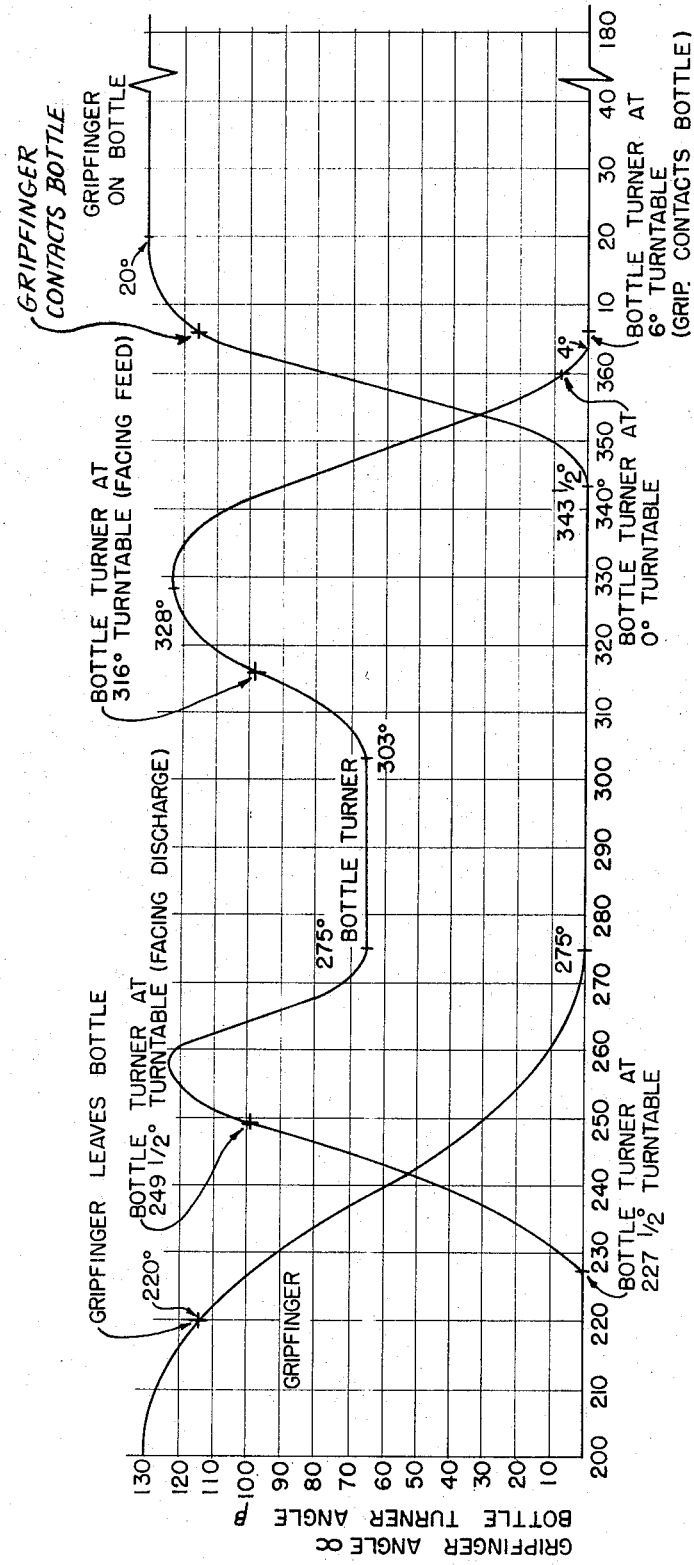

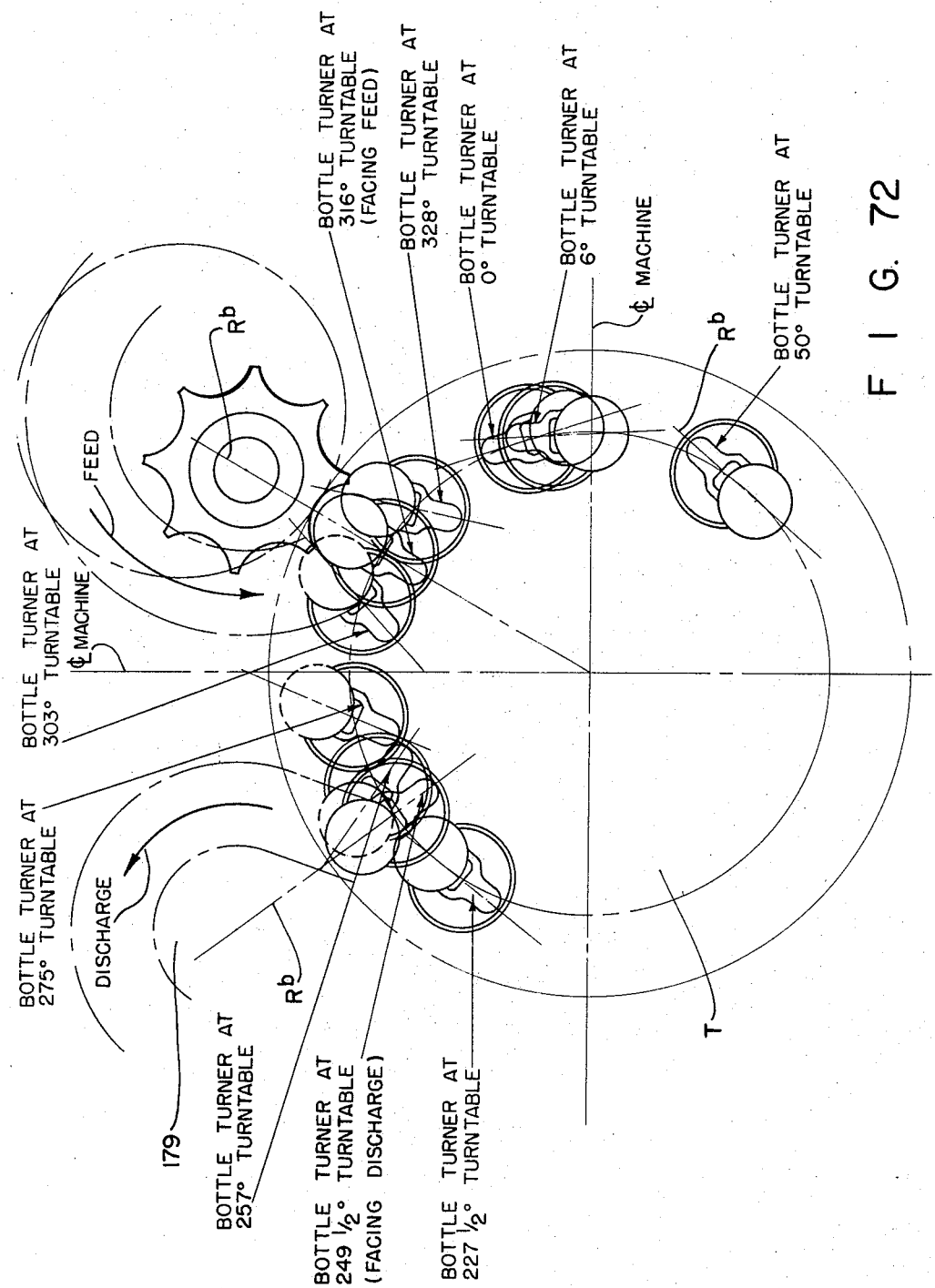

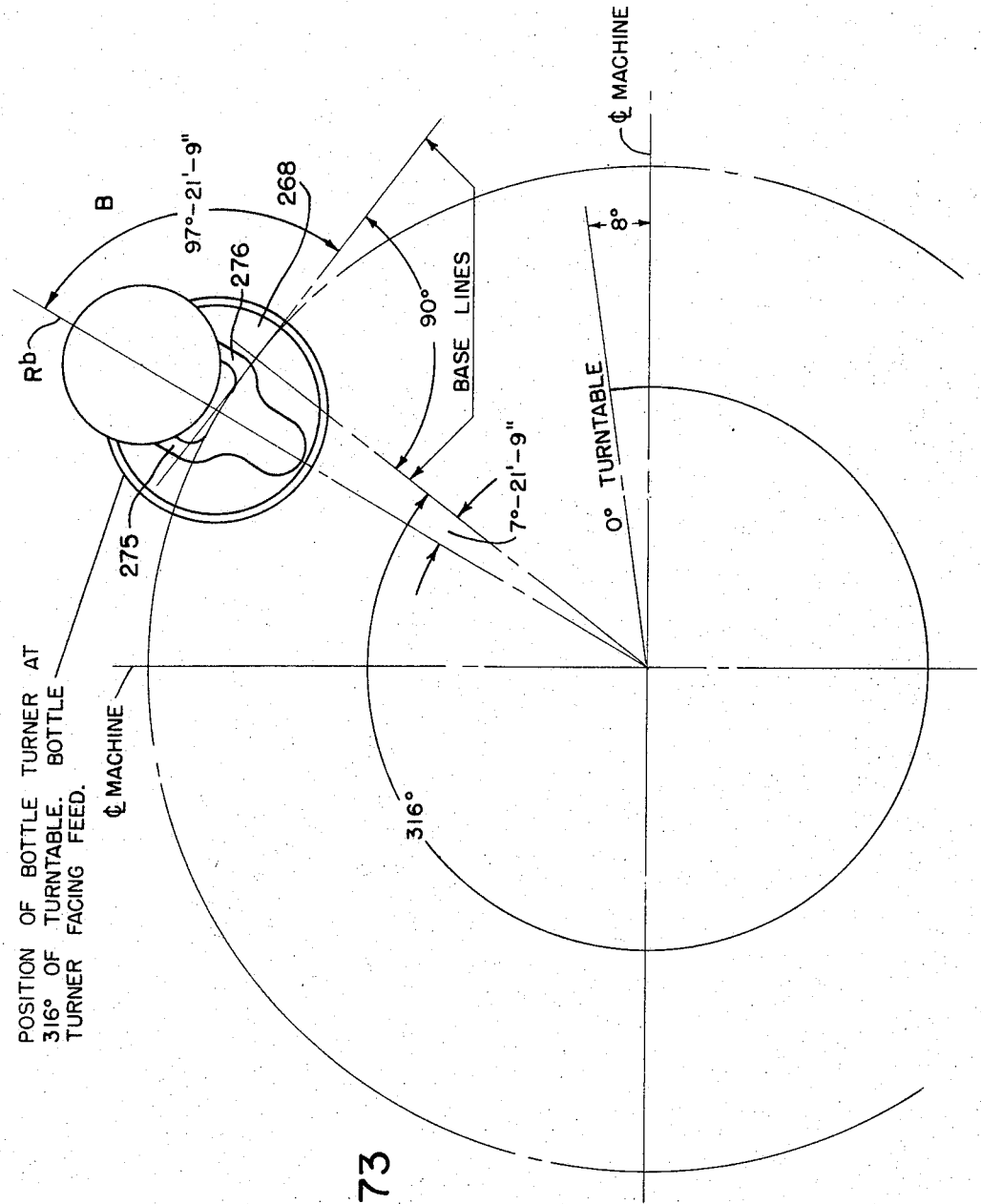

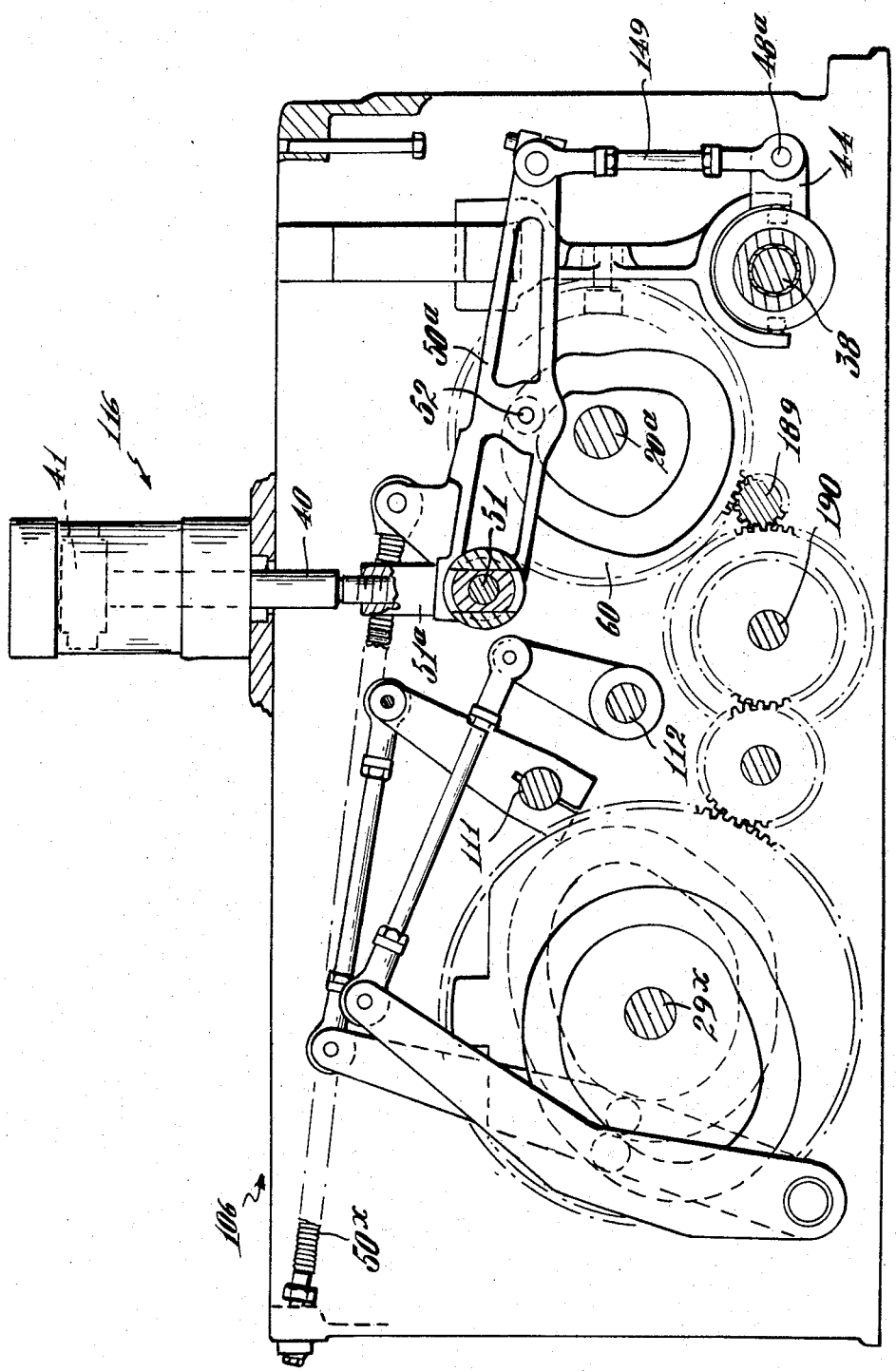

United States Patent Office 3,354,016
Patented Nov. 21, 1967

3,354,016
ROTARY-TYPE LABELING MACHINE
Sidney T. Carter, Shrewsbury, Mass., assignor to Geo. J. Meyer Manufacturing Co., Cudahy, Wis., a corporation of Wisconsin
Filed Oct. 1, 1963, Ser. No. 313,070
34 Claims. (Cl. 156—363)

This invention relates to labeling machines of the rotary type wherein each article to be labeled is mounted on a rotatable carrier constituting a part of a turntable which turns about a vertical axis and wherein each article carrier is provided with a back-rest for holding the article upright as it is advanced along an arcuate path by the rotation of the table, and wherein, as the article advances, it contacts the adhesively-coated surface of a label (so held by a picker that it extends transversely across the article path), and wherein a clamping device or grip-finger presses the central portion of the label against the article as the latter contacts the label and holds the label in contact with the article as the latter advances into and through the field of action of wiping means operative to press the end portions, at least, of the label into contact with the article. The invention relates more especially to novel means whereby production may be increased as compared with that of most prior labeling machines of this general type and, in particular, to novel means for controlling the article, as it is transferred from the supply conveyor means to the rotating table and also as it is being discharged from the table after receiving a label, as well as novel means for supporting the article on the table and for co-ordinating its motion with that of the grip-finger device.

One of the problems encountered by the designer of a high-speed labeling machine is that of preventing an article being labeled, for example a bottle filled with liquid, from tipping and falling before, during or after the labeling operation, with resultant breakage of bottles and/or the occurrence of a jam with consequent loss of production or of even damage to the machine parts. This problem becomes especially acute when designing a machine of the rotary type in which the article to be labeled is moved through the field of action of the label-applying means while standing upright on a rotating turntable, for not only must centrifugal force be compensated for in some manner after the article has once been placed upon the rotating table, but there is the further difficulty of so delivering the article to the rotating table that it will not fall and cause a smash before it can so firmly be secured to the table that it will not tip while undergoing the labeling operation itself or while, after receiving a label, it is being discharged from the machine.

Commonly, the article to be labeled, for example a bottle, is brought to the labeling machine from a supply by a conveyor, commonly, of belt-type, and the articles to be labeled are delivered to the labeling machine, one-by-one, in spaced relation by a rotating star wheel or the like. Usually the turntable of the labeling machine is provided with a plurality of spaced "pusher" devices operative, by contact with an article standing on the table, to propel the article in an arcuate path through the label-receiving zone. Usually this pusher device is so shaped, for example, by having a concave face for contact with the curved surface of a bottle, as to afford a degree of steadiness to the article such as to reduce the tendency of the article to tip. In most rotary-type machines of this kind, the gummed label is held, by its ends, stretched across the path of the advancing article so that its gummed surface is contacted by the advancing article, whereupon a gripper or clamping element contacts the ungummed face of the label and presses it against the article while concomitantly clamping the article against the pusher device and thus holding it firmly while the ends of the label are being wiped into adhesive contact with the article. In some machines of this type, mechanical means is provided for clamping the article against the pusher before the article reaches the label-receiving point, but this means a complication in the mechanism, with added additional cost of production of upkeep.

Usually the pusher device is a part which is fixed to the turntable and thus moves at the same angular velocity as the turntable, and that face of the pusher device which is to contact the article must, for the performance of its intended function, face in the direction of rotation of the turntable. As above noted, the articles to be labeled are supplied by a conveyor from which they are delivered to the turntable by a rotating star wheel or the like. It is obvious that if the star wheel were to turn oppositely to the rotation of the turntable, so as to discharge the article into the path of the oncoming pusher, the article and pusher would be moving in approximately opposite directions at the time of impact. This could hardly be permissible because of the danger of breakage. On the other hand, if the star wheel turns in the same direction as the turntable, the article, when leaving the star wheel, will ordinarily be moving in a path which, while it may intersect the path of the oncoming pusher, will have a component of motion in a direction making a substantial angle with the direction of motion of the pusher, with resultant danger that the article will tip at the instant of impact if not before. Moreover, there is a substantial interval of time during which the article is moving from the star wheel to the pusher in which it is wholly free to tip.

In an attempt to overcome these difficulties, it has heretofore been proposed to provide a pusher device so movably mounted on the turntable that it might temporarily be faced toward the path of an article ejected by the star wheel and then turned back to the proper position of orientation in which to propel the article toward the labeling zone. However, such arrangements have not sufficiently reduced the force of impact when the article encounters the pusher to eliminate the possibility of breakage, while the turning of the pusher back to face in normal position, after encountering the article, tends to disengage the article from the pusher by centrifugal force with consequent tipping of the article and resultant damage.

A primary object of the present invention is to provide a machine of the rotary type so devised as to avoid the above difficulties, that is to say, to provide means whereby the article to be labeled, in leaving the star wheel, is picked up by a pusher device, herein referred to as an "article carrier," in such a manner as substantially to eliminate any dangerous impact force, while, at the same time, to provide a means for positively pulling the article into firm engagement with the carrier such as substantially to prevent the article from tipping during transfer from the star wheel to the carrier, or at first contact with the carrier, or as the carrier continues in motion with the table while carrying the article through the label-applying zone.

A further object is to provide effective means to prevent the labeled bottle from tipping as it is discharged from the turntable.

A further object of the invention is to provide a labeling machine which occupies relatively little space as compared with prior machines of commensurate productive capacity. A further object is to provide a rotary labeling machine of a design such as to facilitate its installation as one of a series of such machines, all designed to receive articles from the same supply conveyor means and to deliver the labeled articles to the same delivery conveyor means. Further objects are to provide a machine comprising novel speed-control means; novel label-wiping means; novel means responsive to the presence or advance of an article, in readiness to be labeled, for determining the speed of the machine and the action of the picker; push button control of the machine; novel safety devices; novel means for keeping the gum box supplied with glue; a machine which is readily adaptable for labeling articles of different size; novel grip-finger devices and means for actuating them; a novel turntable; and means for controlling the grip-finger and article-carrier travel; a novel bottle carrier; wiping means of unusual efficiency thereby cutting down the requisite time for wiping the label; and novel means for driving the machine.

Hereinafter, for convenience but without limitation, the articles to be labeled may be referered to as "bottles."

Other and further objects and advantages of the invention will be pointed out in the following more detailed description and by reference to the accompanying drawings wherein:

FIG. 2 is an elevation, to larger scale, from the same point of view as FIG. 1, but with most of the casing removed;

FIG. 2a is a fragmentary section, to larger scale, on the line 2a—2a of FIG. 2;

FIG. 5 is a fragmentary side elevation, to smaller scale, showing a plurality of machine units, each, such as that of FIG. 1, arranged in tandem relation so as to be served by the same conveyor system;

FIG. 6 is a plan view of the parts shown in FIG. 5;

FIG. 7 is a fragmentary end elevation showing the motor and power-transmission means for driving the feed conveyors;

FIG. 8 is a fragmentary plan view showing the parts illustrated in FIG. 7;

FIG. 9 is an elevation showing the motor and power-transmitting means for driving the discharge conveyors and also the return conveyor which is associated with the feeding conveyor;

FIG. 10 is a plan view of the parts shown in FIG. 9;

FIG. 17 is a fragmentary elevation, to much larger scale, showing the drive connections between the article-presenting and delivery plates of a given machine unit;

FIG. 18 is a fragmentary elevation showing the motion-transmitting means whereby the gum-presenting roll is driven at low speed;

FIG. 19 is a diagrammatic fragmentary plan view, showing the star wheel which feeds the articles to the turntable together with associated parts;

Figure 4:
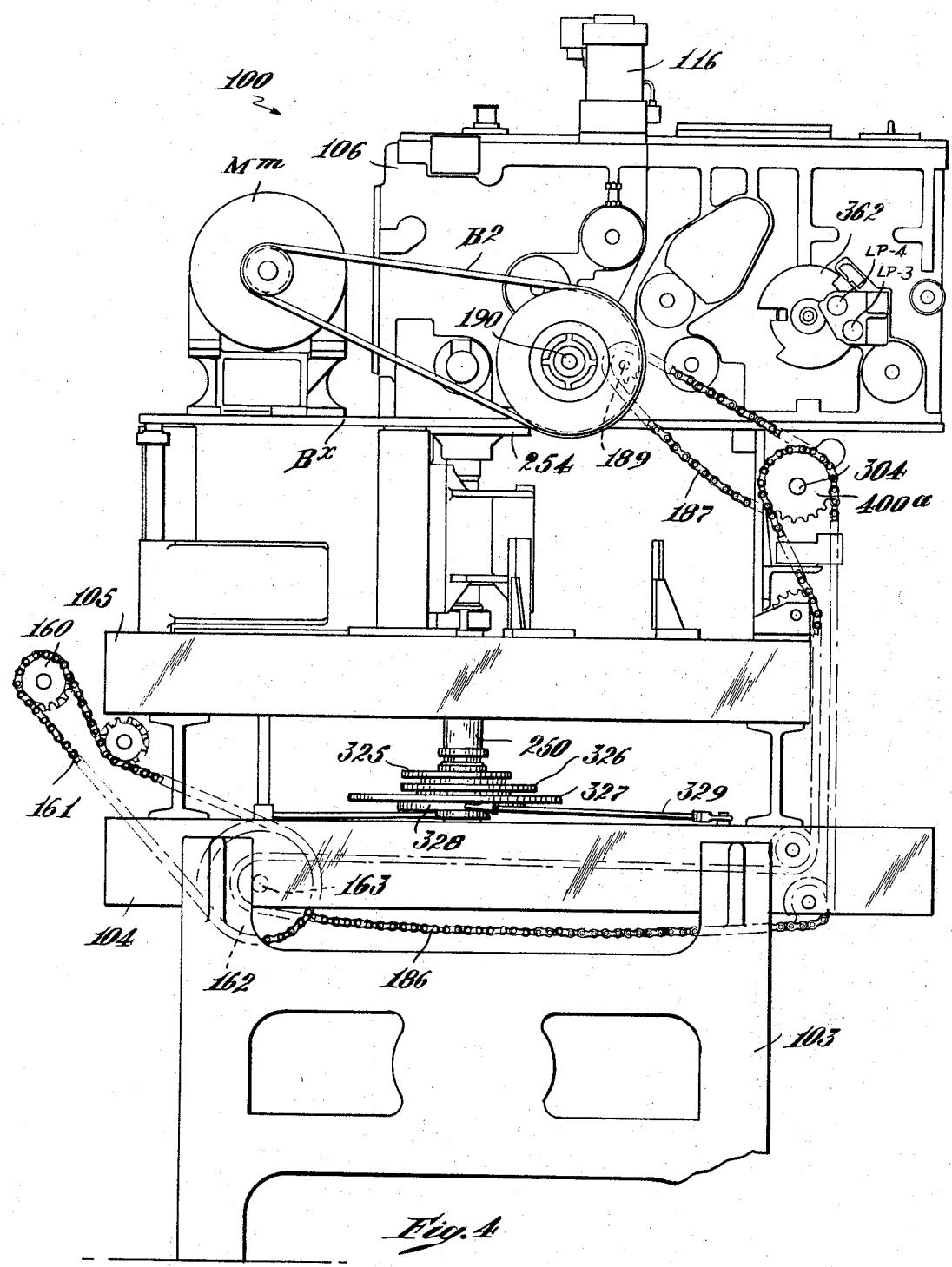
FIG. 4 is a rear-side elevation illustrating some of the drive connections.
Figure 40:
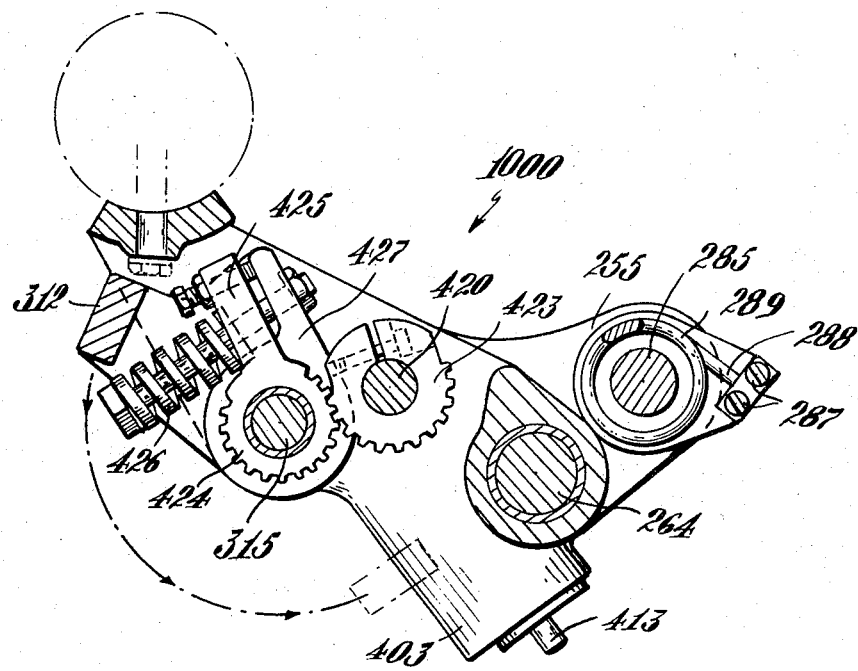
Figure 24A:
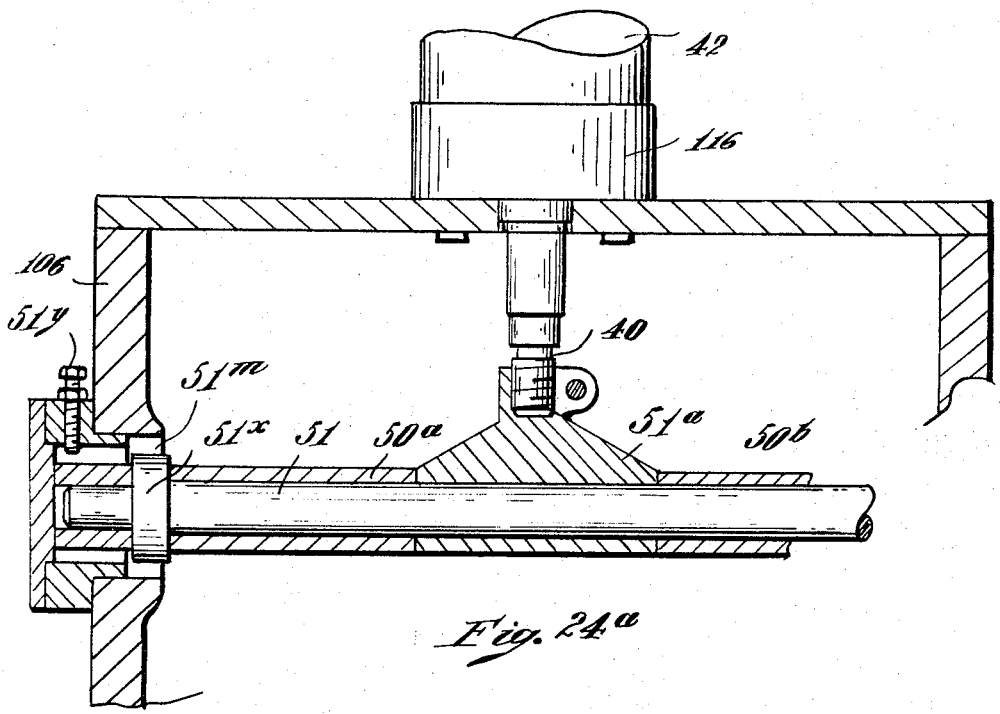
Figure 24D:
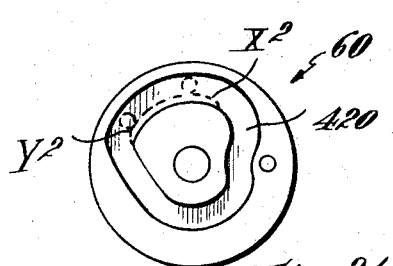
Figure 24E:
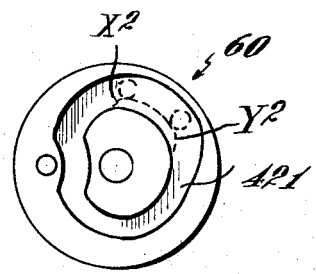
Figure 24B:
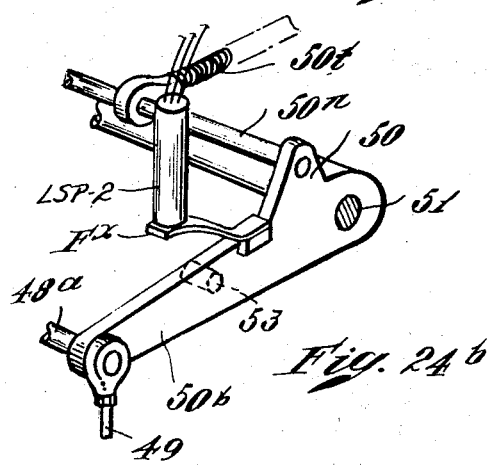
Figure 28:
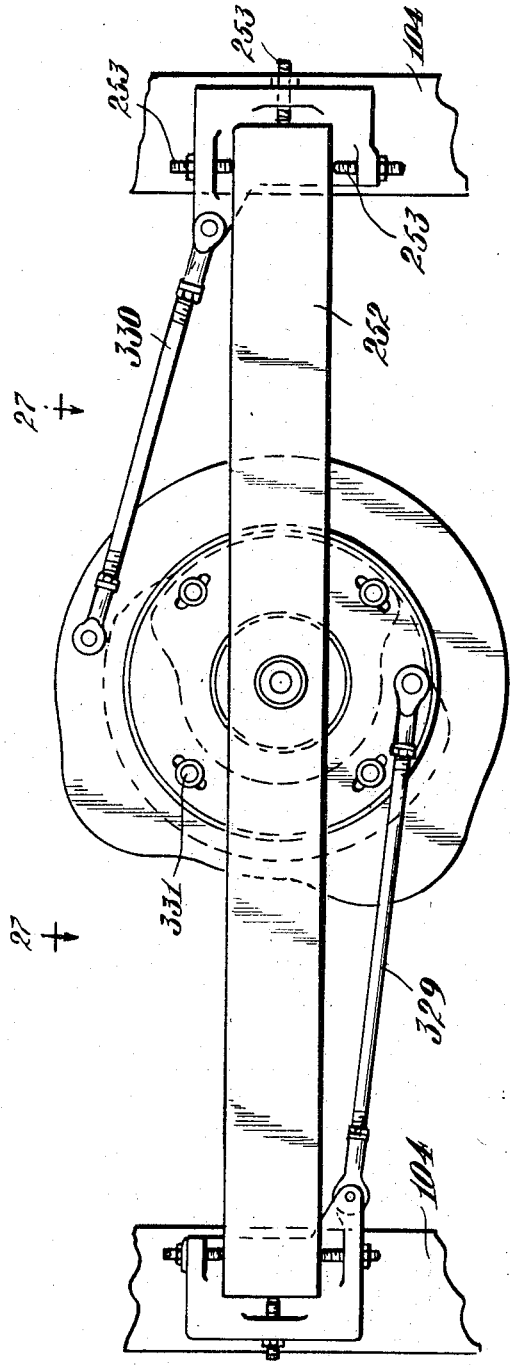
Figure 27:
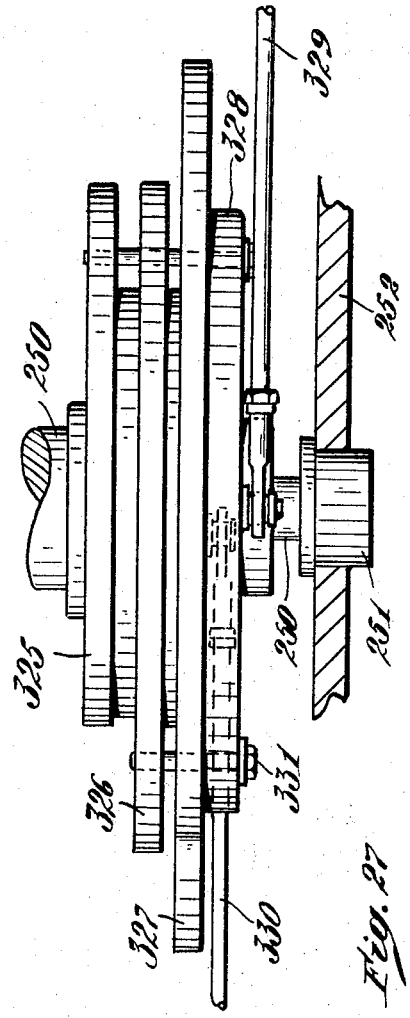
Figure 29:
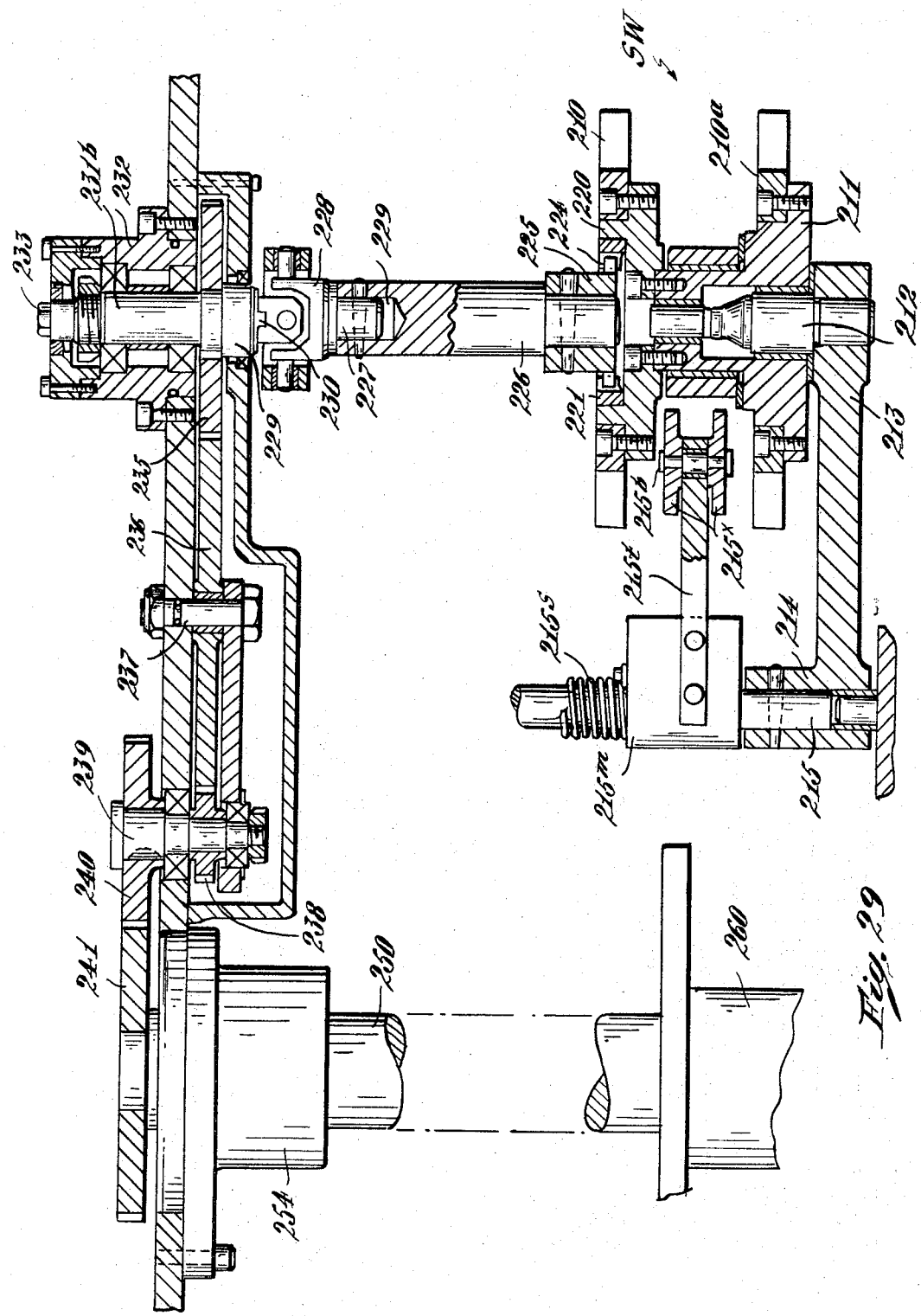
Figure 31:
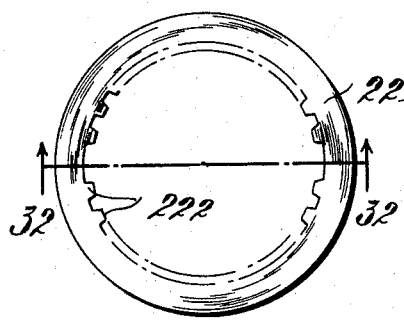
Figure 33:
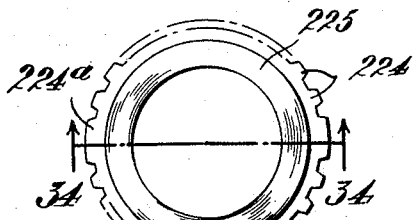
Figure 32:
Figure 34:
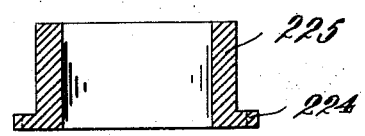
Figure 37:
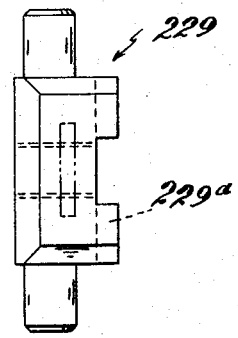
Figure 36:
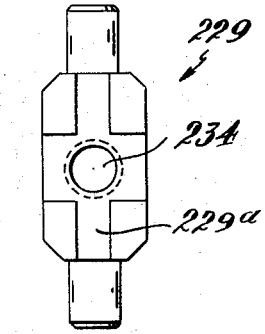
Figure 30:
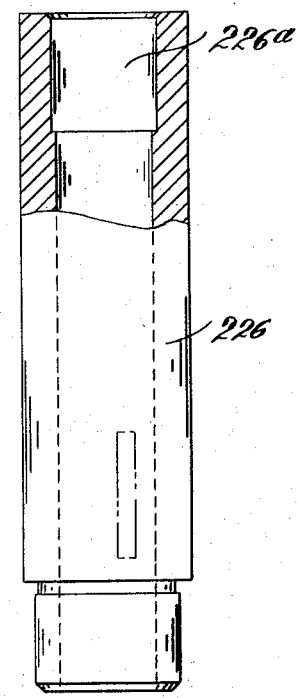
Figure 35:
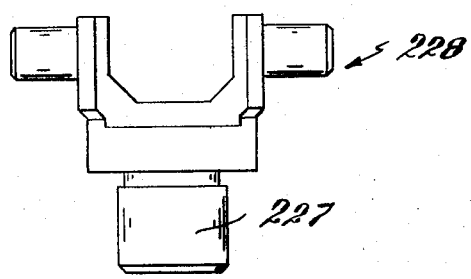
Figure 38:
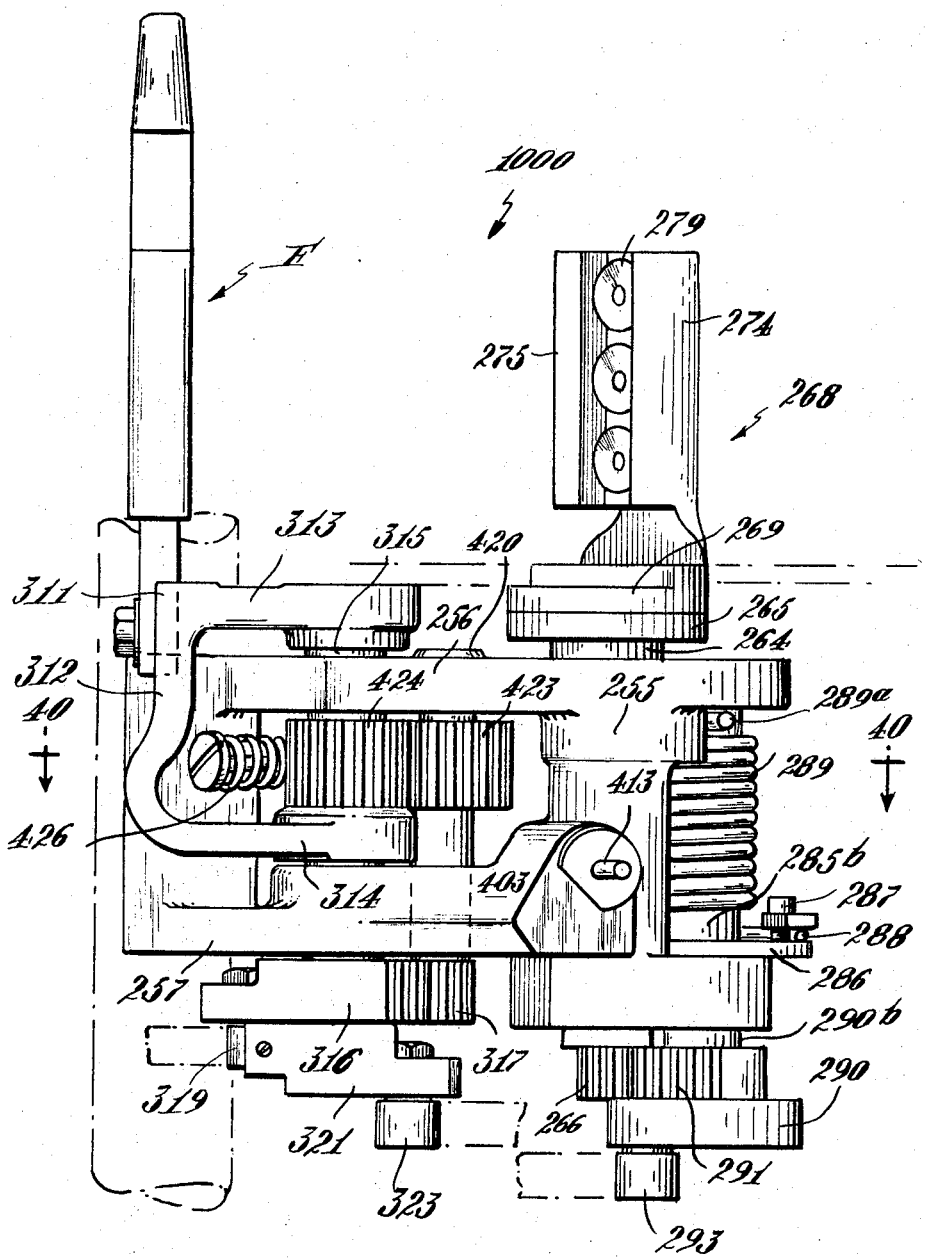
Figure 39:
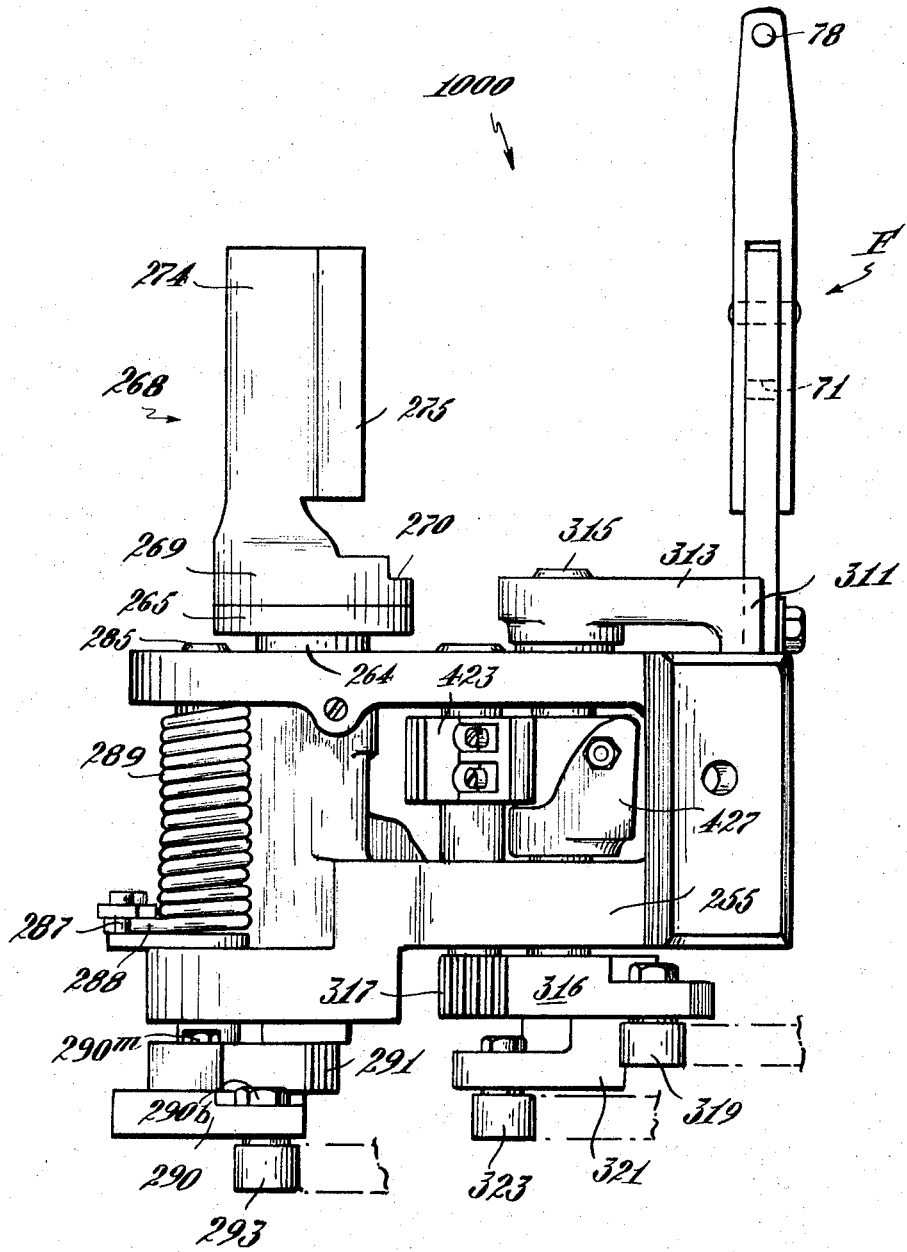
Figure 42:
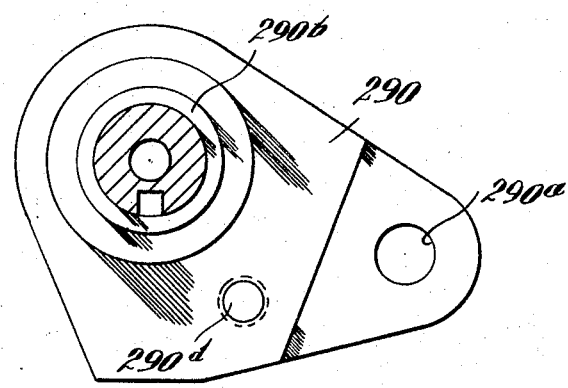
Figure 41:
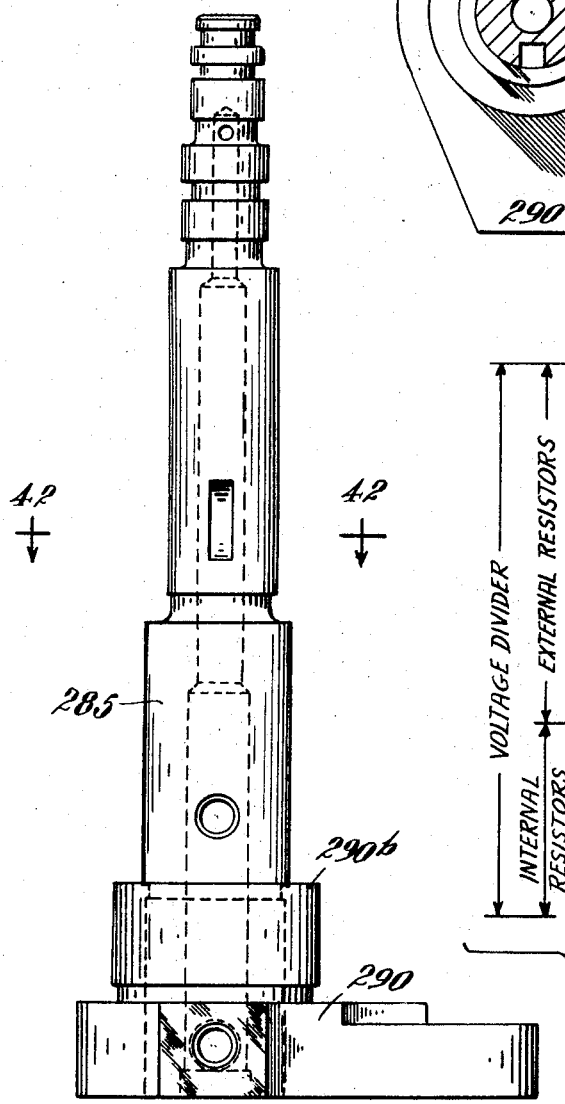
Figure 43:
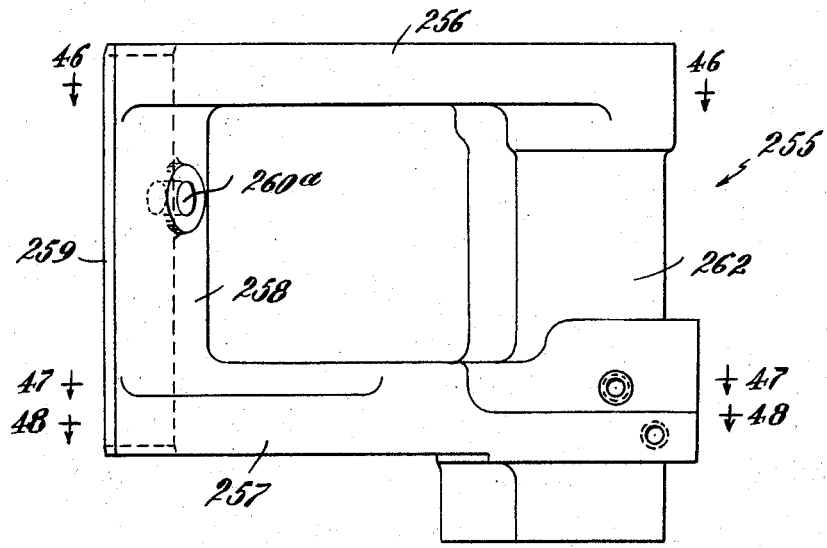
Figure 45:
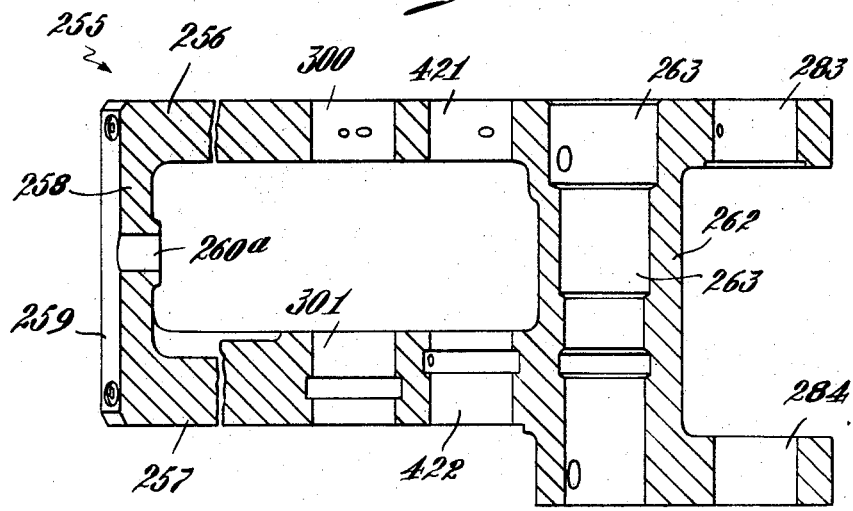
Figure 48:
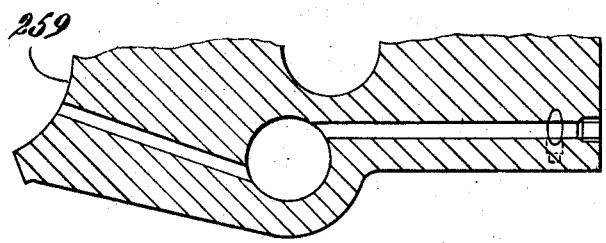
Figure 49:
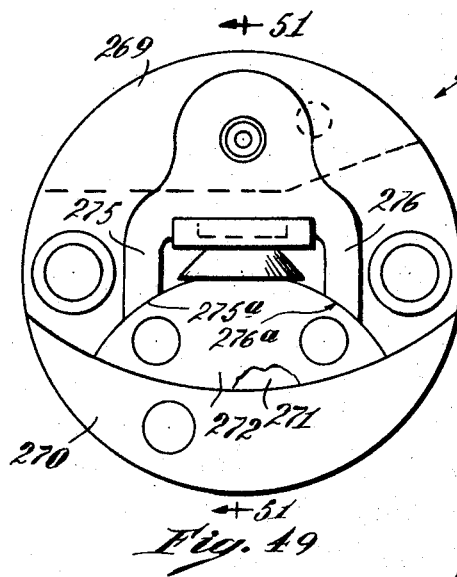
Figure 50:
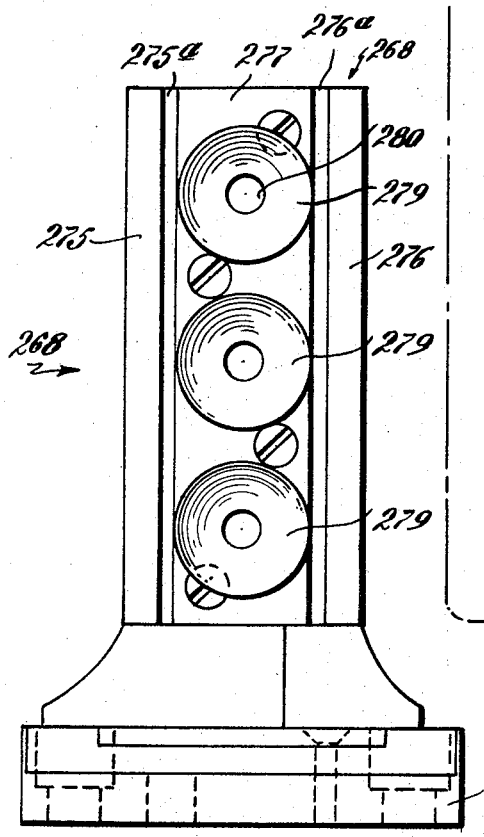
Figure 51:
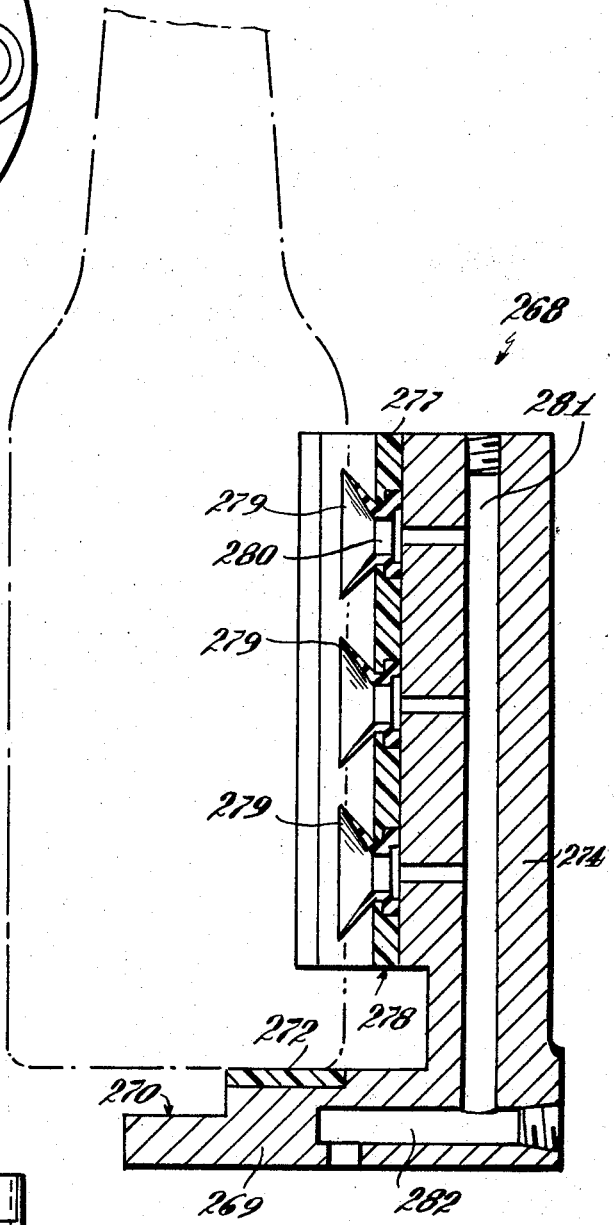
Figure 52:
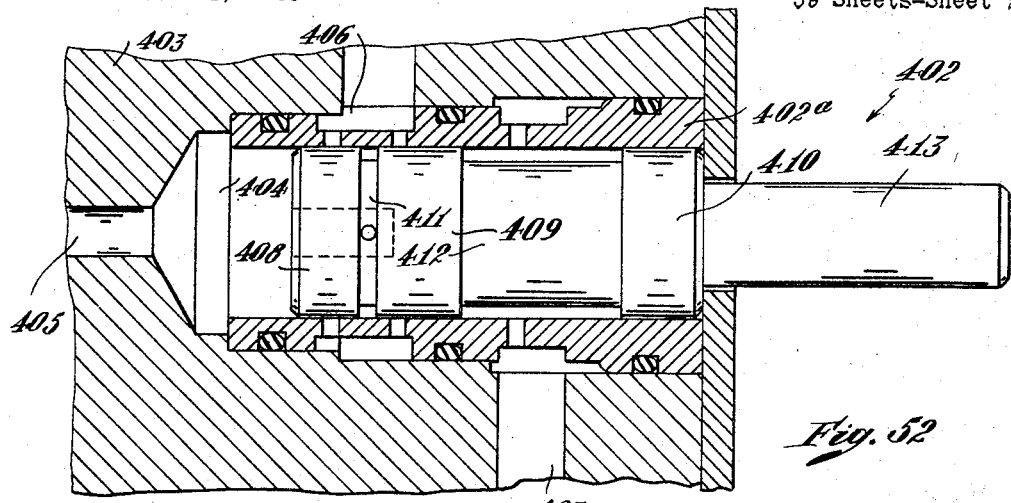
Figure 53:
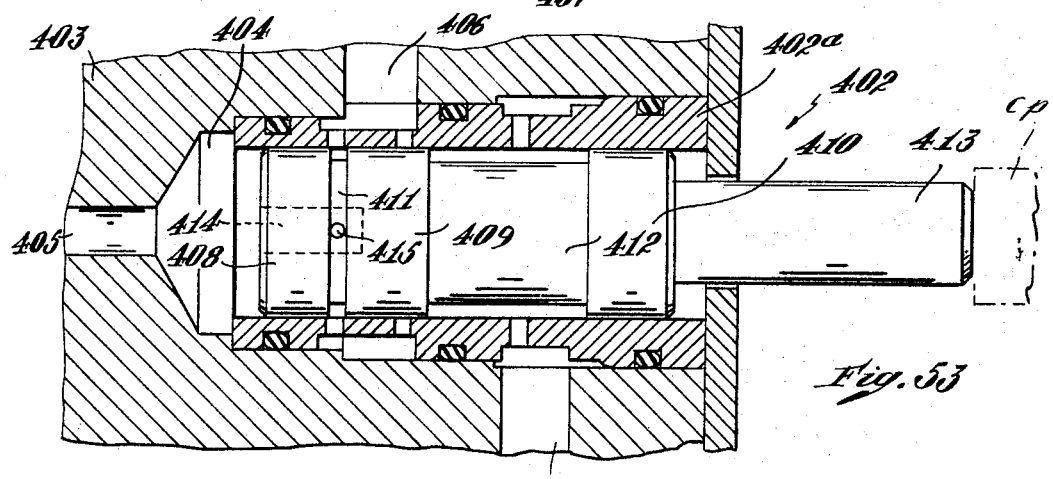
Figure 54:
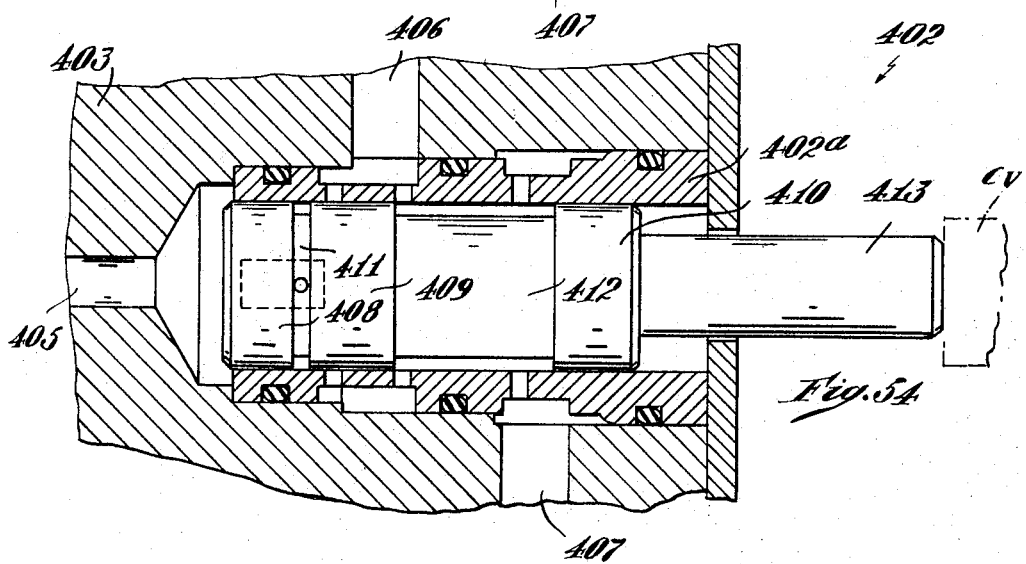
Figure 63:
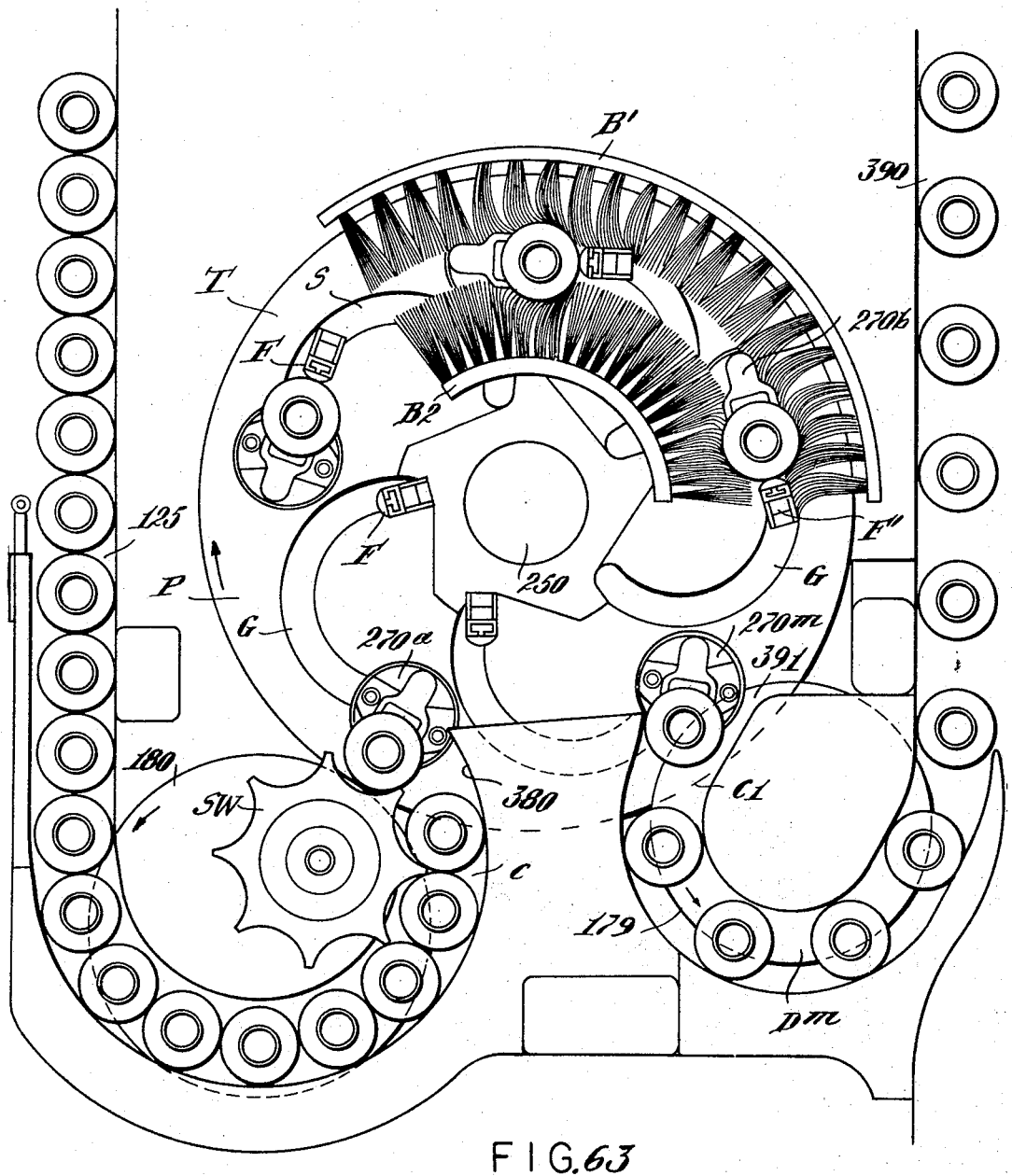
Figure 64:
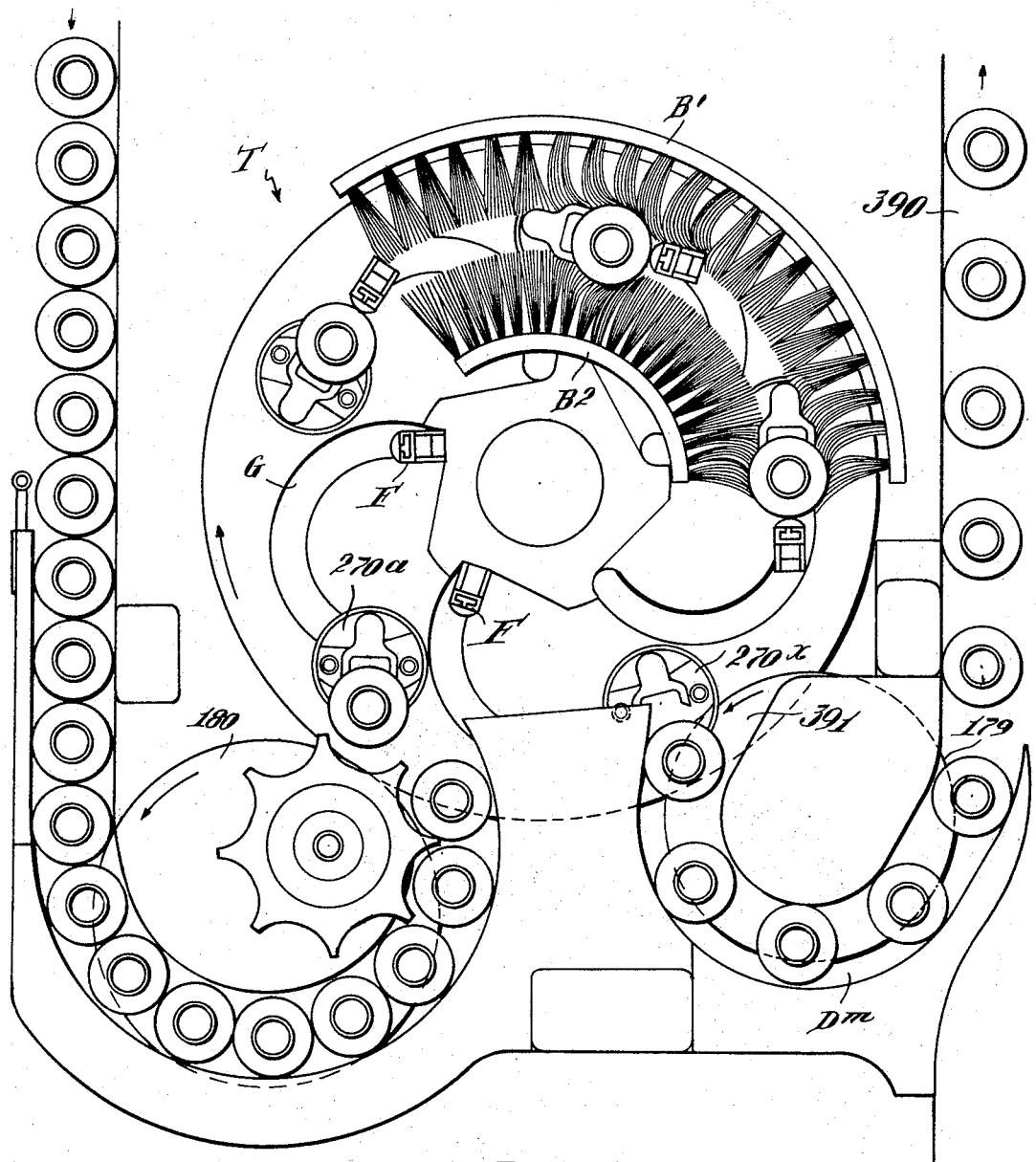
Figure 65:
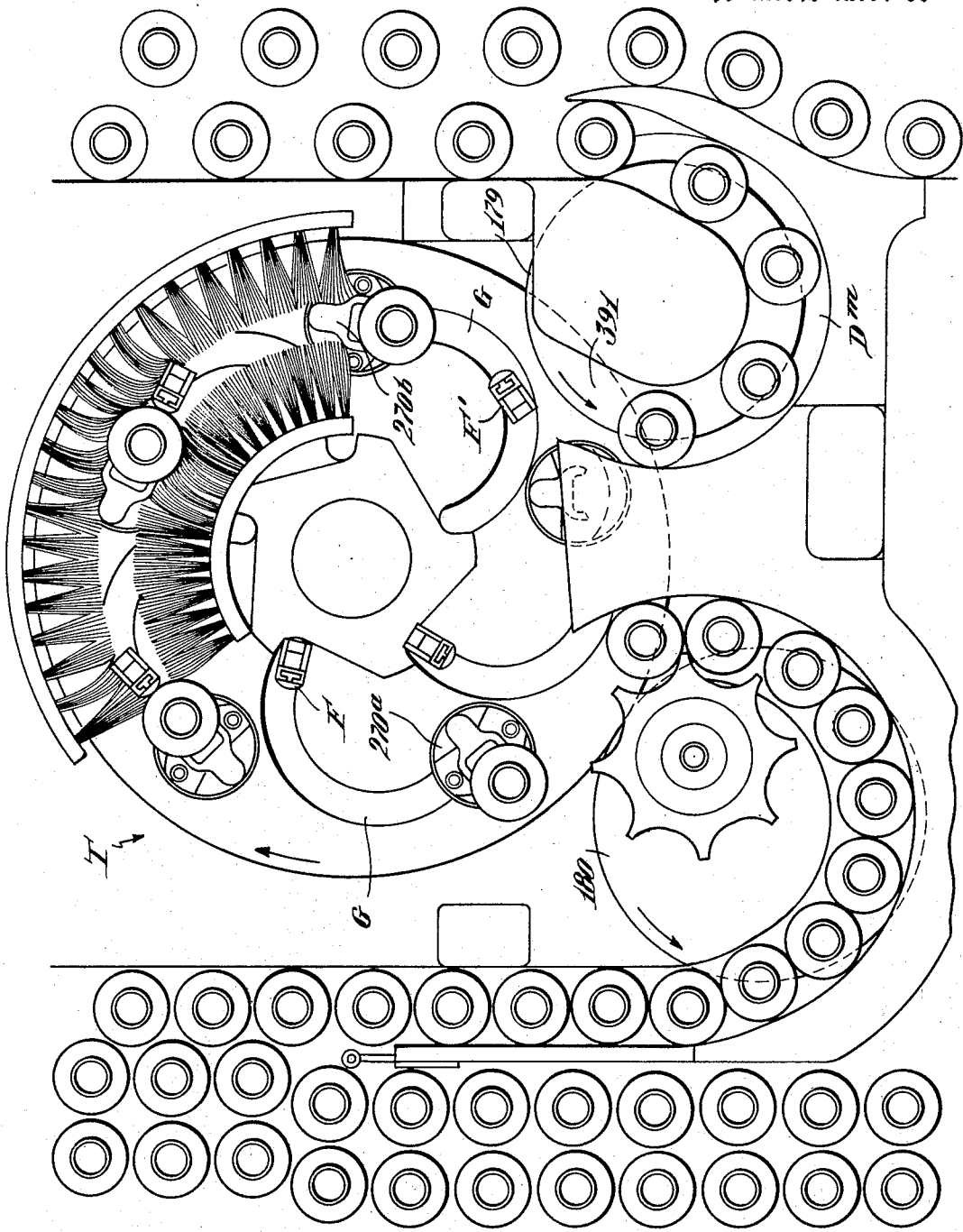

FIG. 20 is a broken vertical section, the right-hand portion of which is in a diametrical plane of the shaft which carries the turntable and on a radius, indicated by the line I—I of FIG. 44, which shows the frame of one of the bottle-holding units; the central portion of FIG. 20 being in a plane, indicated by II—II of FIG. 44, through the vertical axis of the shaft which carries the grip-finger assembly; and the left-hand portion of FIG. 20 being in a plane, indicated by the line III—III of FIG. 44, through the vertical axis of the shaft which supports the bottle carrier;

FIG. 21 is a fragmentary radial section through the upper part of the turntable, showing its shaft and one of the top plate segments;

FIG. 21a is a fragmentary plan view, showing some of the segmental top plates of the turntable;

FIG. 21b is a section, to larger scale, on the line 21b—21b of FIG. 21a;

FIG. 22 is a fragmentary vertical section, partly diagrammatic, showing means for modifying the action of the picker;

FIG. 23 is a plan view of a solenoid valve and fluid-pressure motor comprised in the means for modifying the operation of the picker;

FIG. 23a is an elevation of the device of FIG. 23, as viewed from the front side of the machine;

FIG. 23b is a rear elevation of the device of FIG. 23, as viewed from the right-hand side of FIG. 23a;

FIG. 24 is a fragmentary vertical section on the line 24—24 of FIG. 23a;

FIG. 24a is a fragmentary section at right angles to FIG. 24 and to larger scale, in the vertical plane of the axis of the shaft which supports the picker-rocking levers, showing the cradle for supporting the shaft for vertical movement and the means for limiting such vertical movement of the shaft;

FIG. 24b is a fragmentary perspective view showing one of the picker-rocking levers and a switch associated therewith;

FIGS. 24d and 24e are opposite end views of the cam for rocking the pickers;

FIG. 25 is a diagrammatic elevation illustrating the construction of a so-called "proximity switch" such as is preferably employed in the electrical circuit of the apparatus of the present invention, showing the switch in circuit-breaking position;

FIG. 26 is a view of the same switch in circuit-closing position;

FIG. 27 is a fragmentary elevation, to larger scale than FIG. 4, showing the cams which control the relative motions of the bottle carries and grip-fingers;

FIG. 28 is a plan view of the parts shown in FIG. 27;

FIG. 29 is a fragmentary vertical section through the axis of the star wheel and also showing the drive connections between the turntable shaft and the star wheel shaft;

FIG. 30 is an elevation, partly in axial section, through the shaft from which the star wheel is mounted;

FIG. 31 is a plan view of the internal gear which constitutes an element of the star wheel assembly;

FIG. 32 is a section on the line 32—32 of FIG. 31;

FIG. 33 is a plan view of a spur gear which engages the internal gear of FIG. 31 to form a flexible joint;

FIG. 34 is a section on the line 34—34 of FIG. 33;

FIG. 35 is an elevation showing the lower element of a universal joint, and which is fixed to the upper end of the shaft of FIG. 30;

FIG. 36 is a plan view of the complemental element of the universal joint;

FIG. 37 is a side elevation of the part shown in FIG. 36;

FIG. 38 is a fragmentary elevation, partly in perspective, showing one of the labeling units comprised in the turntable, with the bottle-contacting faces of the back-rest of the bottle carrier and of the grip-finger exposed to view;

FIG. 39 is a view similar to FIG. 38, but showing the back-rest and grip-finger differently positioned;

FIG. 40 is a fragmentary section substantially on the line 40—40 of FIG. 38;

FIG. 41 is a side elevation of the spring-actuated shaft which turns the bottle carrier in one direction;

FIG. 42 is a section on the line 42—42 of FIG. 41;

FIG. 43 is a side elevation of a casting constituting the frame of one of the constituent article-gripping assemblies of the turntable;

FIG. 44 is a plan view of the frame shown in FIG. 43;

FIG. 45 is a broken vertical section through the frame shown in FIG. 44;

FIG. 46 is a section on the line 46—46 of FIG. 43;

FIG. 47 is a section on the line 47—47 of FIG. 43;

FIG. 48 is a fragmentary section on the line 48—48 of FIG. 43;

FIG. 49 is a plan view of a rotatable bottle carrier such as constitutes an element of each respective article-gripping assembly of the turntable;

FIG. 50 is a front elevation of the carrier of FIG. 49;

FIG. 51 is a section on the line 51—51 of FIG. 49;

FIG. 52 is a fragmentary section illustrating a valve which controls pressure and vacuum at the suction cups of each of the respective bottle carriers, the valve being shown in closed position;

FIG. 53 is a view similar to FIG. 52, but showing the valve set to admit compressed air to the bottle carrier;

FIG. 54 is a view similar to FIG. 52, but showing the valve set to connect the suction cups of the bottle carrier with a vacuum pump;

FIG. 55 is a fragmentary side elevation, partly in vertical section, illustrating the connections for transmitting motion from one of the article deflectors in the feed conveyor assembly to a switch which controls the speed of the machine;

FIG. 56 is a view similar to FIG. 55, but showing the parts differently positioned;

FIG. 57 is a front elevation of a cam which determines the operation of two of the switches comprised in the picker control circuit;

FIG. 58 is an edge view of the cam of FIG. 57;

FIG. 59 is a front elevation of a part of the control panel, showing manually-actuatable control buttons mounted therein;

FIG. 60 is a fragmentary side elevation of the grip-finger;

FIG. 61 is a fragmentary front view of the grip-finger;

FIG. 62 is a plan view, to larger scale, of the grip-finger;

FIG. 63 is a more-or-less diagrammatic fragmentary plan view of the turntable and showing the star wheel; the wiper brushes; the terminal portion of the supply conveyor; and the initial portion of the delivery conveyor (but omitting various guide elements and switches), and showing a bottle carrier which has just received a bottle from the star wheel, while a second carrier is shown as just discharging a bottle into the entrance to the delivery conveyor;

FIG. 64 is a view generally similar to FIG. 63, but showing how, as the turntable rotated, the first-named of said carriers has carried the bottle away from the star wheel, while the second-named of said carriers has completely discharged its bottle;

FIG. 65 is a view generally similar to FIG. 63, but wherein the table has further advanced, and showing how the first-named of said bottle carriers is beginning to turn clockwise about its own axis, while the second-named carrier, empty, is moving toward the star wheel.

Figure 70:
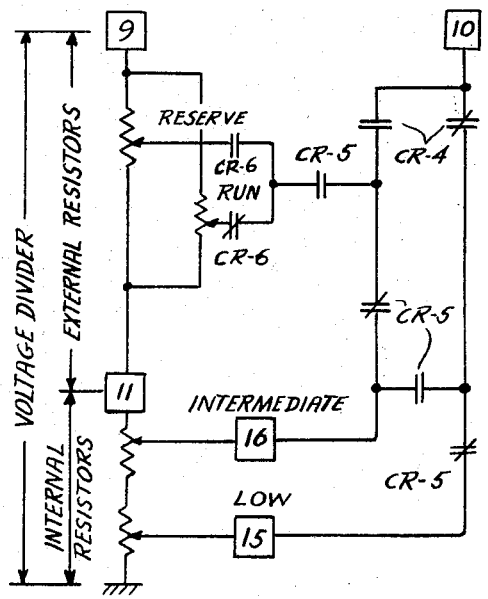
Figure 66:
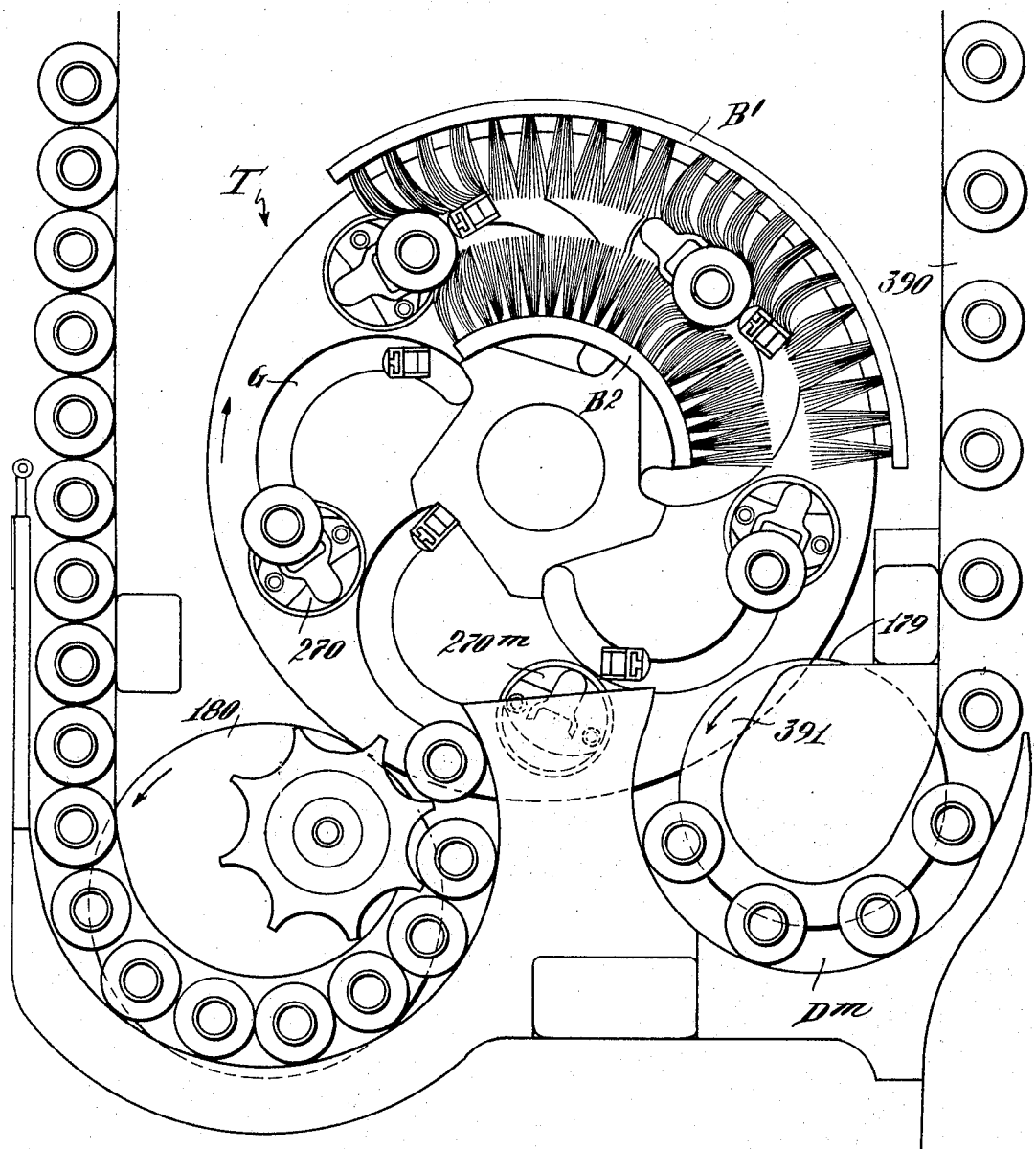
Figure 67:
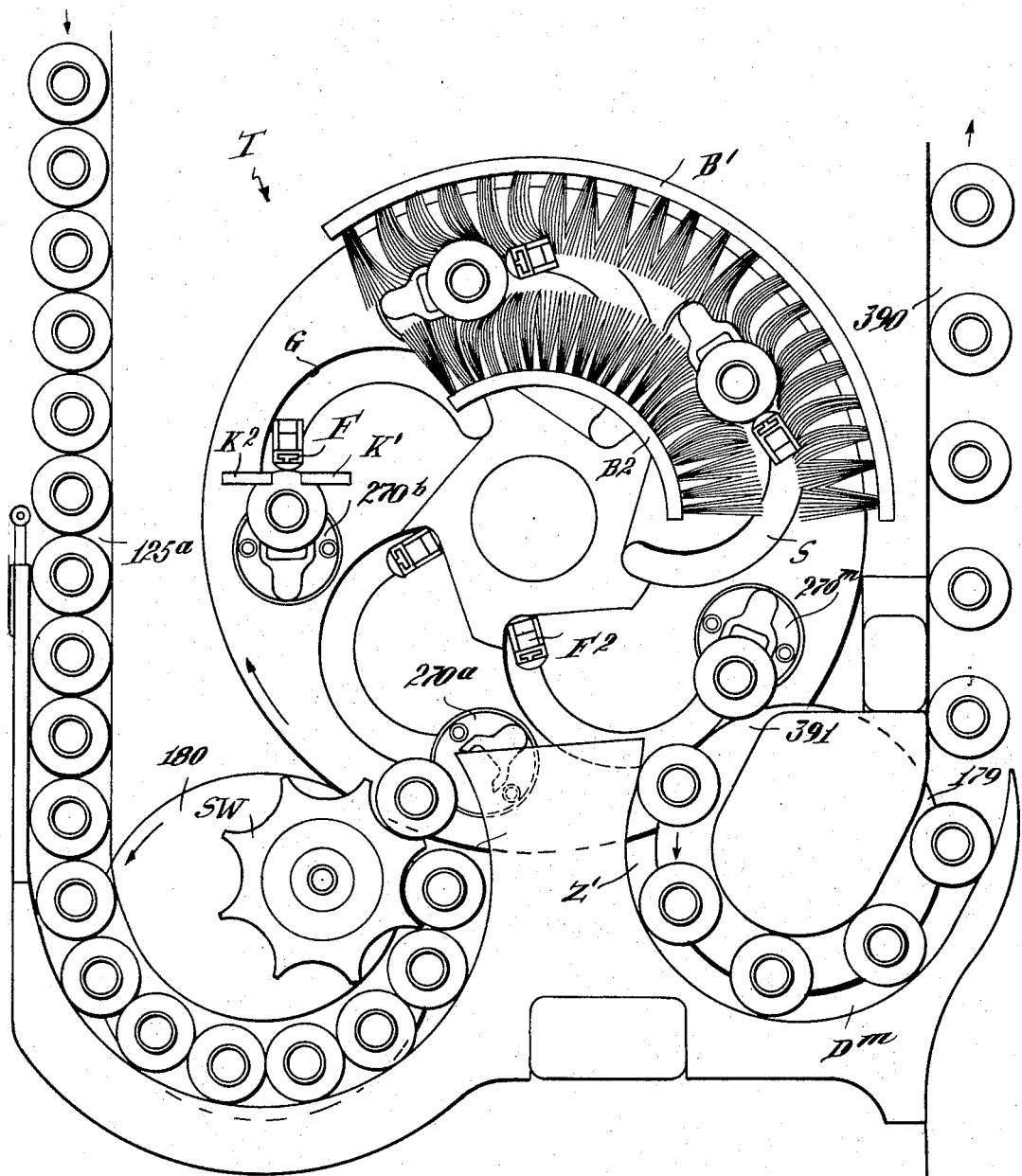
Figure 68:
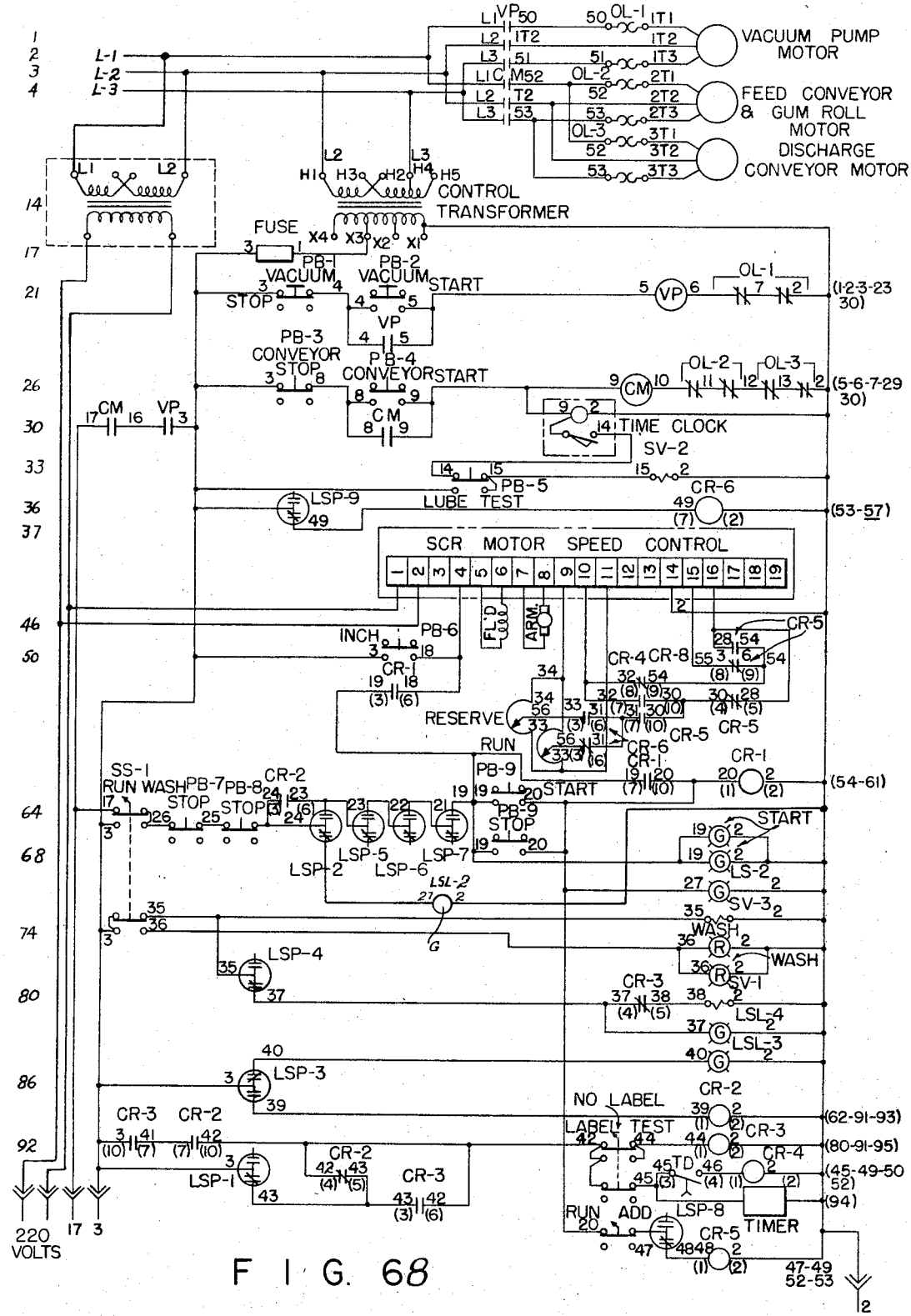
Figure 69:
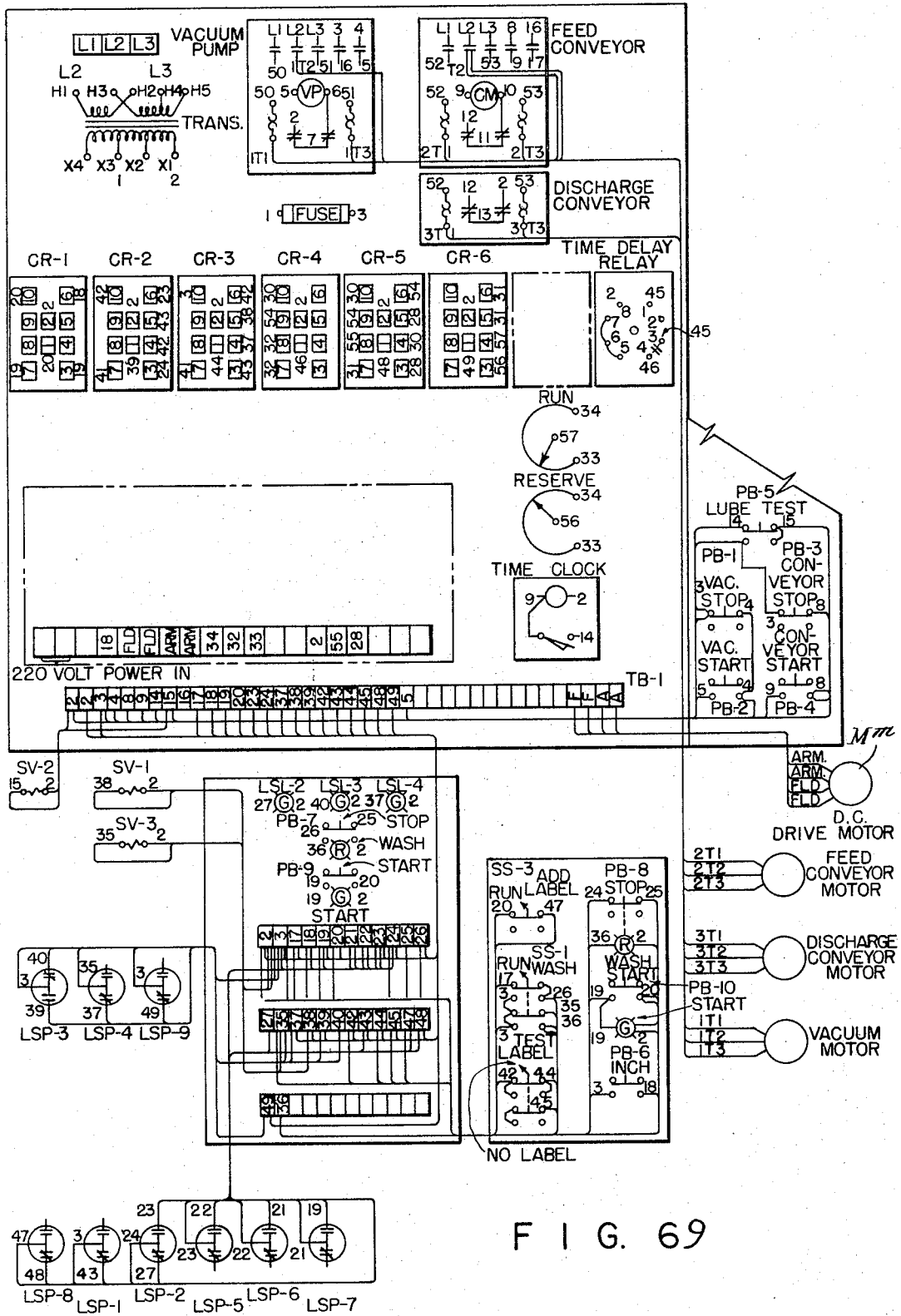
Figure 74:
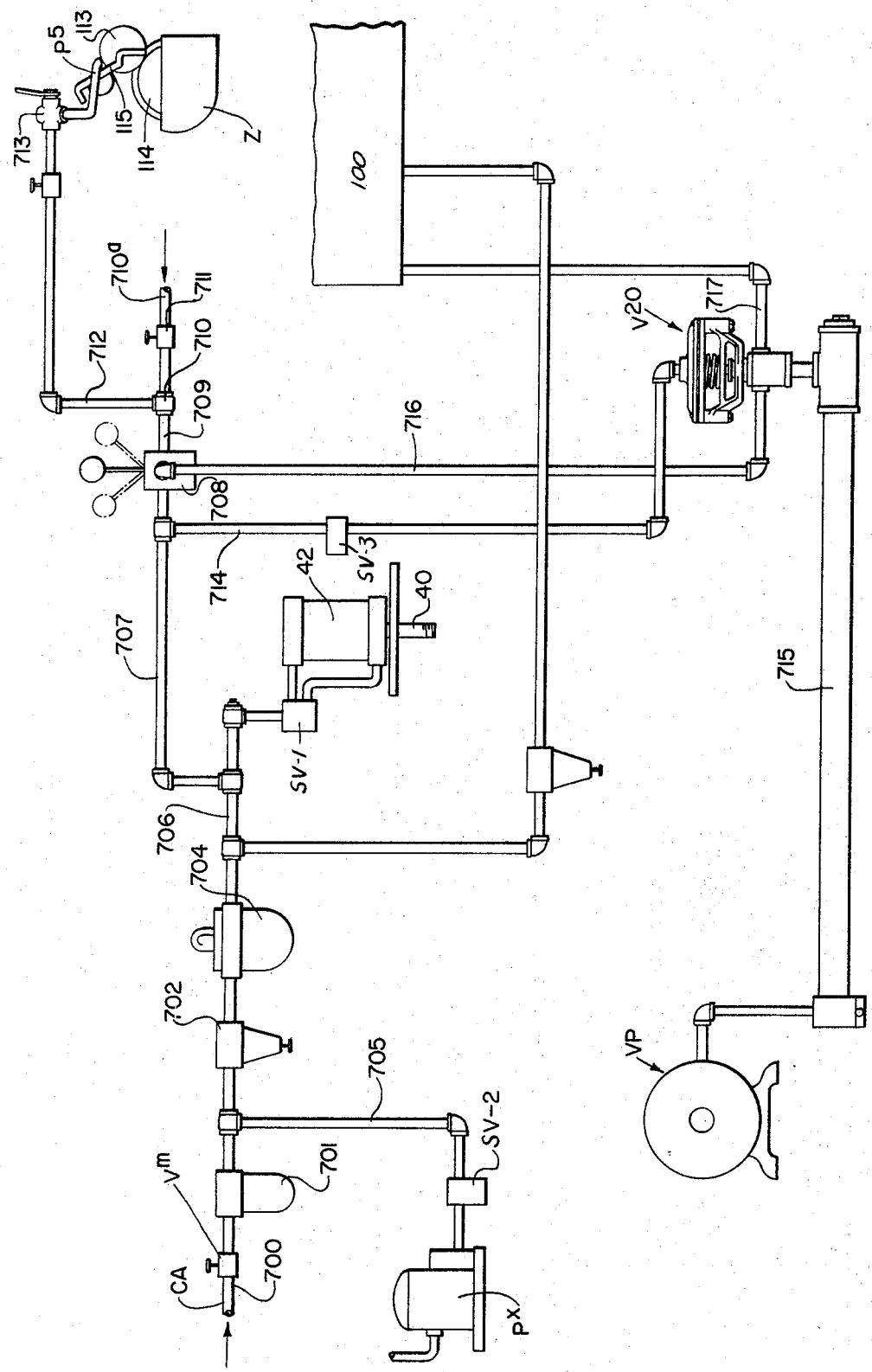

FIG. 66 is a view generally similar to FIG. 64, but showing the turntable as having advanced still further while the bottle carrier has rotated about its own axis in a clockwise direction and is approaching the label-applying means;

FIG. 67 is a view generally similar to FIG. 63, but showing how the first-named of said bottle carriers has been met by the grip-finger at the label-receiving point, the grip-finger now clamping the bottle firmly against the carrier back-rest;

FIG. 68 is a diagram showing the electrical circuit whereby the operation of the machine is controlled;

FIG. 69 is a diagram illustrating the arrangement of the various control switches and showing the wiring of the control panel;

FIG. 70 is a diagram illustrating a voltage divider comprised in the circuit;

FIG. 71 is a graph illustrating the relative positions of a bottle carrier and the grip-finger during one complete rotation of the turntable;

FIG. 72 is a diagrammatic plan view showing the varied orientation of the bottle carrier as it passes the star wheel; as the bottle approaches the label-receiving point; as the bottle passes through the field of action of the label-applying devices; and as the carrier passes the point at which the labeled botle is ejected from the carrier;

FIG. 73 is a diagrammatic plan view, to larger scale than FIG. 72, with the bottle carrier positioned to receive a bottle from the star wheel;

FIG. 74 is a diagrammatic elevation illustrating means for use in washing the gum box and associated parts; and FIG. 75 is a vertical section, partly diagrammatic, showing the mechanism for actuating the picker and gum-transfer rolls.

Referring to the drawings, in particular to FIGS. 1 to 6 inclusive, the numeral 100 (FIG. 1) designates a single labeling machine or "unit," according to the present invention, said unit being capable, independently of other units, of applying labels to articles, herein for convenience but without limitation being referred to as "bottles," as they are fed to it, one after another, by appropriate conveyor means and taken away by other conveyor means, and includes an electrical control circuit and means for accepting articles from the feed conveyor and for discharging them onto the delivery conveyor, the design being such that the unit may be assembled with the like units in series in a very simple way and so as to conserve floor space whereby very high productive capacity may be obtained.

In diagrammatic views (FIGS. 5 and 6), four complete units 100 are shown, and a portion of a fifth unit as indicated at 100a, the several units being interposed between the feed conveyor assembly indicated at 101, and the delivery conveyor assembly indicated at 102. Details of these conveyor assemblies and the means for driving them will be pointed out more in detail hereinafter.

Figure 1:
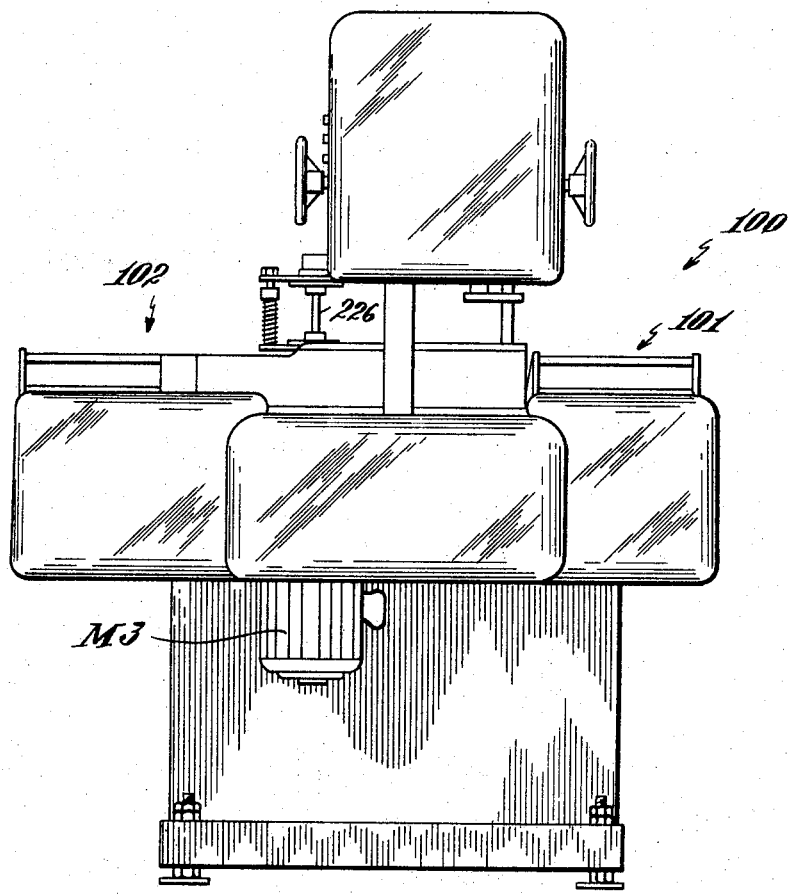
FIG. 1 is an end elevation of a single labeling machine unit embodying the present invention, most of the moving parts being concealed by the casing.
Figure 3:
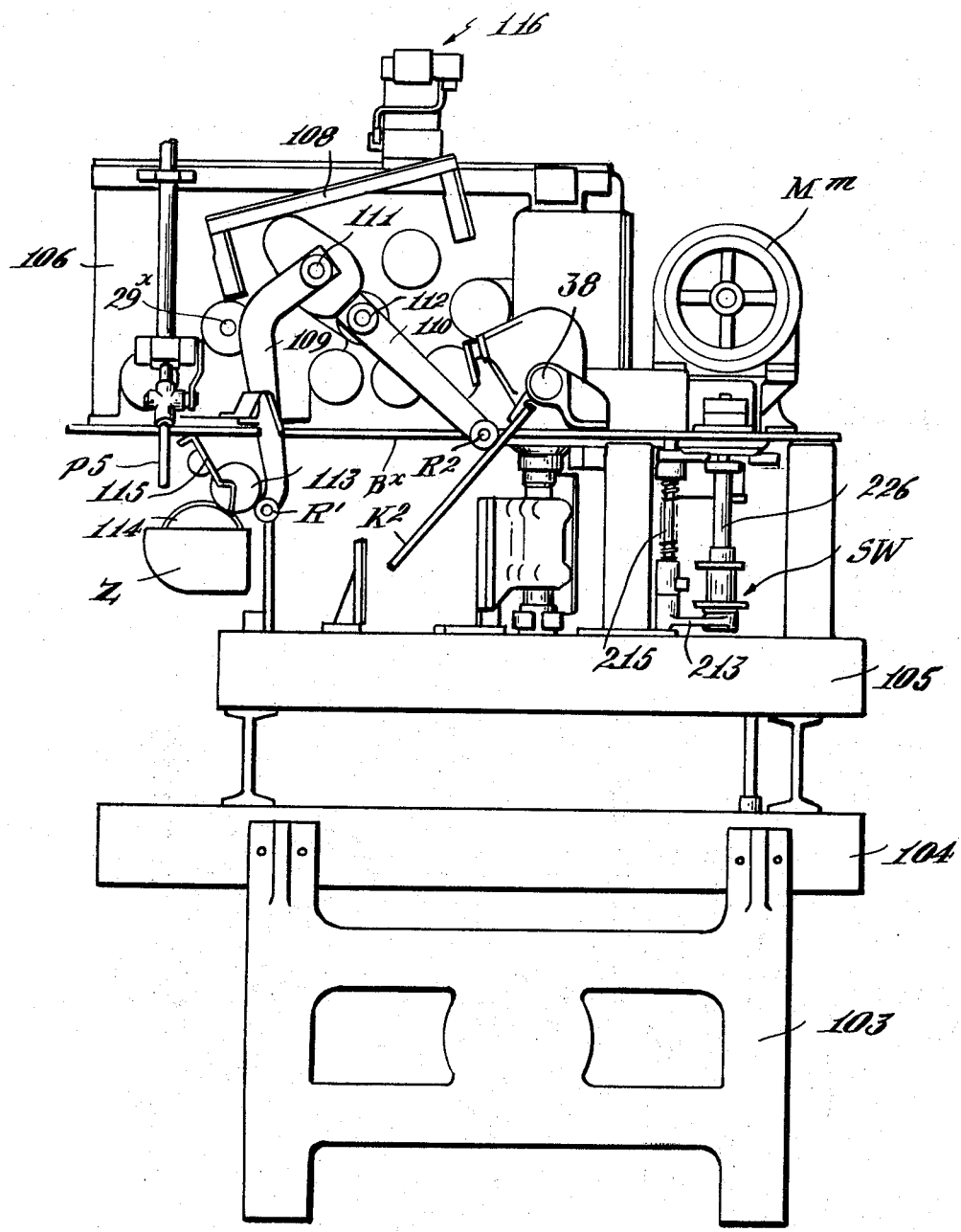
FIG. 3 is a front-side elevation, omitting the casing, showing the picker, gum-transfer rolls, gum box and associated parts.

As shown in FIG. 1, most of the operating parts are enclosed in suitable casings or housings whereby the mechanism is protected from dust and dirt and from fragments of bottles which may be broken accidentally, and the machine operator is shielded from the moving parts while, at the same time, a pleasing external appearance is obtained. The machine comprises a supporting frame (FIGS. 2, 3 and 4), including the base member 103; lower and upper supporting platforms 104 and 105; and a stationary table Bx upon which is mounted a housing 106 within which there is arranged gear mechanism for actuating the pickers and gum-applying rolls, substantially as disclosed in the copending application of Sidney T. Carter, Ser. No. 281,624, filed May 20, 1963. As illustrated in FIG. 3, an oscillatory shaft 38 rocks a separable-blade picker (one blade of which is indicated at $K^2$) which receives gum alternatively from two gum-transfer rolls $R^1$ and $R^2$ respectively, and then moves upwardly to take a label from a magazine mounted in a frame 108 (FIG. 3), and then moves downwardly to hold the label, with its gummed surface in label-applying position, to be engaged by an advancing bottle. The transfer rolls $R^1$ and $R^2$ are mounted to turn on pins at the free ends of levers 109 and 110, respectively, which are fixed to rock-shafts 111 and 112 having bearings in the casing or housing 106. The transfer rolls R¹ and R² receive gum from a constantly rotating supply or presenting roll 113 which receives gum from a rotatable roll or disc 114 arranged within the gum box Z. Suitable scraper means 115 cooperates with the roll 113 to insure a uniform coating of gum upon the latter. As will hereinafter be pointed out more in detail, the present apparatus comprises control means including the device 116 (FIG. 3), whereby the picker is prevented automatically from entering the label magazine to take a label when, for any reason, no bottle will be in readiness to receive a label when the picker reaches the label-applying position.

Figure 4A:
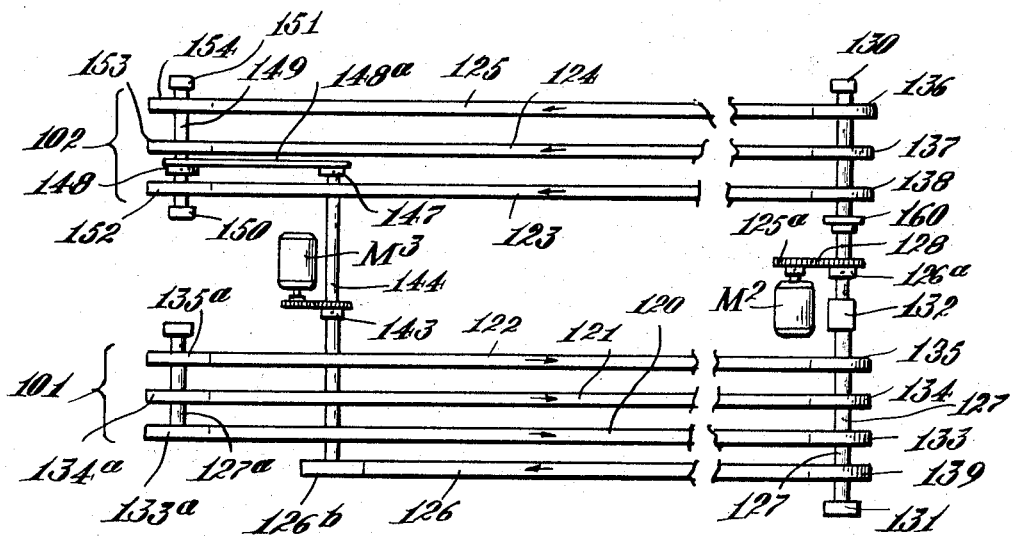
FIG. 4a is a diagrammatic plan view, illustrating the motors and connections for driving the supply and delivery conveyors.
Figure 12:
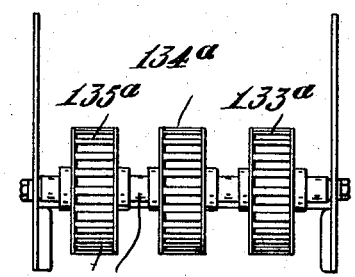
FIG. 12 is a fragmentary plan view of the parts shown in FIG. 11.
Figure 11:
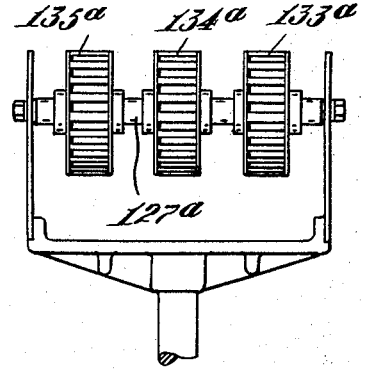
FIG. 11 is a fragmentary elevation showing a set of idler sprockets which are embraced by the feed conveyor chains.

The feed conveyor assembly 101 (FIGS. 4a and 6) comprises three parallel chain-conveyors 120, 121 and 122 of conventional type; while the discharge or delivery conveyor assembly 102 comprises three parallel chain-conveyors 123, 124 and 125 of conventional type. A return chain-conveyor 126 (FIGS. 4a and 6), also of conventional type, but moving oppositely to the feed conveyors, is associated with the feed conveyor assembly. The chains of the conveyors 120, 121 and 122 (FIG. 4a) embrace sprocket wheels 133, 134 and 135 (FIGS. 4a, 7 and 8) keyed to a shaft 127 which is driven by a geared-head motor M² (FIG. 8) having a sprocket 125a (FIG. 7) connected to its shaft by an overload clutch and which, by means of a conventional roller chain 128, drives a sprocket 126a fixed to the shaft 127. The feed conveyors 120, 121 and 122 also embrace idler sprockets 133a, 134a and 135a (FIGS. 4a, 11 and 12) mounted on a shaft 127a parallel to the shaft 127, the shafts 127 and 127a being located at opposite ends of the conveyor assembly. Suitable guide and supporting sprockets (not here shown) are arranged at intervals between the shafts 127 and 127a to support the intervening conveyor runs.

The shaft 127 (FIGS. 4a, 7 and 8) is supported at opposite ends in self-aligning bearings 130 and 131 of conventional type and by an intermediate bearing 132 (FIG. 7), since this shaft extends completely across the width of the labeling unit and across both conveyor assemblies. Because of the difficulty of arranging three independent bearings in absolutely accurate alignment, the shaft 127 comprises two separate sections arranged end-to-end and connected by a universal coupling 129 (FIGS. 7 and 8).

Figure 14:
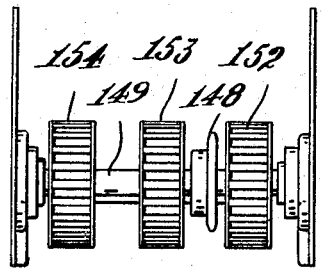
FIG. 14 is a fragmentary plan view of the parts shown in FIG. 13.
Figure 13:
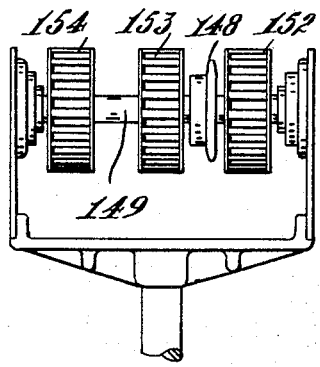
FIG. 13 is a view similar to FIG. 11, but showing a set of driving sprockets which are embraced by the delivery conveyor chains.

The chains of discharge or delivery conveyors 123, 124 and 125 embrace sprocket wheels 138, 137 and 136 (FIGS. 4a, 7 and 8), respectively, these sprockets being idler sprockets turning freely on the shaft. The chains of conveyors 123, 124 and 125 also embrace sprockets 152, 153 and 154 (FIGS. 4a, 13 and 14) keyed to a shaft 149 whose length slightly exceeds the width of the delivery or discharge conveyor assembly 102 and which is mounted at its opposite ends in self-aligned bearings 150 and 151 respectively. To the same shaft 149, as here shown, and located between the sprockets 152 and 153, there is fixed a sprocket 148 (FIG. 4a) which is embraced by a sprocket chain 148a which also embraces a sprocket 147 (FIGS. 4a, 9 and 10) fixed to a shaft 144 (FIGS. 9 and 10) which turns in self-aligned bearings carried by the machine frame and which is driven by a geared-head motor M³ (FIG. 9) by means of a sprocket 140, connected to the motor shaft by an overload clutch, and driving a chain 142 which embraces a sprocket 143 (FIG. 9) fixed to the shaft 144. A sprocket 126b (FIG. 4a) is also fixed to this shaft 144 and is embraced by the chain of return conveyor 126 which also passes about a sprocket 139 (FIG. 4a) turning freely on the shaft 127. The motor M³ thus drives the several discharge conveyor chains and also the return conveyor 126 all in the same direction, while the motor M² drives the feed conveyors 120, 121 and 122 in the opposite direction.

A sprocket 160 (FIG. 7), keyed to the shaft 127 and thus driven by the motor M², is embraced by a sprocket chain 161 (FIG. 18) which passes about a sprocket 162 (FIGS. 17 and 18) connected to a shaft 163 (FIGS. 7, 17 and 18) by an overload clutch 164 (FIG. 17). This shaft 163 turns in suitable anti-friction bearings seated in aligned openings in the downwardly projecting legs 165 of a bracket 164a (FIG. 17), forming a part of the machine frame. The left-hand end of the shaft 163, as viewed in FIG. 17, is connected by a universal coupling 166 of any suitable type to the proximate end of a shaft 168 turning in bearings in a bracket 169, similar to the bracket 164a carried by the machine frame. To the shafts 163 and 168 there are keyed beveled pinions 170 and 171 respectively, which mesh with beveled pinions 172 and 173 respectively, fixed to the lower ends of vertical shafts 174 and 175 turning in anti-friction bearings provided in the machine frame, the upper, at least, of these bearings being provided with conduits, diagrammatically indicated at 176, for supplying lubricant under pressure. To the upper ends of these shafts 174 and 175, discs 177 and 178, respectively, are secured. Attached to the upper faces of these discs, as by means of screws, are circular plates 179 and 180 respectively, these plates being arranged with respect to the feed conveyor assembly and the discharge conveyor assembly so as, respectively, to present bottles to the rotating star wheel as received from the feed conveyors and to support labeled bottles, ejected from the turntable, and to transfer them to the discharge conveyor assembly. The universal joint connection 166 between the shafts 163 and 168 makes it possible to arrange these shafts with their axes vertical but somewhat offset from each other, as respects a vertical plane at right angles to the conveyor chains, so that it is practical to arrange the axes of the shafts 174 and 175 in different transverse vertical planes, as is desirable in order to permit the infeed of bottles to and the discharge of bottles from the turntable at conveniently spaced points.

Figure 15:
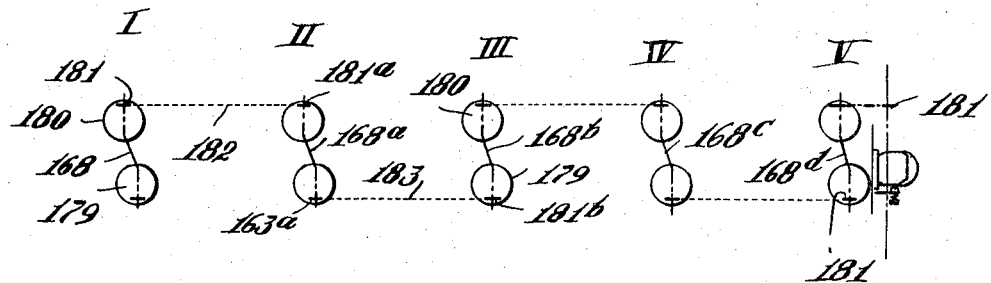
FIG. 15 is a diagrammatic plan view, to small scale, illustrating the drive connections for the rotary article-presenting and delivery plates for each, respectively, of a series of labeling machine units according to the present invention, five such units being illustrated in FIG. 15.
Figure 16:
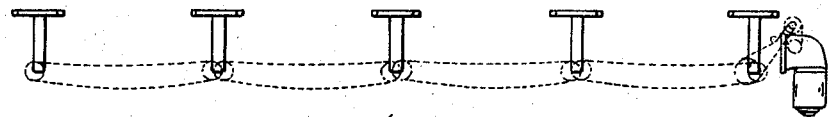
FIG. 16 is a side elevation of the plate-driving connections shown in FIG. 15.

A sprocket wheel 181 (FIG. 17) is fixed to the free end of the shaft 168 and (as diagrammatically indicated in FIGS. 15 and 16) when several labeling units I, II, III, IV, for example, are arranged in series, a sprocket chain 182, embracing the sprocket 181 on the shaft 168 of the first unit, may drive a similar sprocket 181a on the shaft 168a of the second unit; a sprocket chain 183 embracing the sprocket 163a of the second unit, may drive the sprocket 181b of the third unit and thus turn its shaft 168b and the corresponding circular plates 179 and 180, and so forth throughout the series, it being noted that in this manner the power for driving all of the circular plates of the series is received from a single drive motor M².

As shown in FIGS. 17 and 18, a sprocket 185 is keyed to the shaft 163 and receives a sprocket chain 186 (FIG. 18) which may drive the gum-presenting roll 113 (FIG. 3) by means of a sprocket 400a (FIG. 18) connected to the shaft 304 of the gum-presenting roll by a unidirectional clutch (not shown) of conventional type. A second sprocket 400b, likewise connected to the shaft 304 by a unidirectional clutch (not shown) is embraced by a chain 187 which is driven by a sprocket 188 on a shaft 189 (FIG. 4) which is driven by gearing (not here illustrated) from the main shaft 190 of the labeling unit. By this means the gum-presenting roll is driven alternatively by one or the other of the sprockets 400a and 400b respectively, depending upon which one is turning the faster. The sprocket 400a is driven, as above described, through connections from a conveyor drive motor M² so that this sprocket is turning at all times regardless of whether or not the labeling unit is functioning to apply labels, thus keeping the gum roll and the gum in the gum box in constant motion, thereby preventing the gum from drying in intervals during which the labeling unit is idle. Were the gum to be permitted to dry during such an interval, it would then be necessary to wash and clean the gum box and associated parts before the machine could be started into operation. When the labeling unit is in operation, then the sprocket 400b will be driven faster than the sprocket 400a and the speed of the gum-presenting roll will be normal. Further details of the gum box and the means for picking labels from the magazine and for presenting them in position to be taken by an advancing bottle are more fully illustrated and described in the above copending application Ser. No. 281,624, filed May 20, 1963 upon which Patent No. 3,262,422, issued on July 26, 1966.

The feed conveyor assembly 101 (FIG. 6) may be of the general type disclosed in the patent to Carter, No. 2,804,961, dated Sept. 3, 1957, and comprises movable deflectors 350, 351 and 352, one for each labeling unit, each mounted on a vertical shaft 354 (FIGS. 55 and 56) to swing and which is resiliently biased, as by a spring, in a direction to urge bottles from the conveyors 120 and 121 toward the innermost conveyor 122. There is also a fixed deflector 353 (FIG. 6) operative to divert bottles (nearing the ends of the feed conveyors without having been deflected to one of the labeling units) onto the return conveyor 126 (FIG. 6). The shaft 354 of that movable deflector 352 of the last unit of a series, extends down below the bottle-supporting runs of the conveyors and has fixed thereto a crankarm provided with a downwardly projecting rotatable pin 355 (FIG. 55). This pin 355 has an opening in which there is arranged to slide a rod 356 provided (as shown in FIGS. 55 and 56) with a loose sleeve 357 located at the right-hand side of the pin 355 (as shown in FIG. 55) and whose position may be adjusted by means of suitable nuts screw-threaded to the rod. The opposite side of the pin 355 is engaged by one end of a coiled spring 358 (FIG. 55) embracing the rod and whose opposite end contacts a nut 359 screw-threaded onto the opposite end of the rod. To this latter end of the rod there is secured the head 360 of a cylinder 361 which is free to move longitudinally and within which there is arranged a switch, here designated as the switch LSP-9, this switch being of the type known as a "proximity switch," whose construction will be explained hereinafter and which responds to the longitudinal movement of the cylinder 361, relatively to the switch casing, to close or break an electrical circuit in response to the swinging motion of the deflector.

On the shaft 29x (FIG. 3), on which is mounted the cam (not shown) which actuates the gum-transfer rolls R¹ and R², there is fixed a disc 362 (FIGS. 57 and 58) whose face is opposed to a pair of proximity switches, here designated as LSP-3 and LSP-4, which respond by magnetism to the rotation of the disc. As shown in FIG. 57, this disc 362 has diametrically opposite recesses 364 and 364a respectively, so shaped that as the disc revolves the passage of these recesses across the ends of the switches results in a change in the magnetic flux in the switches and thus causes the switches to operate.

Referring to FIG. 22, wherein picker-rocking means is shown more-or-less diagrammatically, the picker rock-shaft is indicated at 38 and the barrel cam for rocking the picker at 60. This cam has grooves 420 and 421 (FIGS. 24d and 24e) in its opposite ends. Cam-actuated levers 50a and 50b (FIG. 22), fulcrumed on a shaft 51, are provided with cam follower rolls 52 and 53 (shown in dotted lines in FIGS. 22 and 24b) and are connected by rigid links (one of which is shown at 49, FIGS. 22 and 24b) to corresponding cranks 44 (one only being shown) fixed to the rock-shaft 38.

In order to avoid the possibility of injury to the parts of the machine, if, for example, a bottle should tip in passing from the feeder star wheel SW (FIG. 19) to a bottle carrier 268 and thus interfere with the normal downward motion of the picker, each of the grooves 420 and 421 of the picker-actuating cam 60 is provided with an abnormally wide portion between the points X² and Y², thus permitting the cam follower roll which, by the action of spring 50t (FIG. 24b), normally follows the outer wall of the cam groove (when moving along this clearance portion of the groove) to move radially inward in response to unusual force, so that the picker will not be destructively forced downwardly in attempting to reach the normal label-transfer position.

As a further measure of safety, one of the levers (for example, the lever 50b, FIG. 24b), by means of which the pickers are rocked, is provided with a resilient metal contact finger Fx which is normally in operative relation to a proximity switch LSP-2 while the cam follower roll is normally moving between the points X² and Y² in contact with the outer contour of the cam, this switch LSP-2 being in parallel with a second proximity switch LSP-3 (FIG. 57) in the drive circuit of the machine. So long as the pickers are free to move downwardly to their normal extent, the circuit will be closed at the switch LSP-2 during the arc X² and Y² of rotation of the cam 600.

Referring to FIGS. 57 and 58, the timer disc 362 is shown as mounted on the shaft 29x which actuates the transfer roll cam in such a way that each time the contact finger Fx (FIG. 24b) rises into operative relation to the switch LSP-2, a slot 364 or 364a in the disc registers with the second proximity switch LSP-3, above referred to, so as to open the latter switch. However, the stop circuit of the machine is not broken unless, at the same time, the switch LSP-2 is open by failure of the contact finger Fx to rise, since the two switches are in parallel. Normally, assuming that the picker is free to move downwardly to its lowest extent during each cycle, the concomitant rise of the contact finger Fx into circuit-closing relation to the switch LSP-2 will keep the circuit from being opened and the machine will continue to run. However, it will be understood that if there is any interference in the downward motion of the pickers due to a misplaced bottle, so that the levers 50a and 50b cannot travel the normal distance and in consequence the circuit is opened at the switch LSP-2, the machine will be automatically stopped when a recess in the disc registers with switch LSP-3, thus avoiding damage.

In accordance with the present invention, provision is also made automatically to prevent the picker from entering the label magazine so as to take a label during the period in which the apparatus is set at the "No-bottle, No-label" operation. For the attainment of this object, the shaft 51 is so mounted (FIGS. 22 and 24a) as to be capable of of moving bodily vertically down a short distance from its normal position (shown in full lines in FIG. 22) to the position indicate in broken lines. Means for so moving the shaft 51 is indicated generally at 116 (FIGS. 3, 22, 24 and 24a). Thus, referring to the latter view, the shaft 51 is supported by a vertically movable cradle 51a connected to the lower end of a piston rod 40. This piston rod is fixed to a piston 41 (FIG. 24) which moves in a cylinder 42 to which air under pressure may be supplied from a suitable source as controlled by a solenoid valve SV-1 (FIGS. 23, 23a and 23b). When the shaft-supporting part 51a is in its uppermost position, that is to say, the normal operating position (shown in full lines in FIG. 22), the free ends of the levers 50a and 50b, that is to say, the ends to which the links 49 are connected, make a full downward stroke in response to the throw of the cam 60 and thus rock the shaft 38 through its normal arc of travel such as to contact the gum-coated surfaces of the picker blades with a label in the magazine. The pickers then swing downwardly in the normal fashion to a position where they hold the label by its ends so as to be contacted by a bottle as the latter is advanced by the motion of the turntable. Near its opposite ends the shaft 51 has radial flanges, such as that shown at 51x (FIG. 24a) which are guided for vertical movement in the opposite side walls of the housing 106. Adjustable stop screws 51y limit the upward motion of the shaft 51 and thus the downward limit of motion of the picker blades.

When no articles are entering the labeling unit, it is desirable to prevent the picker from taking a label from the magazine during a given cycle and, under such circumstances, air is admitted to the upper end of the cylinder 42 so as to force the piston 41 downwardly. The cradle 51a which supports the shaft 51 is thus moved downwardly to the position indicated in dotted lines in FIG. 22, with the result that the upward stroke of the picker is so shortened as to prevent the picker from contacting a label in the magazine. Thus, during such a cycle, no label will be taken by the picker.

With this arrangement, the air pressure normally within the cylinder below the piston acts as a pneumatic spring to absorb shock when the pickers enter the label magazine. Since the label pack can be only be compressed a certain amount, the presence of this air pressure in the cylinder provides sufficient yield as the pickers contact the label to avoid damage. However, if desired, a compression spring 42x (FIG. 24) may be arranged below the piston 42.

Referring to FIG. 19, the rotary article-presenting plate 180 (FIG. 17) which transfers the bottles from the feed conveyor into the field of action of the star wheel SW is shown as having its center of rotation at $C^1$, while the rotary article-discharge plate 179, which receives the labeled bottles from the turntable and transfers them to the discharge conveyor, is shown as having its center at $C^2$. The character $C^3$ indicates the center of the turntable and $C^4$ indicates the center of the star wheel SW, by means of which the bottles are delivered in properly spaced and timed relation to the revolving bottle carriers mounted on the turntable. This star wheel SW is shown as having eight bottle-receiving spaces or recesses and turns about a normally vertical axis and at such a height as to receive the body of a bottle in the space defined between adjacent teeth.

The star wheel SW (FIG. 29) is driven by a shaft 231b and comprises vertically spaced, coaxial, radially toothed annular members 210a and 210. The lower member 210a is mounted on a carrier 211 which is free to turn on a vertical spindle 212 whose lower end is fixed in a socket in the free end of an arm 213 integral with a hub 214 keyed to the lower end of a vertical shaft 215 (FIGS. 29 and 2a) supported by trunnions at its upper and lower ends to turn about a vertical axis and having an arm 216 fixed thereto at its upper end (FIGS. 19 and 2a), whose free end 217 (FIG. 19) constitutes the controlling element for an electrical proximity switch LSP–5 (FIGS. 19 and 2a).

A spring 216a (FIG. 19, connected at one end to the arm 216 which carries the controlling element 217 of the switch LSP–5 and at its other end to a fixed point) constantly urges the arm 216 toward the switch and concomitantly resiliently holds the star wheel shaft in normal vertical position, although permitting the star wheel shaft to swing away from normal position in response to a jam of articles at the feed point.

The upper star wheel member 210 is fixed to an annular carrier 220 provided with a circular coaxial cavity in which there is secured an internal gear 221 (FIGS. 29, 31 and 32), whose teeth 222 (FIG. 32) are of substantial depth, vertically, and mesh with the teeth 224 of a spur gear 225 (FIGS. 19, 33 and 34) secured to the lower end of a shaft 226 (FIG. 30). The teeth 224 of gear 225 are of such less depth than the teeth 222 of the internal gear 221 as to permit slight axial movement of the spur gear 225 relatively to the internal gear 221 and also allow slight rocking of the gear 225 relatively to the star wheel assembly so that the axes of the star wheel assembly and of the gear 225 need not be in absolutely accurate alignment at all times, thus providing something like a universal joint at this point. The drive shaft 226 (FIGS. 29 and 30) has an axial socket 226a at its upper end in which there is fixed a short stud shaft 227 (FIGS. 29 and 35) forming a part of the lower element 228 (FIGS. 35 and 19) of a universal joint, whose complemental upper member 229 (FIGS. 29, 36 and 37) is provided with a diametrically arranged keyway 229a (FIG. 36) which receives a key 230 (FIG. 29) at the lower end of the shaft 231b, which is supported to turn in bearings in a housing 232 carried by the machine frame. This shaft 231b has an axial bore (not shown) for the reception of a long bolt 233 whose screw-threaded lower end portion is received in a screw-threaded axial bore 234 (FIG. 36) in the upper member 229 of the universal joint. By removing this bolt, the upper member of the universal joint is released and the shaft 226 may then be dropped downwardly (as permitted by the different depths of the teeth of the internal and external gears) sufficiently to disengage the key 230 from slot 229a so as to permit the star wheel assembly to be removed.

As illustrated in FIGS. 31 and 33 respectively, the internal gear 221 has a tooth missing at diametrically opposite points, while the spur gear 225 has a corresponding wide tooth 224a at diametrically opposite points. With this arrangement, once the upper and lower members of the star wheel have been relatively adjusted for cooperation with a particular bottle, the assembly can be removed and replaced without re-adjusting the intermeshing gears.

A rotatable collar 215m (FIG. 29) on shaft 215 (just above the hub 214 of the star wheel supporting arm 213) has an arm 215t whose free end carries a pivot pin 215b on which two rolls 215x are free to turn. These rolls, preferably of rubber or equivalent resilient material, are located between the upper and lower members 210 and 210a of the star wheel, in position to contact the peripheral surface of the body of a bottle as the latter is advanced (FIG. 19) toward a bottle carrier positioned to receive it. The sleeve 215m is urged, by a coil spring 215s (FIGS. 29 and 2a) embracing the shaft 215, in a direction such as to tend to crowd a bottle into firm contact with the back-rest of the bottle carrier as the bottle is advanced by the star wheel onto the turntable T.

The shaft 231b (FIG. 29), which drives the star wheel, is mounted in anti-friction bearings in the housing 232. A spur gear 235 is fixed to the shaft 231b and meshes with a gear 236 which turns on a stud shaft 237. Gear 236 meshes with a pinion 238 fixed to a shaft 239 turning in anti-friction bearings carried by the machine frame and to which a gear 240 is keyed, the latter meshing with a gear 241 which is keyed to the main shaft 250 which supports the turntable on which the bottle carriers are mounted.

This main shaft 250 (FIG. 20) is supported at its lower end in a step-bearing 251 resting on a girder 252 (FIGS. 27 and 28), supported at its opposite ends by the machine frame and preferably with provision, as by means of set screws 253 (FIGS. 28) for shifting the ends of the girder both transversely and longitudinally thereby accurately to position the axis of the shaft 250. The upper part of the shaft 250 turns in bearings in a part 254 (FIG. 20) on the machine frame.

The turntable T (FIG. 20), which is carried by the shaft 250, includes a sleeve member 260, fixed to the shaft 250, and five-like, bottle-gripping assemblies 1000 (FIGS. 38, 39 and 40), each comprising a frame 255 (FIGS. 38 and 43), including spaced upper and lower horizontal members 256 and 257 (FIGS. 43 and 45) integrally joined by a vertical web 258. This web has an arcuate outer face 259 (FIGS. 44 to 48 inclusive) of a radius such as to fit snugly against the periphery of the sleeve 260 and this web is provided with one or more holes 260a (FIG. 44) for the reception of bolts, such as the bolt 261 (FIG. 20), whereby the frame is firmly secured to the sleeve 260. By this arrangement, it is possible to replace a bottle-gripping assembly without removing the entire turntable. The upper and lower parts 256 and 257 of the frame 255 are also integrally joined by a tubular member 262 (FIG. 45) having a vertical bore 263, providing a bearing for a shaft 264 (FIGS. 20, 39 and 40), having at its upper end an integral disc-like flange 265 (FIGS. 38 and 39), and is provided at its lower end with a spur pinion 266 (FIGS. 20 and 38). The flange 265 is provided with openings (not shown) for the reception of bolts 265a (FIG. 20), by means of which the base 269 of a bottle carrier 268 (FIGS. 49, 50 and 51) may be attached to the flange.

Each bottle carrier 268 (FIG. 51) comprises a circular base 269 coaxial with the shaft 264 on which it is mounted, said face being of lune shape with its horns, as here illustrated (FIG. 49), approximately 170° apart. The base also has an upper bottle-supporting surface 271 (FIG. 49) of lenticular shape in plan on which rests a removable pad 272 which may be of wear-resistant material; the upper face of this pad 272 being smooth and in a plane above the surface of the part 270 such as to be flush with the upper surfaces of the bottle-transfer plates 179 and 180 (FIGS. 17 and 19) above described. The bottle carrier 268 also comprises the upright back-rest portion 274 (FIG. 51) which is integral with the base and which is substantially U-shape (FIG. 49) in transverse horizontal section so as to provide spaced, forwardly directed vertical ribs 275 and 276 (FIG. 49) whose forward edges 275a and 276a are concavely curved in a horizontal plane, as shown in FIG. 49, to the same curvature as the rear edge of the lenticular area 272. Between these ribs 275 and 276 there is arranged a vertical pad 277 (FIG. 51), desirably of some resilient material, for example rubber, extending from the top of the member 274 downwardly to a point 278 spaced upwardly, for example a distance of ¾ of an inch from the plane of the upper surface of the part 272, thus providing clearance for a spotting projection on a bottle. As shown, the pad 277 is provided with three vertically spaced suction cups (although there may be more or less) which, if desired, may be integral with the pad proper and of resilient material, each of these pads having a central port 280 which communicates with a passage 281 extending down through the back-rest member 274 and joining a horizontal passage 282 (in the base of the bottle carrier) which, at times, communicates with a vacuum pump and, at other times, with a supply of compressed air, as will hereinafter be more fully described. The axis of a bottle, contacting the ribs of the back-rest, is eccentric to the carrier base.

The parts 256 and 257 of the frame 255 (FIGS. 43, 44 and 46) have aligned holes 283 and 284 (FIG. 45) for the reception of a shaft 285 (FIGS. 20, 39, 40 and 41). The upper part of this shaft turns in a bushing 285a (FIG. 20) in the hole 283, while its lower part is journaled in the hole 284 (FIG. 47). At an intermediate portion of its length, the shaft 285 passes through a sleeve 285b (FIG. 20) which is keyed to the shaft so that it must turn with the latter and at its lower end this sleeve 285b is shaped for interlocking engagement with an opening in a plate 286 (FIGS. 20 and 38), which is thus constrained to turn with the sleeve and shaft. This plate 286 has spaced abutment elements 287 (FIG. 40) for anchoring one end 288 of a coiled spring 289 which embraces the shaft 285 and the sleeve 285b and whose upper end 289a (FIG. 38) is confined between the bushing 285a and a part of the upper member 256 of the frame 255. This spring is under constant stress and tends to turn the shaft 285 in a counterclockwise direction as viewed from above.

The shaft 285 extends down below the part 257 of the frame 255 and to this lower end portion of the shaft there is fixed a part 290 (either integral with the shaft or keyed thereto), this part 290 (FIGS. 20, 41 and 42) having a hole 290a (FIG. 42) which receives a pin on which a roll 293 (FIG. 38) is mounted to turn freely. The part 290 has a hub portion 290b (FIGS. 20 and 41) which receives a segmental gear 291 which meshes with the pinion 266, above described, attached to the lower end of the shaft 264 on which the bottle carrier 268 is mounted. A bolt 290m (FIG. 39), passing downwardly through an arcuate slot in the segmental gear, is screw-threaded at its lower end into a screw-threaded hole 290d (FIG. 42) in the part 290, thereby adjustably securing the segmental gear to the shaft 285. The shaft 285 is tubular (FIG. 20) for a portion of its length to provide a passageway for the flow of oil.

The grip-finger assembly F (FIGS. 38 and 39) is mounted upon the upper part 311 of a U-shaped carrier member 312 (FIG. 38) comprising the upper and lower parts 313 and 314 which overlie the upper and lower parts 256 and 257 respectively, of the frame 255 (FIG. 43) and which are provided with aligned openings for the reception of a shaft 315 (FIGS. 20 and 40) which turns in bearing openings 300 and 301 (FIG. 45) in the parts 256 and 257 of the frame. The shaft 315 extends down below the part 257 of the frame and has fixed thereto a member 316 (FIGS. 20, 38, 39, 41 and 42), one edge portion of which is formed with teeth to constitute a segmental gear 317 (FIGS. 20 and 38). A stud shaft projecting downwardly from the part 316 carries a freely rotating roller 319 (FIGS. 20 and 39).

Below the member 316 another part 321 (FIGS. 20 and 38) is adjustably secured to the shaft 315, this part having a downwardly directed stud shaft carrying a freely rotatable roller 323 (FIGS. 20 and 38).

A shaft 420 (FIG. 40) turning in aligned openings 421 and 422 (FIG. 45) in parts 256, 257 respectively, of frame 255, has keyed thereto a segment gear 423 (FIGS. 38 and 40), located between the frame parts 256 and 257, which meshes with a segment gear 424 (FIG. 40) fixed to shaft 315 and having a tail piece 425 which is connected by yieldable connections, including a coiled spring 426, to a part 427 of the U-shaped member 312.

As is shown in FIG. 20, the rolls 293, 323 and 319 are at different levels, the roll 319 being the highest and the roll 293 being the lowest. These rolls are designed to engage normally stationary cams 325, 326 and 327 respectively (FIGS. 4, 20, 27 and 28). These cams are spaced apart by appropriate spacing means and are supported by a carrier 328 (FIGS. 20, 27 and 28), rotatably supported on the lower part of the shaft 250 and which is normally held stationary by a rod 329 (FIG. 28) of adjustable length, which is fixed at one end to the part 104 (FIG. 4) of the machine frame. By adjusting the length of this rod the carrier may be turned thus adjusting the entire set of cams as a unit.

The lowest cam 327 (FIG. 27) is the one which acts to turn the bottle carrier in one direction. This cam is normally held stationary by a rod 330 (FIG. 28) of adjustable length which connects it to a fixed part of the machine frame. By varying the length of this rod 330, this cam 327 may be adjusted relatively to the carrier 328. The other cams 325 and 326, which collectively control the position of the grip-finger assembly F, has arcuate slots to receive bolts 331 whereby the several cams may be adjusted relatively to each other.

The shaft 264, on which the bottle carrier 268 (FIG. 38) is mounted, is turned in one direction by engagement of the roll 293 with the edge of the cam 327 and in the opposite direction by the spring 289 (FIG. 39). However, because of the very high speed of the machine, it is found desirable positively to control the turning of the shaft 315 on which the grip-finger assembly F is mounted, by the use of the two rolls 319 and 323 and the corresponding cams 325 and 326. It may be noted that the above cams are simple plate-cams with the cam contours at their edges, this being desirable to avoid cavities, slots or other features in which, for example, broken glass, resultant from the breakage of bottles, might collect.

A grip-finger assembly F cooperates with each bottle carrier 268 thereby firmly to press the center of a label, which has just contacted the bottle, against the bottle while, at the same time, clamping the bottle firmly against the back-rest of the bottle carrier thereby to hold the bottle firmly and to prevent it from tipping while passing through the wiping zone.

As illustrated in FIGS. 60, 61 and 62, the grip-finger assembly F comprises a rigid post 70 whose lower end is seated in a socket in the upper part 311 of the frame 312 and removably secured by a bolt 312a. The post 70 has at least one and preferably a plurality of transverse holes, such as the hole 71, designed to receive a removable pivot pin 72 for pivotally attaching the grip-finger, proper, 73 to the post. The grip-finger, proper, as here shown, comprises the upper part 74 and the lower part 75, these parts being so related that a pad 77, secured to the lower part 75, is so angularly related to the pad 76, secured to the upper part 74, that the pads 77 and 76 may simultaneously press labels into contact with the body and shoulder portion, respectively, of a bottle. Grip-fingers for use with bottles of different shapes or sizes may readily be substituted one for another.

As shown in the top view (FIG. 62), the part 74 has a T-slot at its front side and the pad 76 is shaped to fit snugly within this slot. The lower part 75 of the grip-finger and the pad 77 are similarly shaped.

While such shape of slot is ordinarily sufficient to retain the pad in place, nevertheless additional retaining means, for example a spring-pin, such as shown at 78 (FIGS. 60 and 62) may be arranged to engage the rear edge of each pad. Since the grip-finger is not required to convey a label, it is not necessary to provide it with suction ports, as its function is to clamp a label or labels already adhering to the bottle, while the bottle is passing through the field of action of the wiping means.

As above noted, a primary object of the present invention is to provide a rotary machine of high capacity but of small superficial area. However, this demands the use of a turntable of relatively small diameter and having a high angular velocity of rotation and this, in turn, makes necessary a close spacing of successive bottles on the turntable. Under such circumstances, difficulty is to be expected in safely delivering bottles to the rapidly rotating table; in preventing the bottles from tipping during the application of the labels; and in delivering the labeled bottles from the turntable. Most commonly, in rotary machines of this general type, the turntable has a series of uniformly spaced bottle holders and a corresponding, relatively movable clamping element or grip-finger with means designed to introduce the bottle between the holder and grip-finger. Usually, the bottle holder is a part which is fixed relatively to the rotating table, while the grip-finger or label-lamping element moves in an arcuate path toward and from the bottle carrier. Customarily, the bottle holder is so shaped as partially to embrace the bottle. With such a bottle holder, fixed to the rotating table, it is particularly difficult to transfer the bottle from the supply conveyor to the table so as to place it (while the turntable is rapidly turning) in proper relation to the holder in the minute period of time available, and this is particularly true when the turntable is of small diameter so that the bottle holders are closely spaced and if it be attempted to rotate the turntable at more than the customary angular velocity.

For this reason, in accordance with the present invention, each bottle carrier, as above described, is mounted on a vertical shaft 264 (FIGURE 40) which revolves with the turntable, but which, in accordance with the present invention, is oscillated back-and-forth (in one direction by the cam 327 and roll 293 and in the other by the spring 289) in such a way that the concavity of the back-rest of the carrier is presented directly toward the approaching bottle as the latter is delivered to the turntable by the star wheel; is then turned so as to bring the bottle in proper position to meet the grip-finger and to propel the bottle through the wiping zone; and then reversely rotated, as the bottle approaches the discharge point, so that the concavity of the back-rest is presented directly toward the receiving channel so that the bottle is delivered into said channel without danger of tipping or being brought into contact with parts such as cause injury or a smash.

The turntable T, in general, comprises a top plate P (FIG. 20), whose upper surface is in the same plane as the upper surfaces of the rotating plates 179 and 180, above described, and which turns with the rotating shaft 250, and has circular openings which receive the base portions 269 of the respective bottle carriers and which also has arcuate slots G (FIG. 63) for the reception of the posts 70 of the grip-finger assemblies F. Above this plate P, there are fixed stationary inner and outer arcuate brush holders B$^1$ and B$^2$ (FIG. 63), having projecting therefrom tufts of bristles so disposed that as the bottle, to which a label has been applied, travels through the arc subtended by these brush holders, the end portions of the label are wiped firmly into contact with the moving bottle before the bottle escapes from between the brushes. The path along which the bottle travels while the wiping action is taking place subtends approximately a quadrant of arc, thus, in spite of the high velocity, insuring an adequate affixing of both ends of the label.

Desirably, the plate P which forms the top of the turntable T comprises a plurality of segmental parts P$^1$ (FIG. 21a) whose inner edges overlap an annulus 430 which is clamped by screws 431 (FIG. 20) to a horizontal flange 432 projecting from a sleeve 433 fixed to the shaft 250. Each of the segmental parts P$^1$ of the plate P is also supported by a spacer 434 (FIG. 21b) socketed at its lower end in a hole in a horizontal flange 261a (forming a part of the sleeve 260 which is secured to shaft 250) which overlies the upper member 256 of each of the frames 255 (FIG. 20).

Referring to FIG. 19, the numeral 125m designates that portion of the inner of the three feed conveyors which delivers bottles to a corresponding one of the labeling units 100. Suitably shaped stationary guides D$^1$ and D$^2$ define a channel E along which the bottles B advance from the inner conveyor run onto the rotating plate 180, which continues to move the bottles along the channel E until the foremost advancing bottle is entered into one of the spaces between the adjacent teeth of the rotating star wheel SW. At one side of the channel E, near its discharge end, there is arranged a detector arm 375 mounted on a rotary shaft 376, to which there is attached a switch-actuating element 377 which cooperates with the safety switch LSP-8. The detector arm 375 is normally held in the broken line position indicated in FIG. 19, until it is contacted by a bottle and thereby swung to the full line position in which the switch is closed.

A second detector arm 378 is mounted on a vertical shaft 379 to which there is secured a switch-actuating arm 380 which controls the operation of the safety switch LSP-1. The detector arm 378 is urged by spring means toward the broken line position shown in FIG. 19, but when contacted by a bottle neck is pushed outwardly to the full line position where the arm 380 is effective to actuate the switch.

As shown in the same FIG. 19, there is a third safety switch LSP-5 whose operation is controlled by the arm 216 fixed to the upper end of the shaft 215, above described, which responds to a jam of articles in the star wheel to break the drive motor circuit.

The numeral 390 (FIG. 66) indicates that part of the innermost of the discharge conveyor channels onto which the labeled bottle is discharged. As the bottles are ejected from the turntable they enter the throat 391 of a channel D$m$ (FIG. 63) having stationary walls which guide the bottles, as they are moved along by the plate 179, this plate turning in the proper direction to advance the bottles and eventually to deliver them into the channel 390.

A detector device 392 (FIG. 19), fixed to a rotatable vertical shaft 393, partially surrounds the channel D$m$ so as to be contacted by a bottle which may, when discharged from the turntable T, fail to enter the channel D$m$ in upright position. In such an event the detector 392 will be swung in a counterclockwise direction and, in so moving, will separate a control finger 394, secured to the rotatable shaft 393, from the safety switch LSP-7, thus breaking the drive circuit and providing an emergency stop.

In accordance with the present invention, because of the high velocity of rotation of the turntable, making it unusually difficult to deliver bottles to or discharge them from the table without allowing them to tip, and for holding them firmly in place during the application of the label, provision is made for applying strong suction at the back-rest of the bottle carrier as the bottle is propelled toward the carrier by the star wheel thereby top pull the bottle toward the back-rest and hold it firmly against the back-rest in label-receiving position until clamped to the carrier by the grip-finger. Moreover, at the point of delivery, jets of compressed air are discharged through the suction cups so as forcibly to eject the labeled bottle from the carrier into the throat 391 (FIG. 63) of channel Dm within the short space of time available.

For this purpose, the machine is provided with two fixed cams Cv and Cp (shown in broken lines in FIG. 19), suitably supported by the machine frame. Each bottle-gripping assembly 1000 (FIG. 38) is provided with a valve 402 (FIGS. 52, 53 and 54) which, by the action of these cams, is effective to connect suitable passages in the bottle-gripping assembly with a vacuum pump or alternatively with a supply of compressed air, respectively, during predetermined portions of the cycle of rotation of the turntable. Such a valve device is shown in FIGS. 52, 53 and 54 as comprising a casing 402a located within a chamber 404 (FIG. 47) in that part of the frame 255 of each bottle-gripping assembly 1000, designated by the numeral 403 (FIGS. 52, 53 and 54). This chamber 404 has a compressed air supply passage 405 (FIGS. 52, 53 and 54) which communicates with a passage in the main shaft 250 of the turntable (FIG. 20). A passage 406, leading from one side of the chamber 404, communicates, by means of a suitable passage in the shaft 264, with the passage 282 (FIG. 51) in the base of the corresponding bottle carrier, while another passage 407, leading from this chamber 404, communicates by means of appropriate ducts in the turntable shaft with a vacuum pump.

The valve casing 402a has a cylindrical bore within which there slides a valve comprising axially spaced heads 408, 409 and 410, with a part 411, of lesser diameter than the heads 408 and 409, connecting the latter, and another part 412, of lesser diameter than the heads 409 and 410, connecting the latter heads. From the head 410 an actuating stem 413 of substantial length extends radially outwardly beyond the periphery of the frame of the bottle-gripping assembly and is designed to successively contact the inner peripheral surfaces of the cams Cv and Cp as the turntable rotates.

As illustrated in FIG. 52, the end of the actuating stem 413 is at its outermost position (resultant from air pressure acting on the left-hand head 408 of the valve) and is not contacting either of the cams Cv or Cp. In this position the passage 405 is not in communication, either with the passage 406 or with the passage 407, so that the air pressure in the passage 406, under these conditions, will be substantially atmospheric.

As the turntable rotates and as the bottle carrier of a given bottle-gripping assembly 1000 approaches the position of the carrier shown at 270a (FIG. 67), the end of the stem 413 will contact the inner surface of the cam Cv which is so contoured as to push the stem 413 inwardly to the position shown in FIG. 54, which places the passage 406 in communication with the passage 407, thus providing direct communication between the vacuum pump and the bottle carrier. This establishes strong suction at the suction cups 279 of the back-rest of the carrier so that, as the bottle is ejected toward the carrier by the star wheel SW, its velocity will be increased so that it will overtake the receding carrier and be drawn forcibly against the suction cups and thus not only prevented from tipping in approaching the carrier, but will be held firmly in contact with the suction cups as the table continues to revolve and the carrier rotates about its own axis. The stem 413 continues to contact the cam Cv until after the carrier reaches approximately the position of the carrier 270b (FIG. 67) at which point the grip-finger F has contacted the label and thus clamped the bottle against the back-rest. As the actuating stem 413 leaves the cam Cv, the air pressure, which is maintained in the passage 405, automatically restores the valve to the position shown in FIG. 52. However, as the table continues to turn, the actuating stem 413 will eventually contact the cam Cp which is so contoured as to move the valve stem and thus position the valve, as shown in FIG. 53. In this position compressed air from the passage 405 enters the chamber 404 and, by means of an axial passage 414 in the valve, reaches a radial passage 415 by means of which it communicates with the passage 406, thus escaping through the central ports in the vacuum cups on the bottle carrier to provide jets of air such as to eject the bottle from the carrier and into the entrance 391 to the discharge passage and onto the rotating plate 179, by which the bottle is delivered to the discharge conveyor.

It is preferred that in most instances the switches employed be of the type known as "proximity switches," that is to say, switches wherein a variation in a magnetic field determines the opening or closing the switch rather than the application of mechanical force. A conventional commercial switch of this type is diagrammatically illustrated in FIGS. 25 and 26, wherein the fixed switch contacts are indicated at N.C. and N.O. respectively, and the movable contact at Cm, this movable contact being carried by a lever 395, for example of steel or iron, which is normally held in the position of FIG. 25 (by an electromagnet E), in opposition to the force exerted by the spring 396. With the switch parts disposed as shown in FIG. 25, if a mass 397 of metal, especially ferrous material, be brought into the field of the magnet E, the field which normally holds the lever in the position of FIG. 25 is so weakened that the spring 396 is permitted to swing the lever to the position of FIG. 26, thus shifting the movable contact Cm over to the fixed contact N.O. and so breaking the circuit. Although this particular type of switch is not a part of the present invention, it has been thought desirable to describe it herein in order that its mode of operation might be readily understood.

Provision is made, by the use of appropriate piping connections (not shown) and passages such as the passage Lm (FIGS. 20 and 46), provided in parts of the machine, for supplying lubricant to the bearings, conveyor sprockets and chain drives—the lubricant being delivered under pressure by a pneumatically driven oil pump Px (FIGS. 68, 69 and 74) to which compressed air is supplied under control of a manually-actuatable valve Vm and also by a valve SV-2 under the control of a time clock—the latter being set to deliver lubricant to the bearings at prearranged intervals whose length may be adjusted within a substantial range, for example 10 minutes to 8 hours.

Motion is transmitted (FIG. 4) from the main drive motor Mm through a timer belt B² to a pulley fixed to the input shaft of a worm-type speed-reduction unit (not shown) of conventional type. From the output shaft of this reduction unit, power is transmitted to the turntable shaft 250 by a train of gears, and to the cam (not shown) which drives the gum-transfer rolls through another train of connections.

The field of the drive Mm (FIG. 4) is supplied with approximately fifty watts of direct current power. The speed is controlled by regulating the direct current voltage in the motor armature and this power is controlled through a magnetic amplifier.

By the use of rheostats, the AC power to the magnetic amplifier is varied and the amplifier, in turn, controls the direct current motor. Each individual machine is designed to have four different speeds: "low" or "idle" speed; "magazine-filling" or "intermediate" speed; and two "high" speeds, including "normal" or "running" speed and very "high" or "reverve" speed. Because, at the normal speed it is not practical to try to add labels to the magazine, provision is made for running the machine at the lower speed, referred to as the "intermediate" or "magazine-filling" speed, which is between the normal speed and the idle speed. The low or idle speed is adjusted for filling twenty bottles per minute; the label-magazine labeling speed is sufficient to label thirty-five bottles per minute; while the normal speed may vary from seventy-five to one hundred and thiry bottles per minute; and the high speed from one hundred to one hundred and fifty bottles per minute. The alternating current from the supply is changed to direct current by the use of silicon rectifiers (diodes). Desirably, the field windings of the drive motor are always energized thus keeping the motor warm and dry. By means of a dynamic brake control, the unit will stop almost instantly in response to a stop button.

In order to insure optimum control of the vacuum at each bottle carrier and to avoid the possibility that the suction ports will not be plugged by foreign material, the cams which control the delivery of compressed air or the establishment of vacuum at the carriers are preferably so designed that a puff of compressed air is delivered immediately preceding the establishment of vacuum at each respective carrier so as to insure that any material blocking a suction port will be blown away. During the wash cycle, while the labeler is in motion, but no bottles are being carried by the turntable, air at high pressure, for example 40 pounds per square inch, is supplied to each bottle carrier to prevent water or other material from entering the vacuum system.

It is important that the labeler is not allowed to run if the air and vacuum supply is low or the operator forgets to open the air valve or turn on the vacuum pump motor. Thus, when the air pressure drops below 30 pounds, a pressure control switch automatically shuts off the labeler and the "AIR" light on the control panel goes out. Likewise, if the vacuum drops below 7 or 8 inches, the "VACUUM" light on the control panel will go out automatically and a vacuum-controlled switch stops the labeler.

In the following description, that radius of the circular bottle carrier base which bisects a line connecting the extreme tips of the arms of the carrier will be referred to as the "Bisector Radius."

As already noted, because of the high rotational speed of the turntable and its small diameter (required to conserve floor space), the transfer of the bottle from the star wheel to the carrier on the table and the transfer of the labeled bottle from the carrier to the rotating delivery plate 179, without danger of tipping the bottle or causing a smash, presents unusual difficulties. For optimum conditions of transfer of a bottle from the star wheel to a carrier on the rotating table, the bisector radius of the carrier should coincide with a line joining the center of the star wheel and the center of the turntable at the instant at which transfer begins and to assure clearance of the bottle from the star wheel as the bottle recedes from the latter, the angle at which the bisector radius intersects the line joining the center of the table and the center of the delivery plate should progressively increase until transfer is complete. On the other hand, at the labeling point at which a label is stretched across the path of the bottle, the bisector radius should be perpendicular to a radius of the table in order that the axis of the bottle may move along a line bisecting the length of the label. This relationship should be maintained as the bottle, with the center of the level adhering thereto, moves between the brushes, in order that both ends of the label may be wiper firmly into contact with the bottle. However, as the bottle nears the discharge point, the carrier should be so turned that the bisector radius coincides with a line joining the center of the turntable and the axis of the delivery or discharge plate 179 at the instant at which transfer begins. With the parts thus positioned, ejection of the bottle from the carrier results in a trajectory of the bottle such as to carry it clear of the carrier and into the mouth 391 of the delivery or discharge channel without danger of tipping or so contacting the walls of the guiding channel as to cause a jam.

These desirable results are attained in accordance with the present invention by the provision of the means heretofore described whereby the bottle carrier may be turned about its own axis, first in one direction and then in the other during a single revolution of the carrier about the axis of the turnable. The arrangement thus provided has the further advantage that but one star wheel is required instead of a plurality of cooperating parts such as heretofore been thought necessary to attain the acceptable results.

In the arrangement illustrated, by way of example, the star wheel spaces the bottles a distance equal to a bottle diameter plus one-fourth inch or approximately two and three-fourths inches center-to-center for a twelve ounce export bottle. The center-to-center distance between bottles on the turntable is nine and three-quarters inches. By rotating the bottle carrier counterclockwise at a predetermined rate as it approaches the transfer point, the motion of the carrier about the axis of the turntable may be made to match the speed of the bottle as the latter is delivered from the star wheel pocket.

FIGS. 71 and 72 graphically illustrate the motions of the bottle carrier and grip-finger during one complete revolution of the turntable. Referring to these views, it will be seen that when the turntable has turned 220° (from the illustrated arbitrarily selected 0° position), the grip-finger leaves the bottle and at 227½° the bottle carrier begins to turn counterclockwise or oppositely to the direction of rotation of the turntable and continues to turn in this direction until it reaches the delivery or discharge point (where the bisector radius R$b$, FIG. 72, of the carrier coincides with a line joining the center of the turntable T and the center of the delivery or discharge plate 179 at 249½° of the turntable) and still continues to turn counterclockwise until at 257° of the turntable, the carrier begins to turn clockwise until it reaches approximately 275° of the turntable, then remaining substantially unchanged in position relatively to the turntable until at the point 303° of the turntable it begins to turn counterclockwise. At 316° of the turntable the bisector radius R$b$ (FIG. 72) of the carrier coincides with a line joining the center of the turntable and the center of the star wheel, this being the point at which the star wheel delivers a bottle to the turntable. The carrier continues to turn counterclockwise in order to assure clearance between the bottle and the teeth of the star wheel until it reaches 328° of the turntable when it suddenly begins to turn clockwise, continuing to turn in this direction until it passes the 0° position of the turntable. At 4° of the next revolution of the turntable, the bisector radius R$b$ (FIG. 72) of the carrier becomes tangent to the circular path described by the center of the carrier as the table rotates. At an instant thereafter (FIG. 67), the bottle contacts an adhesively-coated label which is held by its ends by the picker blades K$^1$, K$^2$ and which extends transversely across the bottle path. At 6° of the turntable rotation, the grip-finger contacts the uncoated side of the label and clamps the label against the bottle and the bottle against the back-rest of the carrier. As the table continues to turn, the carrier remains with its bisector radius perpendicular to a radius of the table while the bottle advances between the brushes B$^1$, B$^2$ which wipe the ends of the label firmly about the bottle, the brushes being of such arcuate length (approximately 90°) that the ends of the label are subjected to a wiping action for a substantial period of time. When the bottle leaves the brushes, the grip-finger F is moved away from the bottle thus completing the cycle.

Shortly after the labeled bottle has been discharged from the carrier, the carrier is turned clockwise and when the carrier reaches 275° of the turntable, it has been turned until its bottle-steadying ribs are directed outwardly, that is, away from the center of the turntable, and the carrier now remains stationary with respect to its own axis of rotation until it reaches 303° of the turntable where it begins slowly to turn in a counterclockwise direction. In the meantime, a bottle is being advanced by the star wheel while in contact with the fixed guide G10 (FIG. 19) and resting upon a stationary dead plate (not shown) along which it slides in response to the pressure of the star wheel. When the turntable reaches 304°, the bottle is still contacted by the fixed guide G10 but is now also contacted by the pusher roll 215x, which exerts resilient pressure on the bottle, urging it outwardly away from the star wheel. When the turntable reaches the 308° point, the bottle carrier is turning about its own axis in a counterclockwise direction while the bottle is still contacted by the star wheel, the fixed guide and the pusher roll. When the turntable reaches the 310° point, with the carrier still turning counterclockwise, the bottle is still in contact with the star wheel, the pusher roll and the fixed guide, and now also contacts both of the steadying ribs of the bottle carrier. The valve 402 is now actuated to establish suction at the ports 280 of the back-rest. When the turntable reaches the 312° point, the bottle has cleared the fixed guide G10 and is no longer contacted by the star wheel but, at this time, has been drawn firmly into contact with the ribs of the carrier by the vacuum while likewise urged toward the ribs of the carrier by the pusher roll 215x.

At the 316° point the bisector radius of the carrier coincides with a line joining the center of the star wheel and the center of the turntable; the carrier is still turning counterclockwise; and the presser roll still contacts the bottle. The counterclockwise motion of the carrier continues until the table reaches the 328° point of rotation, with the presser roll still contacting the bottle, but immediately thereafter the bottle leaves the presser roll and is now so positioned, as it revolves with the table, that it easily escapes contact with the nearest tooth of the star wheel. At approximately this point, the bottle carrier starts to turn rapidly in a clockwise direction until its bisector radius is tangent to the circle described by the radius of the carrier as it revolves with the turntable, and it continues in this position, relatively to the turntable, while the label is being applied.

When the grip-finger leaves the labeled bottle, as the latter approaches the discharge point, the bisector radius of the carrier is still substantially tangent to the circle which is described by the axis of the carrier as it revolves with the turntable. However, as above described, when the turntable reaches the 227½° point in its rotation, the bottle carrier begins to turn counterclockwise and this motion continues until the turntable reaches the 249½° point, at which the bisector radius of the carrier coincides with a line joining the center of the star wheel and the center of the plate 179. At this point, air jets (for example, at 10 p.s.i.) are delivered from the ports in the carrier back-rest, disengaging the bottle from the ribs of the carrier, and projecting it onto the rotating plate 179. The bottle, carried by plate 179, has cleared both ribs of the carrier when the turntable reaches the 252½° position and at approximately this point the rotation of the carrier about its own axis stops, the carrier now being so positioned that as it is carried along by the rotating table, the ribs of the carrier clear the switch-actuating finger 392, and at 257° begins to turn clockwise, as above described.

By this means, it is assured that bottles will be placed on the turntable of each respective labeling unit and removed therefrom while moving at a velocity which bears a predetermined relation to the angular velocity of the turntable.

The normal operation of the machine is described hereinafter under the general heading, Electromechanical Operating Sequence.

*Electrical circuitry*

The following is a description of the electrical circuitry used and the functions of the electrical components involved in the operation of a labeling machine according to the present invention. Designating characters herein employed (except as otherwise indicated) refer to the wiring diagrams (FIGS. 68 and 69). It is assumed that in the following circuit description the three selector switches (FIG. 59) have been turned to the left to indicate "run" and "label" respectively.

The numerals in the column at the extreme left of FIG. 68 are for convenience in identifying the circuits as hereafter described.

*Circuit Line 1 to 36*—are the circuits for the conveyor, gum-roll drive, vacuum pump, auto-lubrication and the LSP-9 "reserve" and "run" speed control switch.

*Circuit line 21*—This is the circuitry for the vacuum pump motor consisting of a "START" button, a "STOP" button and a Magnetic Starter. The motor contacts operated by starter coil VP are in Circuit Lines 1, 2, and 3.

*Circuit line 26*—This is the circuitry for the motor M² which drives the supply conveyors and the gum-presenting roll 133. It consists of a "START" and a "STOP" push button and a Magnetic Motor Starter. The contacts operated by starter coil CM are in Circuit Lines 5, 6 and 7.

*Circuit Line 28 to 34*—This circuitry is used for the lubricant pump.

*Circuit line 28*—The time clock is in this circuit and at preset times will hold its contacts closed (9, 14) (Circuit 30) for two minutes, energizing SV-2 solenoid valve (Circuit 33), and SV-2 solenoid valve which, when energized, supplies air to the pneumatic lubricant pump which, in turn, pumps a single shot of grease to all units. The time clock is energized and operates only when the conveyor motor starter CM (Circuit 26) is energized. Push button PB-5 Lube-Test, will, when pressed, by-pass the time clock and energize the SV-2 solenoid valve directly. This push button is used for testing and to give an additional shot of grease when needed. Interlock CM (17, 16) and VP (3, 16) (Circuit 30) is used to prevent the starting of any unit unless the conveyor and vacuum pump motors are running.

*Circuit line 37 to 101*—These circuits are used for a single labeling unit 100. Each additional unit will have like circuitries.

*Circuit line 50*—This is the "INCH" circuit. Pressing PB-6 push button completes the circuit between the control transformer and the SCR motor speed control (FIG. 68) through terminals 4 and 14 on the SCR motor speed control terminal board. This will start the drive motor and the motor will run as long as the push button is held depressed. The drive motor will only run in the low or the intermediate speed by a single depression of the "INCH" button.

*Circuit line 54 to 70*—These are the "STOP-START" and safety stop circuits. The safety switches LSP-5, LSP-6 and LSP-7 are held closed until a jam occurs; then the switch involved will open and stop the labeling unit. LSP-2 safety switch is normally closed once each cycle by the flexible finger Fx on the picker carrier lever arm 50b (FIG. 24b) in the gear box and is open for the remainder of the cycle. During the time the switch is open, contacts CR-2 (23, 24) (Circuit 62) are closed. These contacts are opened, by safety switches LSP-3, only when LSP-2 safety switches contacts are closed so that there is always a complete path through this part of the circuit. If LSP-2 safety switch is not actuated due to a jamb in the pickers (which prevents the arm from travelling its full stroke so that the finger Fx does not actuate LSP-2 switch); then when relay CR-2 contacts (23, 24) are opened by switch LSP-3 the circuit will be broken and the drive motor will stop. When either "START" push button is pressed, the circuit will be completed from the control transformer, wires 1 to 3 (FIG. 68), through the two interlocks VP (3, 16) and CM (16, 17) (Circuit 30) to the "RUN-WASH" selector switch contacts (17, 26), through the two "STOP" push buttons, the safety switches, the "START" push button and the CR-1 relay coils and back to the control transformer wire 2. The CR-1 relay will then be energized and closes two contacts (18, 19) and (19, 20). The closing of (19, 20) contacts locks in the CR-1 relay so that when the "START" button is released the CR-1 relay will remain energized. The closing of CR-1 relay contacts (18, 19) in (Circuit 54) will energize the SCR motor speed control through the speed control terminals 4 and 14. The motor will continue to turn until one of the "STOP" buttons is pressed or one of the safety switches is opened. This will break the circuit to CR-1 relay which will deenergize and open its contacts, breaking the circuit to the SCR motor speed control and stopping the drive motor.

*Circuit Line 78 to 80.*—This is the "NO LABEL" control circuit. The LSP-4 switch, actuated by timer disc 362 (FIG. 57) energizes SV-1 label control solenoid valve once each cycle. This timer disc is so timed that the solenoid valve SV-1 will be energized and so move the position in the air cylinder 42 as the transfer roll leaves the picker. This will shorten the stroke of the picker arm mechanism and the picker will be prevented from travelling its full stroke into the label holder. When the pickers are travelling away from the label holder the timer disc 362 (FIG. 57) will actuate the switch LSP-4 again and de-energize the solenoid valve SV-1 and the piston in the air cylinder 42 will return to its original position, placing the pickers back to their normal travel or stroke. When labels are to be applied, CR-3 relay is energized, opening its contacts (37, 38) (Circuit 80). The SV-1 solenoid valve will now remain de-energized and the pickers will be allowed to travel their full stroke into the label holder and picker labels.

*Circuit line 84 and 88*—This is the timing or phasing circuit. Relay CR-2 is energized for most of the cycle by LSP-3 switch actuated by disc 362 (FIG. 57) and will de-energize the CR-2 relay momentraily once each cycle. The CR-2 relay contacts are in the picker safety switch circuit and the label control circuit. The disc-actuated switch LSP-3 is so timed that the relay will be energized and open its contacts (23, 24) in (Circuit 63) when the LSP-2 safety switch is closed by the picker level arm 52a in the gear box. If the picker arm 52a is prevented, by a jamb, from travelling its full stroke and does not close LSP-2 safety switch when CR-3 contacts (23, 24) open, the holding circuit to the SCR motor control is opened and the drive motor on the unit stops. CR-2 contacts (41, 42) and (42, 43) in (Circuits 91 and 93) are to time the start and end of the labeling cycle.

*Circuit line 91 et seq.*—This circuit is the label control circuit and speed control. LSP-1 switch is actuated by a bottle in the star wheel just before the bottle leaves the star wheel and enters a bottle carrier. If switch LSP-1 is held actuated when LSP-3 disc-operated switch (Circuit 86) de-energized CR-2 relay momentarily, the CR-2 relay contacts (42, 43) close and the circuit is completed through the LSP-1 contacts, CR-2 relay contacts (42, 43) and through the CR-3 relay coil. CR-3 relay then energizes and closes its contacts CR-3 (3, 41) (Circuit 91) and contacts (42, 43) (Circuit 96) locking in the CR-3 relay. CR-3 contacts (37, 38) (Circuit 80) open, keeping SV-1 solenoid valve de-energized and permitting picking of labels by the pickers. The TD relay will also be actuated and after a predetermined time delay its contacts TD (45, 46) will close, energizing the CR-4 relay. This is one of the speed control relays which controls the speed of the drive motor. When switch LSP-1 is released, CR-3 relay will remain energized until LSP-3 disc-operated switch de-energizes CR-2 relay momentarily and opens its contacts CR-2 (41, 42) in (Circuit 91). Relays CR-3 and CR-4 will de-energize, stopping the labeling cycle and lowering the speed of the unit.

*Circuit line 36.*—This is a "run," "reserve" speed relay circuit. Vane-operated switch LSP-9 is actuated by an excessive accumulation of bottles on the infeed conveyor. This switch, when actuated, will energize relay CR-6. Relay CR-6 will, when energized, change the speed in all units then in "high" speed from "run" to "reserve."

Selector switches

*"RUN-ADD LABEL" selector switch.*—The foregoing circuits have been described with the "RUN-ADD LABEL" selector switch (FIG. 59) in the "run" position. When this selector switch is turned to the "ADD LABEL" position it breaks the circuit through relay CR-5, placing the unit into intermediate or label-replenishment speed. It will remain at this speed until the labels have been added to the label holder and the selector switch returns to "run" speed. The drive motor will then go back into high speed.

As shown diagrammatically in FIG. 74, a pipe CA, leading from a supply of compressed air, delivers the air under control of a valve Vm to an air filter 701 from which the air flows to a manually-controlled pressure regulator 702 and thence through an air lubricator 704. A branch pipe 705 supplies compressed air to the pneumatically driven lubricating pump Px under control of a solenoid valve SV-2. From the air lubricator 704 a pipe 706 delivers compressed air to the picker control cylinder 42 as determined by the solenoid valve SV-1, while a branch pipe 707 conveys compressed air to the three-way manually-actuatable valve 708. From the valve 708 a pipe 709 leads to one arm of a T-connection 710 to whose opposite arm there is connected a pipe 710a through which hot water or hot water mixed with steam is supplied under control of the manually-actuatable valve 711. From the other arm of the T-connector 710, a pipe 12 leads to a manually-actuatable valve 713 which controls the delivery of fluid to a nozzle or discharge member P5, arranged to deliver fluid into the gum box and on to the scraper 115 and gum roll 114.

From the aforesaid pipe 707 a branch 714 extends to the diaphragm chamber of a pneumatically-actuated control valve V20 as permitted by a solenoid valve SV-3. The electrically-driven vacuum pump VP of the labeling machine is connected by a pipe 715 to the control valve V20 from which a pipe 716 leads to the three-way valve 708 and another pipe 717 leads to the labeling machine 100 where it is connected to the inlet passages 405 of the valves 402 which determine the establishment of vacuum or pressure at the several bottle carriers.

*"RUN-WASH" selector switch.*—At the conclusion of a day's production run, the bottle carrier air passages, the gum box Z, the scraper 115, the transfer rolls $R^1$, $R^2$, and the pickers $K^1$, $K^2$ are cleaned in the following manner:

The "RUN-WASH" switch (FIG. 59) is turned to the "WASH" position and the following takes place.

(1) Solenoid valve SV-1 is de-energized and so admits air to the lower end of the cylinder 42, thus insuring that the pickers will make their full stroke.

(2) Solenoid valve SV-3 is de-energized thus cutting off compressed air from the valve V20, so that the latter, by its spring action, closes the conduit 715 extending to the vacuum pump VP.

(3) Control valve V20 also opens the line from the manual control valve 708 to the labeling machine through the pipes 716 and 717.

As above pointed out, the machine will automatically run at "low" speed so long as no bottles are allowed into the infeed star wheel. When in the neutral position, the manually-controlled three-way switch 708 shuts off both water and air from the pipe 716.

In the "WASH" position of valve 708 and assuming that valve 711 has been opened, hot water and/or steam is allowed to pass through the conduit 716, 717 to the air passages 282 of the bottle carriers and thence to the suction cups 279. Foreign particles resulting from bottles broken accidentally on the turntable; liquid from broken bottles; or other materials lodged in the air passages 281, 282 of bottle carriers 268 and which have been pulled in by suction during the normal production period are thus washed out by the water solution. After flushing the bottle carrier air passages with hot water and/or steam the hot water valve 711 is now closed; the pressure regulator 702 is set to 40 pounds; and the manual control valve 708 is turned to the "blow" position. Compressed air is thus supplied to the bottle carrier air passages driving out all of the water and leaving the passages clear and clean for the next day's production run. The manual control valve 708 is now set to neutral position and the "RUN-WASH" selector switch is set to the "run" position. The valve 713 is now closed. By delivering compressed air at high pressure at the conclusion of the "WASH" cycle, all of the water is blown out of the passages so that when the valve V20 is actuated to open the pipe 715 to the vacuum pump, there is no danger that water will be sucked into the vacuum pump so as to interfere with the proper operation of the latter.

*"LABEL-NO LABEL-TEST" selector switch.*—When this switch (FIG. 59) is in the "NO LABEL" position both contacts (42, 44) and (42, 45) are opened, preventing energization of relays CR–3 and CR–4. This prevents the picking of labels and keeps the unit in intermediate or label-replenishment speed. When the selector switch is in the "TEST" position, contacts (42, 44) close and contacts (42, 45) remain open. This permits the CR–3 relay to energize and allows the picker to pick labels, but keeps relay CR–4 de-energized and the unit will remain at intermediate speed.

Pilot lights

*"START" pilot light*—This pilot light is an illuminated "START" push button (Circuit 68). When the "START" push button (FIG. 59) lights up it indicates that all safety switches and "STOP" push buttons are closed and the unit will start when the "START" push button is pressed.

*"WASH" pilot light*—(Circuit 75). This pilot light (FIG. 59) is an illuminated "STOP" push button. This push button will light up when the "RUN-WASH" selector switch is in the "WASH" position, indicating that the unit is ready to be washed down and will not accept bottles into the unit.

*LSL–2 pilot light*—(Circuit 70). LSL–3 PILOT LIGHT (Circuit 88) and LSL–4 PILOT LIGHT (Circuit 83) are lighted by their respective switches LSL–2, LSL–3 and LSL–4. They are used to check the timing and the operation of these switches.

*SCR motor speed control*—This control (FIG. 67) rectifies and controls 220 volt AC power to vary the speed of the DC shunt-drive motor. Terminals 1 and 2 are for the 220 volt AC power input. Terminals 5 and 6 provide the DC motor fields with a constant DC source. Terminals 7 and 8 provide the armature with a controlled DC output. By varying this output the speed of the DC motor is varied. To start the motor, terminals 4 and 14 have to be energized by a 110 volt AC source. This is provided by the control transformer. By opening and closing the circuit to terminal 4 the control can be made to stop and start the motor. Terminals 9, 10, 11, 15 and 16 are the speed control terminals which are controlled by relays CR–4, CR–5 and CR–6. The "reserve" or "super-speed potentiometer" with two internal resistors, "low" and "intermediate" speed, forms a voltage divider (FIG. 68). By selecting a voltage from this voltage divider and feeding it to terminal 10, one may determine at what speed the control will drive the DC motor. By the use of three relays, four different preselected speeds can be obtained automatically to suit the operating conditions.

Referring to FIG. 68, where it is shown diagrammatically, the voltage divider consists of the "reserve" and "run" potentiometers externally mounted; and two internally mounted adjustable resistors, "intermediate" and "low" speed. By feeding terminal 10 from any one of these four points, four different speeds can be obtained. The speed is selected by energizing one or more of the three relays, CR–4, CR–5 or CR–6. When no relays are energized, by tracing the circuit from terminal 10, it can be seen that it goes to terminal 15, which will give "low" speed. If CR–4 relay is energized, one may see, by checking the FIG. 68 circuitry, that current from terminal 10 now goes to terminal 16 and provides the intermediate speed. If CR–5 is energized and CR–4 is de-energized, again it will also connect terminal 10 through terminal 16 and provide the intermediate speed. If both relays are energized simultaneously, current from terminal 10 now goes to the "run" potentiometer and the machine will go to "run" speed. If all three relays are energized (CR–4, CR–5 and CR–6), the current will go from terminal 10 to the "reserve" or "super" speed potentiometer and the machine will go into "reserve" speed. CR–4 relay is actuated by the LSP–1 switch at the infeed to the labeler unit. CR–5 relay is operated by the LSP–8 switch at the infeed to the star wheel. CR–6 relay is actuated by the vane-operated LSP–9 switch on the infeed conveyor.

Electromechanical operating sequence

The following describes one labeling unit. A complete machine would contain one or more units, infeed and discharge conveyor and a vacuum pump.

For normal operation of a labeling unit the infeed and discharge conveyor must be running. The air and vacuum must be turned on to the machine. The three selector switches (FIG. 59) on the infeed side of the unit must all be turned to the left so that the "RUN-ADD LABEL" switch is in the "run" position; the "RUN-WASH" selector switch is in the "run" position; and the "LABEL-NO LABEL-TEST" selector switch is in the "label" position. Under these conditions when there are no bottles in the infeed star wheel the unit will start up in the "low" speed when either "START" push button is pressed. When a bottle enters the infeed star wheel it trips LSP–8 switch (FIGS. 19 and 68). This switch actuates the SCR motor speed control, causing the labeler to increase its speed from "low" to "intermediate." The bottle will be advanced by the star wheel toward the bottle carrier but before the bottle leaves the star wheel it trips a second switch LSP–1. This switch operates the label control circuit and also, in conjunction with LSP–8, it controls the SCR motor speed control.

When both LSP–1 and LSP–8 switches are held tripped by a continuous line of bottles entering the labeling unit, the SCR motor speed control will increase the speed of the drive motor to high speed. When the last of a line of bottles arrives at the unit, the LSP–8 switch will be released first and this will cause the SCR motor speed control to slow the drive motor down to intermediate speed; and next, when the LSP–1 switch is released, the drive motor will go down to low speed.

To summarize, when neither LSP–1 or LSP–8 switch is tripped, the labeler will be in low speed. When either switch is tripped, the labeler will be at intermediate speed. When both switches are tripped, the labeler will be in high speed.

There is a time-delay operated by LSP–1 switch which delays the drive motor from going into high speed immediately. When a line of bottles first enters the labeling machine and trips LSP–1 switch, this time-delay allows bottles to get into the labeler before increasing the speed to high speed.

High speed on the labeler consists of "running" or "normal" speed and "reserve" speed. "Running" speed is the normal operating speed when labeling bottles. "Reserve" speed is a higher speed and is used when there is an excess of bottles accumulating at the infeed to the units. Reserve speed is controlled by switch LSP–9 which is tripped by the detector 352 (FIG. 6) on the infeed conveyor at the last unit. When the excess bottles accumulate, they push this detector, which, in turn, trips LSP–9 switch, and all units that are in high speed will increase their speed from running to reserve.

When this excess amount of bottles is absorbed by the labelers and the detector is released, the LSP–9 switch will also be released and all units running at reserve speed will go back to running speed. Any labeling unit in low or intermediate speed will not be affected by the LSP–9 switch. There is only one LSP–9 switch for a "complete" machine (one or more machine units 100) and when any unit calls for high speed, the LSP–9 switch will determine whether the high speed will be running or reserve.

Low and intermediate speds are set by the factory but can be altered in the field if conditions warrant it. Running and reserve speeds can be readily adjusted by the operator to meet operating conditions.

When there are no bottles in the labeler, the labeling unit will not pick labels. The pickers are prevented from entering the label holder and picking labels by the air cylinder 42 (FIGS. 22 and 24a), which is actuated immediately after the gum-transfer roll leaves the pickers. This cylinder shifts the picker carrier lever 51 in the gear box, which shortens the travel of the picker stroke so that the pickers do not travel far enough to reach the label holder.

When the pickers reverse direction and are travelling away from the label holder, the air cylinder 42 is de-actuated, placing the picker back in their normal travel. This air cylinder is actuated once each cycle, as the pickers approach the label holder by the solenoid valve SV–1 (FIG. 23), so that the pickers never pick labels when there are no bottles in the unit to be labeled.

The solenoid valve is energized by a disc-operated switch LSP–4 (FIG. 58). The disc 362 is so timed as to operate the switch and indirectly operate the air cylinder at the proper time to prevent labels from being picked by the pickers. When a bottle in the feed star wheel trips LSP–1 switch, the solenoid valve SV–1 is de-activated so that the air cylinder does not operate and the pickers are allowed to travel their full stroke into the label holder to pick labels.

The disc-operated switch LSP–3 (FIG. 24c) works in conjunction with LSP–1. This disc-operated switch LSP–3 times the point in the machine cycle where SV–1 solenoid valve is to be de-actuated and start the labeling process. The disc-operated switch LSP–3 will also time the point in the machine cycle when the NO-LABELING process is to start, after LSP–1 is released when the star wheel runs out of bottles.

Push buttons

"START" push buttons PB–9 and PB–10—(FIG. 68). These two push buttons, one on each side of the unit, start the motor drive for that unit when pressed. These push buttons light up green when all safety switches and stop push buttons and interlocks are closed, indicating that the drive motor will start when the "START" button is pressed. If the push button is not lighted, the motor drive cannot be started by pressing the "START" button.

"STOP" push buttons PB–7 and PB–8—(FIG. 68). These two push buttons, one on each side of the unit, will stop the drive motor when pressed. These push buttons will light up red when the "RUN-WASH" selector switch is in the "WASH" position, indicating that the unit will not accept bottles and is in the "WASH" cycle.

"INCH" push button PB–6—(FIG. 68). This push button will inch or jog the drive motor. The drive motor will run only as long as the "INCH" button is held depressed. The "INCH" push button will operate even though one of the safety switches is open.

Selector switches

"RUN-WASH" selector switch—2 Positions—SS–1—(FIG. 68). The "RUN" position is the normal position for labeling. The "WASH" position is used only when cleaning the unit. In this position the vacuum is removed from the bottle carrier and air will continually blow through the bottle carrier. The "NO-LABELING" cylinder is de-activated and the pickers will travel their full stroke. In the "RUN" position the drive motor cannot be started if the vacuum pump and conveyor motors are not running. In the "WASH" position these interlocks are by-passed and the drive motor can be started for this unit without the conveyor and vacuum pump motors running.

"RUN-ADD LABEL" selector switch—2 Positions—SS–3—(FIG. 68). The "RUN" position is the normal labeling position. In the "ADD LABEL" position the labeler, if in high speed, will immediately go into intermediate speed and remain at this speed until the selector switch is turned back to "RUN." The labeler will then immediately go back to high speed, the object being that the labels cannot be added at high speed and the unit must be slowed down to add labels to the label holder.

"LABEL-NO LABEL-TEST" selector switch—3 Positions—SS–2—(FIG. 68). The label position is a normal labeling position. The "NO-LABEL" position will allow bottles to pass through the labeler without putting labels on them. In this position, the labeler will run at intermediate speed. In the "TEST" position the labeler will label normally, except when the motor drive will remain in the intermediate speed position.

In addition to the switches on each labeling unit, each machine, if comprising more than one unit, will have the following additional push buttons:

"VACUUM STOP" push button PB–1—The button stops the vacuum pump.

"VACUUM START" push button PB–2—This push button starts the vacuum pump.

"CONVEYOR STOP" push button PB–3—This push button stops the infeed and discharge conveyor and the gum roll drive motor.

"CONVEYOR START" push button PB–4—This push button starts the infeed and discharge conveyor and the gum roll motor.

"LUBE TEST" push button PB–5—This push button when pressed operates the lube pump and injects one shot of grease to all units. A time clock operates the grease pump automatically for two minutes at pre-set time intervals.

While one desirable embodiment of the invention has herein been illustrated and described by way of example, it is to be understood that the invention is broadly inclusive of any and all modifications which fall within the scope of the appended claims.

I claim:

1. A high speed rotary labeling machine of the kind wherein a rotating turntable supports articles while being labeled, and means for turning the turntable continuously, always in the same direction, said turntable comprising a vertical shaft and a plurality of independent bottle-gripping assemblies, each such assembly comprising a frame, each assembly comprising an article carrier and means whereby the carrier is oscillated about an axis parallel to and eccentric relatively to the axis of the shaft, and independent means for rigidly but removably attaching each respective frame to the shaft whereby any selected assembly may be removed from the turntable shaft without disturbing the others.

2. A rotary labeling machine of the kind wherein a rotating turntable supports bottles while being labeled, motor means for turning the turntable, the turntable comprising a plurality of bottle-gripping assemblies equally spaced apart about the axis of the turntable and wherein each such assembly comprises a bottle carrier having a base portion fixed to the upper end of a rotatable shaft and wherein each such assembly also comprises a rotary shaft, parallel to the carrier shaft, to whose upper end a grip-finger assembly is attached, normally fixed annular cams coaxial with the turntable, and means cooperable with said cams whereby, as the turntable revolves, the bottle carrier shaft and the grip-finger shaft are rotated, one of said cams being operative positively to rotate each carrier shaft about its own axis through an angle exceeding 90° in one direction during each revolution of the turntable, and spring means operative to rotate each carrier shaft in the opposite direction during the same revolution of the turntable.

3. The combination according to claim 2, wherein the cams for actuating the article carrier are so connected to the cam which operates the grip-finger and to each other that they may be relatively adjusted angularly thereby accurately to time the operation of the carrier and the grip-finger.

4. The combination according to claim 2, wherein the cams for actuating the article carrier and the grip-finger assembly are all mounted upon a supporting element coaxial with the turntable shaft, and means for angularly adjusting said supporting element.

5. The combination according to claim 2, wherein the cams which actuate the bottle carriers and grip-fingers are annular plate-cams, wherein the effective cam surface is one the inner peripheral edge of the cam thereby to minimize the accumulation of foreign material on the cam surface.

6. The combination according to claim 2, wherein each article-gripping assembly includes a third rotatable shaft parallel to the grip-finger shaft, and means, including gearing interconnecting the grip-finger shaft and said third shaft, cooperable with certain of said annular cams, for positively turning the grip-finger shaft at certain times in one direction and at other times in the opposite direction.

7. The combination with spaced parallel supply and discharge conveyors, of a labeling unit interposed between said conveyors, said labeling unit being of the rotary type comprising a turntable upon which articles are supported while being labeled, a motor normally operative to rotate the turntable at high speed, always in the same direction, said turntable comprising a vertical shaft, and a plurality of like, independent, bottle-gripping assemblies fixed to said shaft, each assembly including a rotary bottle carrier and a grip-finger, means for turning each bottle carrier about its own axis through an angle exceeding 90°, alternately in a clockwise direction and in a counterclockwise direction, respectively, during each revolution of the turntable, and means for moving the grip-finger toward and from the corresponding article carrier once during each revolution of the turntable.

8. A rotary labeling machine of the kind wherein a rotating turntable supports articles while being labeled, said turntable comprising a vertical shaft and a plurality of independent article-gripping assemblies, each such assembly comprising a frame, independent means for rigidly but removably attaching each respective frame to the turntable shaft, and a plurality of segmental plates fixed relatively to the shaft and which colectively provide a top surface for the turntable, each of said frames having bearings for a rotary article carrier shaft and for a rotary grip-finger shaft, respectively, and each segmental plate having a recess for the reception of the circular base of an article carrier fixed to the upper end of a carrier shaft, and each of said segmental plates having an arcuate slot for the accommodation of the shank of a grip-finger secured to the upper end of a grip-finger shaft, normally fixed cams coaxial with the turntable shaft, and means comprised in each of said article-gripping assemblies for cooperation with said cams thereby relatively to turn the carrier and grip-finger shaft in properly timed relation.

9. The combination with spaced parallel supply and discharge conveyors, of a labeling unit interposed between said conveyors, said labeling unit being of the rotary type comprising a turntable upon which articles are supported while being labeled, a motor for driving the turntable, an article-accepting device operative to take an article from the supply conveyor and advance it toward the turntable, an article-discharge device operative to receive a labeled article from the turntable and transfer it to the discharge conveyor, a motor for driving the supply conveyor, and means for transmitting motion from the conveyor motor to the article-accepting and article-delivery devices, further characterized in that the article-accepting device is a constantly rotating disc-like plate to advance a bottle from the supply conveyor toward a bottle carrier on the turntable, and the article-discharge device is also a constantly rotating disc-like plate for transferring a labeled bottle from a carrier on the turntable to the discharge conveyor.

10. The combination according to claim 9, wherein a series of like labeling units is interposed between the conveyors, each unit having a shaft by means of which its disc-like article-accepting and article-discharge devices are driven, and means for transmitting motion from the shaft of the first unit of said series to the corresponding shaft of the second unit of the series and from the shaft of the latter unit to that of the next and thus throughout the entire series whereby the single conveyor-driving motor turns all of the article-accepting and article-discharge devices in timed relation to the supply conveyor.

11. In combination with a conveyor, a labeling unit arranged to receive articles from said conveyor, said labeling unit being of the rotary type comprising a turntable upon which articles are supported while being labeled, a motor for driving the turntable, means including a rotatable roll for supplying gum to a label preparatory to applying the label to an article on the turntable, and a motor for driving said conveyor, said rotary gum supply roll being mounted upon a shaft, a pair of drive sprockets on said shaft, each being connected to the shaft by a unidirectional clutch, means for transmitting motion from the drive motor of the labeling unit to one of said sprockets, and means for transmitting motion from the conveyor drive motor to the other of said sprockets thereby to turn the gum supply roll at a relatively low speed so long as the conveyor continues in operation and, while the turntable is rotating, to transmit motion from the turntable drive motor to the gum supply roll at a relatively higher angular velocity.

12. The combination according to claim 2, wherein the machine includes a star wheel for delivering bottles one-by-one to the turntable, and wherein an emergency switch is so arranged as to stop the machine if an article jambs at the star wheel.

13. The combination according to claim 2, wherein an emergency switch is arranged to open and thereby stop the labeling unit in response to a jamb of bottles at the entrance to the delivery conveyor.

14. A rotary labeling machine of the kind wherein a rotating turntable supports articles while being labeled and wherein the turntable comprises a plurality of article-gripping assemblies equally spaced apart about the axis of the turntable, and wherein each assembly comprises a grip-finger connected to the upper end of a rotatable shaft, further characterized in that the grip-finger comprises a pad-carrier, a post on which the pad-carrier is pivotally mounted so that it may rock in accordance with the contour of the article which is being labeled, means whereby the pad-carrier is removably secured to the post, and means for rigidly connecting said post in eccentric relation to the grip-finger shaft.

15. The combination according to claim 14, wherein the grip-finger pad-carrier is pivotally connected to the post by a spring pin such as to permit ready removal of a given pad-carrier and its replacement by another.

16. In a labeling machine of the kind wherein a turntable, rotating about a vertical axis, supports a bottle carrier and moves the bottle carrier through the field of action of label-applying means operative to apply a label to a bottle standing on the carrier, and wherein the bottle carrier is rotatable relatively to the turntable, about a vertical axis, and wherein the label-applying means comprises a grip-finger operative to press an adhesively-coated label against the bottle, and wherein a bottle, advanced from a supply by a conveyor, is transferred by means, including a rotary star wheel, to the bottle carrier on the rotating turntable, and wherein the bottle carrier comprises a base on which the bottle stands and a rigid back-rest for steadying the bottle as the turntable revolves, in combination, means independent of the star wheel, whereby the bottle is urged toward the back-rest of the carrier during the transfer of the bottle to the turntable, further characterized in that the means for turning the carrier about its own axis is so devised that, after a bottle, mounted on the carrier has cleared the star wheel and associated elements, the carrier is suddenly turned in the reverse direction until its steadying elements are disposed at opposite sides of the path of travel of the axis of the carrier and facing in the direction of movement of the carrier with the table.

17. A rotary labeling machine of the kind wherein a rotating turntable supports articles which are to be labeled, a conveyor for supplying articles to be labeled, fixed guide means defining a supply channel through which articles may advance in approaching the turntable, a star wheel which turns in accurate time with the rotation of the table for advancing articles in spaced relation along said supply channel toward the turntable, a bottle carrier mounted on the table, the carrier being rotatable relatively to the table about a vertical axis, said carrier including a horizontal bottle-supporting base and a back-rest for engagement with the body of the bottle, the back-rest having spaced bottle-contacting ribs for engagement with the periphery of the bottle and which position the bottle with its axis eccentric to that of the carrier, means operative, as a carrier approaches the delivery end of the supply channel, so to turn the carrier that the space between the ribs of its back-rest is presented toward the advancing bottle, further characterized in that the means for turning the carrier about its own axis is such that, immediately after the bottle is engaged with the ribs of the back-rest of the carrier, the carrier is turned about its own axis to move the bottle bodily so as to bring its vertical axis into the arcuate path of movement of the axis of the carrier.

18. In combination, in a rotary labeling machine including label-applying means and comprising a table which turns about a vertical axis thereby to advance a bottle through the field of action of the label-applying means, a bottle carrier mounted on the table, said carrier including a horizontal bottle-supporting base and a back-rest operative, by engagement with the periphery of the bottle, to position the bottle eccentrically to the axis of the carrier, said carrier being rotatable relatively to the table about a vertical axis, a rotary star wheel for delivering a bottle to the carrier, and means for oscillating the bottle carrier about its own axis, so devised that, at times, in the rotation of the table, the bisector radius of the carrier base is substantially tangent to the arcuate path which the axis of the carrier follows, as the table rotates, and at other times intersects said path at an angle exceeding 90°, further characterized in that the axis of the bottle carrier moves along a circular path concentric with the axis of rotation of the table as the bottle moves through the field of action of the label-applying means, and wherein the means for oscillating the carrier comprises a fixed annular cam, and further characterized in that the cam is of a contour such that the carrier does not turn about its own axis relatively to the table while the label is being applied.

19. In combination, in a rotary labeling machine which includes label-applying means and which comprises a table which turns uninterruptedly about a vertical axis thereby to advance a bottle through the field of action of the label-applying means, a bottle carrier mounted on the table, the carrier being rotatable relatively to the table about a vertical axis, guide elements defining a passage along which a bottle may advance toward a carrier on the table, said passage being so arranged that, in emerging from the passage, a bottle is moving in the same general direction as the axis of the carrier on the table, the bottle carrier comprising an upright back-rest having spaced vertical edges for contact with the periphery of the bottle, and means for so orienting the carrier, as the latter approaches the discharge end of said supply passage, that the space between the bottle-contacting edges of said back-rest is positioned to receive the oncoming bottle, characterized in that one of the elements for guiding a bottle along the supply passage is a star wheel, and means for turning the star wheel in such timed relation to the rotation of the turntable and carrier that, as a bottle is released by the star wheel to advance along the supply passage, a carrier on the table is positioned in readiness to receive the bottle, further characterized in that the means for turning the carrier about its own vertical axis, relatively to the table, is such that, immediately the bottle contacts the spaced vertical edges of the back-rest of the carrier, the latter is turned about its own axis through an angle exceeding 90° so as to place the bottle at the advancing face of the carrier.

20. A rotary labeling machine of the kind wherein a rotating turntable supports articles which are to be labeled, a conveyor for supplying articles to be labeled, fixed guide means constituting a wall of a supply channel through which articles may advance in approaching the turntable, a constantly rotating disc-like plate whose upper surface constitutes the floor of a portion of said channel and which turns so to advance articles toward the turntable that a bottle, approaching the turntable, is moving in the same general direction as the adjacent part of the table, a star wheel which is operative to space articles a definite distance apart as they are advanced by said plate toward the turntable, a bottle carrier mounted on the table, said carrier including a horizontal bottle-supporting circular base and a back-rest for engagement with the body of the bottle, the backrest having spaced bottle-contacting ribs and the carrier being rotatable relatively to the table about a vertical axis, and means operative, as a carrier nears the discharge end of the supply channel, so to turn the carrier about its own axis as to present the space between the bottle-steadying ribs toward the advancing bottle.

21. In combination, in a rotary labeling machine which includes label-applying means and which comprises a table which turns about a vertical axis thereby to advance a bottle through the field of action of the label-applying means, a bottle carrier mounted on the table, said carrier including a horizontal bottle-supporting circular base and a back-rest for engagement with the body of the bottle, the back-rest having spaced bottle-contacting ribs and the carrier being rotatable relatively to the table about a vertical axis, fixed guide elements defining a discharge passage whose entrance is above the level of the table and open to receive a labeled bottle, a constantly rotating disc for moving a bottle along said passage, and means operative, as a carrier, having thereon a labeled bottle, approaches the entrance to said discharge passage, so to orient the carrier, relatively to the table, that the bisector radius of the base of the carrier substantially coincides with a line joining the axis of the table with the axis of said rotating disc.

22. In a labeling machine of the kind wherein means, driven by an electric motor, advances bottles to be labelel, one-by-one, through the field of action of label-applying means, and wherein the label-applying means comprises a picker, a rockshaft to which the picker is secured, a label magazine, and picker-actuating means operative normally to move the picker, cycle-after-cycle, from a label-receiving position in the magazine to a label transfer position at which the label, which the picker received at the magazine, is separated from the picker, said picker-actuating means comprising a constantly rotating cam, a lever, means whereby the rotating cam rocks the lever, and a link for transmitting motion from the lever to the picker shaft thereby to rock the picker, in combination, a movable fulcrum for said lever, and means operative so to shift said movable fulcrum, in the absence of a bottle at the transfer station, to receive a label from the picker at the appropriate time in the cycle, so to shorten the path of the picker that it does not reach label-receiving position at the magazine, further characterized in that the article to be labeled is a bottle, the bottle is carried by a rotating turntable through the field of action of the label-applying means; botles are received from a supply and fed in accurately spaced relation to the turntable by a start wheel; and wherein detector means, including a detector switch in the circuit of the drive motor, is arranged adjacent to the star wheel and is sensitively responsive to the failure of bottles to approach the star wheel in an unbroken procession, and further characterized in that the means for shifting the fulcrum of the cam-actuated lever comprises a fluid-pressure motor having a solenoid valve in circuit with said detector switch for controlling the admission of pressure fluid to said motor, the parts being so arranged that, upon failure of bottles to approach the star wheel at the normal rate, the solenoid valve so admits pressure fluid to the motor thereby to shift the lever-fulcrum to abnormal position.

23. A labeling machine of the kind wherein articles to be labeled are advanced from a supply into the field of action of a rotating star wheel which delivers the articles, one-by-one, in spaced relation to a turntable, mounted on a rotating vertical shaft, by means of which the articles are presented to label-applying means, and wherein the label-applying means comprises a picker mounted on a cam-actuated rock-shaft and which normally takes a label from a magazine and carries it to a transfer station, the machine comprising means whereby the picker may be prevented from taking a label from the magazine, and wherein the star wheel and turntable are driven by electric motor means, in combination, a circuit for controlling the supply of current to said motor means, said circuit comprising switches, speed-varying means, and time-delaying devices, one of said switches being arranged to respond to the passage of a bottle advancing toward the star wheel and which, by its response to the passing bottle, so modifies the circuit that the speed of the motor means increases from idling speed, during which the picker is inoperative, to a normal or running speed, a second switch which is responsive to a passing bottle being advanced by the star wheel thereby to condition the circuit to increase the speed of the motor means to normal or running speed, and a third switch responsive to a constantly rotating control element operative to prevent the initiation of effective picker operation, except when the picker is at a predetermined point in its path of movement.

24. In a labeling machine comprising a plurality of like labeling units arranged in series, each comprising an independent multi-speed drive motor, label-applying means, and a star wheel for advancing bottles, one-by-one, in spaced relation, as received from a supply, to the label-applying means, supply conveyor means and discharge conveyor means common to the several units, single-speed motors for driving the conveyors, an electrical circuit for supplying current to each of the several drive motors of the labeling units, said circuit comprising speed-varying means for each respective unit and switches such that, in the absence of articles at the star wheel of any individual unit, the motor of said unit will run at low speed but will automatically increase to normal or running speed wherever an unbroken column of bottles is supplied to its star wheel, said circuit also comprising a switch which responds to an abnormal supply of articles to the last unit of the series thereby to cause the motors of all of the units of the series temporarily to run at a reserve or abnormally high speed.

25. A labeling machine of the kind which includes label-applying devices, a turntable rotatable about a vertical axis for moving bottles through the field of action of the label-applying devices, a bottle carrier mounted upon the table and which is rotatable about a vertical axis eccentric to that of the table, said carrier comprising a base constituting a support for the bottle, and a back-rest comprising a pair of horizontally spaced, bottle-steadying elements engageable at spaced points, respectively, with the periphery of a bottle standing on the base, said steadying elements being so arranged, relatively to the axis of the carrier, that the vertical axis of a bottle, standing upon the carrier base and engaging said steadying elements, is eccentric to the axis of the carrier and on that radius of the carrier base which bisects the space between said steadying elements, the machine comprising a star wheel rotatable about a vertical axis which delivers bottles to the turntable, and a rotatable discharge plate turning about a vertical axis which receives labeled bottles from the turntable and delivers them to a conveyor, the label-applying devices comprising a picker for holding a gum-coated label transversely across the path of an advancing bottle, and a grip-finger operative to clamp the central portion of a label against the bottle, mechanism for turning the carrier about its own axis as it revolves with the turntable, said mechanism including a spring for turning the carrier in one direction and a cam for turning it in the opposite direction, characterized in that the cam is so contoured that while a carrier is traversing the field of action of the label-applying devices its bisector radius is tangent to the circle which is described by the center of the carrier as the latter revolves with the turntable and so that, after leaving the field of action of the label-applying devices, the carrier turns in a direction opposite to that of the turntable until, as the carrier approaches the discharge plate, the bisector radius of the carrier comes into coincidence with a line joining the center of the turntable and the center of the discharge plate.

26. A labeling machine according to claim 25, further characterized in that the cam for turning the bottle carrier is so contoured that, after the labeled bottle has been ejected from the carrier, the latter begins to turn about its own axis in the same direction as the turntable.

27. A labeling machine according to claim 25, further characterized in that the cam which rotates the bottle carrier is so contoured that, in approaching the star wheel, the carrier is turning in a direction opposite to that of the turntable until a bottle is delivered to the carrier by the star wheel and continues to turn in the same direction until the bottle is so far removed from the star wheel as to avoid contact with the star wheel or associated parts of the machine.

28. A labeling machine according to claim 27, further characterized in that the cam which controls the rotation of the bottle carrier is so contoured that, immediately the bottle is clear of all parts associated with the star wheel, the carrier is rapidly turned in the same direction as the turntable until the bisector radius of the carrier is tangent to the circle struck out by the center of the carrier as the turntable revolves.

29. In combination with supply and discharge conveyors, a labeling unit arranged to receive articles from the supply conveyor and to discharge labeled articles onto the discharge conveyor, said labeling unit being of the rotary type comprising a turntable upon which articles are supported while being labeled, the turntable carrying at least one bottle carrier, and motor means for turning the turntable, characterized in that the bottle carrier includes a backrest having orifices for the passage of air, means operative, alternatively, to supply compressed air to said orifice or to connect the orifice to a vacuum pump, and manually-controlled means operative, at will, to deliver hot water to said orifice for washing out foreign material.

30. The combination according to claim 29, comprising means whereby, after the orifices in the article carrier have been cleaned by flushing with hot water, compressed air may be admitted thereby to remove water from the passages.

31. The combination according to claim 24, wherein each labeling unit comprises a receptacle for liquid gum and means for taking gum from the receptacle and applying it to a label, means constituting a gum supply, and a valve-controlled means for conducting gum from the supply to each, respectively, of the several receptacles.

32. In combination with supply and discharge conveyors, a labeling unit arranged to receive articles from the supply conveyor and to discharge labeled articles onto the discharge conveyor, said labeling unit being of the rotary type comprising a turntable upon which articles are supported while being labeled, the turntable carrying at least one bottle carrier, motor means for turning the turntable, the bottle carrier including a backrest having at least one orifice for the passage of air, means operative alternatively to supply compressed air to said orifice or to connect the orifice to a vacuum pump, and manually-controlled means operative, at will, to deliver hot water to said orifice for washing out foreign material.

33. The combination according to claim 32, and comprising a picker operative to take a label from a magazine and convey it to a transfer point, a gum box, a roll which receives gum from the gum box, a scraper for spreading gum evenly upon the roll, a transfer device which takes gum from the roll and applies it to the picker, means, including a constantly rotating cam, for actuating the picker, means operative to prevent the picker from taking a label from the magazine when no article will be positioned at the transfer point, at the normal time in the cycle, to receive a label, and means operative to admit hot water for cleaning the orifices in the carrier; for concomitantly closing the connection between the orifices and the vacuum pump; and for rendering inoperative the device which prevents normal operation of the picker.

34. The combination according to claim 33, comprising means whereby, after the orifices in the article carrier have been cleaned by the admission of hot water, compressed air may be admitted thereby to remove water from the passages.

References Cited

UNITED STATES PATENTS

| | | | |
|---|---|---|---|
| 1,053,565 | 2/1913 | Bogdanffy | 156—567 |
| 2,579,631 | 12/1951 | Von Hofe et al. | 156—566 |
| 2,631,748 | 3/1953 | Schirmer | 156—569 X |
| 2,723,042 | 11/1955 | Banks | 156—566 X |
| 2,981,432 | 4/1961 | Flood | 156—566 |
| 3,064,714 | 11/1962 | Flood | 156—542 |

EARL M. BERGERT, *Primary Examiner.*

M. L. KATZ, *Assistant Examiner.*